US008595032B1

(12) United States Patent
Schoen et al.

(10) Patent No.: US 8,595,032 B1
(45) Date of Patent: Nov. 26, 2013

(54) COMPUTER APPARATUS AND METHOD FOR ILLUSTRATING, ISSUING, AND MANAGING DISABILITY COVERAGE FOR RETIREMENT PLANS WITH INDIVIDUAL ACCOUNTS

(75) Inventors: Matthew B. Schoen, Stamford, CT (US); Jean-Philippe Khodara, Chemin de la Calotte (FR)

(73) Assignee: CyArch, LLC, Fargo, ND (US)

( * ) Notice: Subject to any disclaimer, the term of this patent is extended or adjusted under 35 U.S.C. 154(b) by 622 days.

(21) Appl. No.: 11/861,084

(22) Filed: Sep. 25, 2007

Related U.S. Application Data

(63) Continuation-in-part of application No. 08/936,037, filed on Sep. 23, 1997, now Pat. No. 6,235,176, and a continuation-in-part of application No. 09/861,752, filed on May 21, 2001.

(51) Int. Cl.
*G06Q 40/00* (2012.01)
(52) U.S. Cl.
USPC .................. 705/4; 705/35; 705/36 R; 705/39
(58) Field of Classification Search
USPC ............................................................. 705/4
See application file for complete search history.

(56) References Cited

U.S. PATENT DOCUMENTS

| | | | |
|---|---|---|---|
| 4,055,757 A | 10/1977 | Tillman et al. | |
| 4,642,768 A | 2/1987 | Roberts | |
| 4,648,037 A * | 3/1987 | Valentino | 705/36 R |
| 4,750,121 A | 6/1988 | Halley et al. | |
| 5,206,803 A | 4/1993 | Vitagliano et al. | |
| 5,291,398 A | 3/1994 | Hagan | |
| 5,704,045 A | 12/1997 | King et al. | |
| 6,119,093 A | 9/2000 | Walker et al. | |
| 7,050,998 B1 | 5/2006 | Kale et al. | |
| 7,113,913 B1 * | 9/2006 | Davis et al. | 705/4 |
| 2002/0116327 A1 | 8/2002 | Srinivasan | |
| 2003/0192029 A1 | 10/2003 | Hughes | |
| 2004/0010426 A1 | 1/2004 | Berdou | |
| 2007/0005463 A1 * | 1/2007 | Davis et al. | 705/34 |

OTHER PUBLICATIONS

"When Mortgage Cover Falls Down on the Job", Jean Eaglesham, The Independent, London (UK), dated Marcj 17, 1996, p. 16.*
McCord et al. "Partnerships: If There's a Beginning . . . There's an End." The National Public Accountant, vol. 37, No. 4, p. 18, Apr. 1992. USA.
"Employee Benefits Survey: Employee Benefits in Medium and Large Private Establishments, 1995 news release text"; EBS Staff and Kathyrn Hoyle; http://stats.bls.gov/news.release/ebs3.nws.htm; Dec. 5, 1997; pp. 1-5.
Colbert, Ella "Interview Summary" mailed Jun. 27, 2011, for U.S. Appl. No. 09/861,752, filed May 21, 2001. pp. 1-4. USA.
Colbert, Ella "Applicant-Initiated Interview Summary" mailed Sep. 6, 2011, for U.S. Appl. No. 09/861,752, filed May 21, 2001. pp. 1-3. USA.

(Continued)

*Primary Examiner* — Hai Tran
(74) *Attorney, Agent, or Firm* — Peter K. Trzyna, Esq.

(57) ABSTRACT

A system and method for providing insurance protection against loss of contributions to tax favored defined contribution plans should an active employee/participant become disabled. The invention manages the administration of a disability insurance policy held inside the plan that continues contributions to the plan during a period of disability, where the coverage amount for each participant is determined by the level of contributions made by or for each participant.

7 Claims, 50 Drawing Sheets

(56) References Cited

OTHER PUBLICATIONS

Colbert, Ella "Interview Summary" mailed Sep. 2, 2010, for U.S. Appl. No. 09/861,752, filed May 21, 2001. pp. 1-3. USA.
Trzyna, Peter K., "Applicant Summary of Interview with Examiner" filed Sep. 23, 2011, for U.S. Appl. No. 09/861,752, filed May 21, 2001. pp. 1-2. USA.
Trzyna, Peter K., "Interview Summary and Third Supplemental Amendment" filed Aug. 25, 2011, for U.S. Appl. No. 09/861,752, filed May 21, 2001. pp. 1-35. USA.
Colbert, Ella "Examiner's Answer" mailed Apr. 6, 2011, for U.S. Appl. No. 09/861,752, filed May 21, 2001. pp. 1-158. USA.
Trzyna, Peter K., "Supplemental Preliminary Amendment" filed Sep. 15, 2010, for U.S. Appl. No. 09/861,752, filed May 21, 2001. pp. 1-38. USA.
Trzyna, Peter K., "Preliminary Amendment" filed Jun. 1, 2010, for U.S. Appl. No. 09/861,752, filed May 21, 2001. pp. 1-20. USA.
Trzyna, Peter K., "Corrected Brief on Appeal on Behalf of Appellant" filed Feb. 5, 2010, for U.S. Appl. No. 09/861,752, filed May 21, 2001. pp. 1-111. USA.
Merchant, Shahid R., "Examiner's Answer" mailed Jul. 7, 2009, for U.S. Appl. No. 09/861,752, filed May 21, 2001. pp. 1-32. USA.
Trzyna, Peter K., "Brief on Appeal on Behalf of Appellant" filed Sep. 15, 2008, for U.S. Appl. No. 09/861,752, filed May 21, 2001. pp. 1-111. USA.
Trzyna, Peter K., "Second Amendment After Final" filed Sep. 3, 2008, for U.S. Appl. No. 09/861,752, filed May 21, 2001. pp. 1-23. USA.
Trzyna, Peter K., "Amendment After Final" filed May 8, 2007, for U.S. Appl. No. 09/861,752, filed May 21, 2001. pp. 1-55. USA.
Harbeck, Timothy M., "Office Action-Final Rejection" mailed Mar. 8, 2007, for U.S. Appl. No. 09/861,752, filed May 21, 2001. pp. 1-16. USA.
Harbeck, Timothy M., "Office Action-Final Rejection" mailed Dec. 12, 2006, for U.S. Appl. No. 09/861,752, filed May 21, 2001. pp. 1-8. USA.
Trzyna, Peter K., "Amendment and Response" Sep. 25, 2006, for U.S. Appl. No. 09/861,752, filed May 21, 2001. pp. 1-26. USA.
Harbeck, Timothy M., "Office Action" mailed Mar. 15, 2006, for U.S. Appl. No. 09/861,752, filed May 21, 2001. pp. 1-22. USA.
Trzyna, Peter K., "Preliminary Amendment" filed Dec. 13, 2004, for U.S. Appl. No. 09/861,752, filed May 21, 2001. pp. 1-22. USA.
Trzyna, Peter K., "Replacement Reply Brief on Appeal on Behalf of Appellant" filed Apr. 3, 2012, for U.S. Appl. No. 10/784,719, filed Feb. 23, 2004. pp. 1-11. USA.
Trzyna, Peter K., "Reply Brief on Appeal on Behalf of Appellant" filed Apr. 3, 2012, for U.S. Appl. No. 10/784,719, filed Feb. 23, 2004. pp. 1-11. USA.
Meinecke, Diaz Susanna M., "Examiner's Answer" mailed Feb. 3, 2012, for U.S. Appl. No. 10/784,719, filed Feb. 23, 2004. pp. 1-41. USA.
Trzyna, Peter K., "Brief on Appeal on Behalf of Appellant" filed Jan. 3, 2012, for U.S. Appl. No. 10/784,719, filed Feb. 23, 2004. pp. 1-96. USA.
Trzyna, Peter K., "Applicant Summary of Interview with Examiner" filed Dec. 17, 2010, for U.S. Appl. No. 10/784,719, filed Feb. 23, 2004. pp. 1-2. USA.
Meinecke, Diaz Susanna M., "Interview Summary" mailed Nov. 30, 2010, for U.S. Appl. No. 10/784,719, filed Feb. 23, 2004. pp. 1-4. USA.
Meinecke, Diaz Susanna M., "Office Action-Final Rejection" mailed Nov. 30, 2010, for U.S. Appl. No. 10/784,719, filed Feb. 23, 2004. pp. 1-65. USA.
Trzyna, Peter K., "Corrected Amendment and Response" filed Aug. 27, 2010, for U.S. Appl. No. 10/784,719, filed Feb. 23, 2004. pp. 1-29. USA.
Trzyna, Peter K., "Amendment and Response" filed Aug. 2, 2010, for U.S. Appl. No. 10/784,719, filed Feb. 23, 2004. pp. 1-29. USA.
Meinecke, Diaz Susanna M., "Office Action" mailed Feb. 2, 2010, for U.S. Appl. No. 10/784,719, filed Feb. 23, 2004. pp. 1-44. USA.
Trzyna, Peter K., "Response to Requirement for Restriction/Election" filed Oct. 28, 2009, for U.S. Appl. No. 10/784,719, filed Feb. 23, 2004. pp. 1-5. USA.
Meinecke, Diaz Susanna M., "Requirement for Restriction/Election" mailed Apr. 28, 2009, for U.S. Appl. No. 10/784,719, filed Feb. 23, 2004. pp. 1-16. USA.
Trzyna, Peter K., "Amendment and Response to Non-Responsive Amendment" filed Jan. 14, 2009, for U.S. Appl. No. 10/784,719, filed Feb. 23, 2004. pp. 1-26. USA.
Trzyna, Peter K., "Amendment and Response" filed Apr. 18, 2008, for U.S. Appl. No. 10/784,719, filed Feb. 23, 2004. pp. 1-26. USA.
Meinecke, Diaz Susanna M., "Office Action" mailed Oct. 18, 2007, for U.S. Appl. No. 10/784,719, filed Feb. 23, 2004. pp. 1-8. USA.
Colbert, Ella., "Office Action" mailed Dec. 20, 2012, for U.S. Appl. No. 13/585,541, filed Aug. 14, 2012. pp. 1-44. USA.
Trzyna, Peter K., "Amendment and Response" filed Jun. 11, 2013, for U.S. Appl. No. 13/585,541, filed Aug. 14, 2012. pp. 1-53. USA.

\* cited by examiner

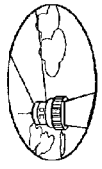

Prepared for ABC Corporation        9/14/97 4:52:36 PM

| Last Name | First Name | Status | SSN | DOB | Employee Data Premium | Employee Data Coverage | Employee Data Unearned | Employer Data Premium | Employer Data Coverage | Employer Data Unearned | As of (*) |
|---|---|---|---|---|---|---|---|---|---|---|---|
| ABBOTT | JOHN | Active | 000-78-4005 | 12/5/69 | $75.15 | $3,951.50 | $30.68 | $79.49 | $4,188.80 | $32.45 | 8/5/97 |
| ABBOTT | KATHLEEN | Active | 000-66-7487 | 3/15/67 | $75.35 | $3,962.00 | $30.76 | $79.66 | $4,198.40 | $32.52 | 8/5/97 |
| TULL | J. GREGORY | Active | 000-62-2509 | 11/16/68 | $75.54 | $3,972.50 | $30.84 | $79.84 | $4,208.00 | $32.59 | 8/5/97 |
| TUMA | MARY | Active | 000-37-0606 | 6/23/69 | $75.73 | $3,983.00 | $30.91 | $80.01 | $4,217.60 | $32.66 | 8/5/97 |
| TUNG | TERESA | Active | 000-62-5623 | 5/6/56 | $75.92 | $3,993.50 | $30.99 | $80.19 | $4,227.20 | $32.73 | 8/5/97 |
| TUNIS MILLER | ANDREA | Active | 000-38-2189 | 9/20/55 | $76.11 | $4,004.00 | $31.07 | $80.36 | $4,236.80 | $32.81 | 8/5/97 |
| TURKINGTON | ROBERT | Active | 000-48-3333 | 6/2/67 | $76.30 | $4,014.50 | $31.15 | $80.54 | $4,246.40 | $32.88 | 8/5/97 |
| TURNER | STEPHANIE | Active | 000-70-7581 | 4/27/67 | $76.50 | $4,025.00 | $31.23 | $80.71 | $4,256.00 | $32.95 | 8/5/97 |
| TURSE | THERESA | Active | 000-46-2421 | 1/15/57 | $76.69 | $4,035.50 | $31.31 | $80.89 | $4,265.60 | $33.02 | 8/5/97 |
| TWOMLEY | LORRAINE | Active | 000-58-5497 | 1/6/61 | $76.88 | $4,046.00 | $31.38 | $81.07 | $4,275.20 | $33.09 | 8/5/97 |
| TYSZKOWSKI | JANET | Active | 000-40-8275 | 4/28/59 | $77.07 | $4,056.50 | $31.46 | $81.24 | $4,284.80 | $33.16 | 8/5/97 |
| UNGERLEIDER | DAVID | Active | 000-48-4167 | 4/3/69 | $77.26 | $4,067.00 | $31.54 | $81.42 | $4,294.40 | $33.24 | 8/5/97 |
| UNVALA | MARYBETH | Active | 000-52-0939 | 6/2/61 | $77.46 | $4,077.50 | $31.62 | $81.59 | $4,304.00 | $33.31 | 8/5/97 |
| URCIUOLI | JOSEPH | Active | 000-40-9696 | 1/19/50 | $77.65 | $4,088.00 | $31.70 | $81.77 | $4,313.60 | $33.38 | 8/5/97 |
| UTTER | DEREK | Active | 000-57-0737 | 4/25/66 | $77.84 | $4,098.50 | $31.78 | $81.94 | $4,323.20 | $33.45 | 8/5/97 |
| VACCA | FRANK | Active | 000-30-9484 | 5/29/38 | $78.03 | $4,109.00 | $31.85 | $82.12 | $4,332.80 | $33.52 | 8/5/97 |
| VAGNIER | PATRICK | Active | 000-54-8280 | 7/17/59 | $78.22 | $4,119.50 | $31.93 | $82.29 | $4,342.40 | $33.59 | 8/5/97 |
| VAGRA | LINDA | Active | 000-64-7335 | 10/23/68 | $78.41 | $4,130.00 | $32.01 | $82.47 | $4,352.00 | $33.66 | 8/5/97 |
| VAHOS | CARLOS | Active | 000-50-0976 | 2/18/57 | $78.61 | $4,140.50 | $32.09 | $82.64 | $4,361.60 | $33.74 | 8/5/97 |
| VALENTI | RICHARD | Active | 000-40-1924 | 1/14/50 | $78.80 | $4,151.00 | $32.17 | $82.82 | $4,371.20 | $33.81 | 8/5/97 |
| VALENZA | THOMAS | Active | 000-62-4144 | 3/18/62 | $78.99 | $4,161.50 | $32.24 | $82.99 | $4,380.80 | $33.88 | 8/5/97 |
| VALLI | K. LOUISE | Active | 000-60-1537 | 3/15/69 | $79.18 | $4,172.00 | $32.32 | $83.17 | $4,390.40 | $33.95 | 8/5/97 |

(*) Date as of which unearned premiums were calculated

Page 1 of 13

COMPUTER APPARATUS AND METHOD FOR ILLUSTRATING, ISSUING, AND MANAGING DISABILITY COVERAGE FOR RETIREMENT PLANS WITH INDIVIDUAL ACCOUNTS

I. CLAIM OF PRIORITY

This is a continuation-in-part patent application, claiming priority from, and incorporating by reference, Ser. No. 08/936,037, filed Sep. 23, 1997, titled "Computer Apparatus And method For Defined Contribution And Profit Sharing Pension And Disability Plan," naming as inventors Matthew B. Schoen and Jean-Paul Khodara, becoming U.S. Pat. No. 6,235,176 on May 22, 2001; and Ser. No. 09/861,752, filed May 21, 2001, titled "Computer Apparatus And method For Illustrating, Issuing, and Managing Disability Coverage for Retirement," having the same inventors.

II. APPENDIX AND COPYRIGHT NOTICE

This patent application includes an appendix incorporated by reference herein.

A portion of the disclosure of this patent document contains material that is subject to copyright protection. The copyright owner has no objection to a statutory fair use of this material, as it appears in the files of the files or records of the U.S. Patent and Trademark Office, but otherwise reserves all copyright rights whatsoever.

III. FIELD OF THE INVENTION

The present invention is in the field of digital electrical apparatus and method for making and using the same, as well as data structures and necessary intermediates created thereby. More particularly, the present invention is directed to technical effects of such invention in signal processing for administrating disability insurance or benefits covering individual participant contributions to individual retirement accounts and the earnings thereon that meet the requirements set forth, for example, under the Internal Revenue Code Section 408, contributions to Individual Social Security Retirement Accounts (as are being contemplated under possible future U.S. legislation, but are in operation in other countries), and the like, as well as in handling the earnings thereon.

IV. BACKGROUND OF THE INVENTION

Under Internal Revenue Code Section 408, certain individuals with earned income are eligible to make contributions to various individual retirement accounts and individual retirement annuities. Eligibility rules differ depending upon the type of individual retirement account. For example, generally, anyone under the age of 70½ who earns income from employment may make contributions to a traditional individual retirement account (IRA). For a Roth IRA, contributions may be made as long as the individual has earned income and a modified adjusted gross income below certain thresholds.

Under current law each eligible person may contribute a maximum of $2,000 or 100% of compensation, whichever is less, to either a traditional or Roth IRA annually (or split the maximum between plans, e.g., $ 1,000 to each).

Contributions to traditional IRAs are fully tax-deductible for federal income tax purposes if neither the individual nor their spouse is an active participant in an employer-sponsored qualified retirement plan. The deduction is reduced or eliminated if the individual's modified adjusted gross income exceeds certain thresholds.

Roth IRA contributions are not deductible for federal income tax purposes. However, withdrawals from Roth IRAs that begin after age 59½ are tax-free provided the Roth IRA has been established for more than five years.

Traditional IRA distributions may start after age 59½ and must start no later than age 70½. Withdrawals made prior to age 59½ are generally subject to a 10% penalty tax in addition to income tax. Exceptions to the penalty tax are made for certain distributions. Examples include but are not limited to the following:

Taken in substantially equal amounts over the individual's life expectancy

Occur due to the disability of the owner of the IRA

Are used to pay medical expenses in excess of 7.5% of ADI

As noted above and clearly stipulated in Internal Revenue Code Section 408, both traditional and Roth IRAs are primarily intended as retirement savings accounts. Furthermore, traditional IRAs only provide favorable federal income tax deductions to those individuals who are not participants in employer-sponsored qualified retirement plans. Deductions are limited or offset completely if current earned income exceeds certain thresholds.

Individuals who are relying upon IRAs as a primary source of retirement income are generally the same people depending upon social security as another prime source of retirement income. Stated differently, people who work for employers sponsoring qualified retirement plan(s) are less dependent upon social security or IRAs for retirement income than people who work for employers offering no retirement plan(s). Even if the current law is liberalized to provide tax savings or incentives to individuals covered by private pension plans, there is a need to assure that targeted savings at retirement are not compromised due to unforeseen circumstances such as disabilities.

Additionally, many employer-sponsored qualified retirement plans provide employee participants certain safeguards with respect to the amount of retirement benefits available at retirement. For example, defined benefit pension plans are qualified retirement plans with employer contributions aggregated annually based upon an actuarially determined plan liability. Current contributions are generally based upon estimates of future employee income levels immediately prior to retirement (e.g., 50% of the final five years' average gross salary) and other actuarial factors such as estimated rates of return on plan assets, liability discount rates, employee turnover, mortality and morbidity. In contrast, benefits under defined contribution plans and hybrid plans such as Cash Balance plans are based upon individual accounts.

Sometimes defined benefit plans provide a disability protection provision. In the event the employee plan participant becomes disabled prior to retirement, the plan continues to accrue benefits as though the employee continued active employment. Hence, the income payable at retirement approximates the retirement income benefit payable had disability not interrupted the active employment of the plan participant.

Defined contribution plans such as 401 (k) plans and non-traditional defined benefit plans such as cash balance plans are becoming increasingly popular. These plans are beginning to offer new forms of protection to disabled employees as well. (Note again the claim of priority and incorporation by reference of U.S. patent application Ser. No. 08/936,037 regarding a method for making such coverage more widely available.)

Private disability coverage, whether sponsored by employers or purchased directly by individuals have overall coverage limitations. Generally, the available coverage is limited to no more than 66⅔% of gross earned income. Insurance companies can be reluctant to provide a higher percentage of coverage due to the risk that a disabled insured will have insufficient economic incentive to go back to work. Often, the percentage of gross earned income covered is considerably lower than 66⅔%. This is because there are generally upper limitations on the amount of compensation covered (expressed in dollars, e.g., $200,000) or because only certain types of income are covered under disability policies (e.g., employer sponsored group long term disability insurance often excludes incentive compensation, commission income and other non-salary compensation from the definition of covered income). Because people who have private disability coverage are likely to receive 66⅔% or less of pre-disability income during disability, they are unlikely to be able to continue contributing to IRAs at pre-disability levels without worsening their present financial hardship.

Of course, millions of Americans have no private disability coverage at all, and social security provides a modest disability benefit, but has an extremely difficult definition of disability qualification to meet. Continuing IRA contributions at pre-disability levels will likely be the least of the financial worries for those who do not own private disability insurance.

Currently, insurance or benefits designed to make up for lost contributions (and the earnings thereon) to traditional IRAs or Roth IRAs resulting from the disability of individual account holders do not exist. There are no known products (insurance or other) on the market that provide this benefit.

Traditional disability income policies pay benefits during the time the person is disabled. Traditional policy designs that pay benefits during the period of disability necessitate disability benefits being paid either; 1) directly to the disabled IRA participant; 2) into the IRA of the disabled participant, or, 3) into some other accumulation vehicle. The purpose of the desired coverage is to prevent diminishment of retirement benefits that would have been accumulated or received had a disability not occurred. It is undesirable for the benefits to be at the immediate disposal or discretion of the disabled participant when the disability occurs. Firstly, the combined coverage may exceed the intended maximum of the insurance company or other benefit provider. For example, as stated previously, most insurers offering individual or group Long Term Disability (LTD) insurance seek to avoid coverage exceeding 66⅔% of compensation. Also, the participant may squander the benefit on current expenses and still suffer diminishment of retirement benefits.

There is a danger that the participant will squander benefits prior to retirement even if the benefit is payable to the IRA instead of to the participant. This is because Internal Revenue Code Section 408 specifically requires that disabled participants be able to access IRA plan assets prior to age 59½ without excise tax in the event of the disability the IRA owner. This provision of IRC Section 408 may explain why annuities sold as qualifying IRA plans have generally not included a "waiver of premium" option. A waiver of premium is an optional feature or rider offered in connection with certain life insurance and or annuity policies whereby premiums are waived under the contract during a qualifying disability. If a traditional waiver of premium approach is used with an IRC Section 408 qualified IRA, benefits (premiums waived plus earnings) must be accessible to the disabled participant immediately. There is therefore no assurance that benefits will not be diminished at retirement. There is also the possibility that the level of combined currently available disability income benefits will exceed the targeted maximum of the issuing insurance companies.

Making the benefit payable to a trust, annuity or other instrument may address this problem. The vehicle must possess the necessary restrictions on withdrawals prior to retirement to assure benefits are ultimately available at retirement. If this approach is used, the applicable taxation of the accumulation vehicle must be taken into consideration. Traditional IRA contributions are sometimes deductible. In addition, the growth (income and gains) of invested contributions is not subject to income taxation until distribution. If the disability benefit is contributed into a vehicle with either nondeductible contributions or currently taxable investment growth, the participant will suffer diminishment of retirement benefits. Because each participant's income tax bracket and situation may differ, this raises an almost infinite number of necessary corrective adjustments to offset the cost of taxes. Deferred annuities are not subject to income taxation on growth until distribution. However, in order for an annuity to completely avoid diminishment, the disability benefit must be grossed up so that the net after tax benefit matches the pre-disability contribution amount (an infinite number of possible corrections). If the disability benefit is paid into a deferred annuity on a tax-free basis, adjustments for non-deductibility may not be necessary. An annuity may also be desirable because some deferred annuities allow contract owners to direct investment options. This may allow the disabled participant to control annuity investment allocations in a fashion similar to IRA plans. However, we believe there are practical economic drawbacks to all of these approaches. Given that the maximum annual IRA contribution for an individual under current law is only $2,000 ($5,000 under proposed legislation), the cost of having dollars flowing into either a trust or annuity with special restrictions, is likely to be prohibitive in relation to the benefit. This may set the stage for a lack of availability of such a plan in connection with IRAs today. Plans using this approach are available in connection with replacing lost contributions to private pension plans (where the annual contribution limits are currently five times higher than for IRAs).

A possible alternative to deferred annuities or other accumulation vehicles that contain restrictions on plan withdrawals prior to retirement, is the disability policy or benefit itself. In order to avoid the diminishment risk described in the proceeding paragraphs, a disability policy or benefit would have to be designed with disability benefit payouts deferred until retirement or other specified time. Additionally, the policy must provide a method of making up for lost asset growth on contributions or hypothetical contributions. This might be accomplished in a number of ways. The policy or benefit could have a stated asset growth rate that the insurance company accrues on contributions and account balances until retirement (at the insurance company's risk). For example, the policy may promise that the annual contribution and account balance will grow at a specified rate (e.g., 8% per annum). If the insurance company earns less than 8% on its reserves, they are still obligated to pay benefits at 8%. If it earns more than the stipulated minimum return, it may either keep the excess return as profit (non-participating policy) or share the excess return with policy-owners in the form of dividends (a participating contract). Instead of a fixed rate of growth, the rate credited to accrued contributions and account balances may be tied to a published index such as a United States Treasury Bond Index or the Standard & Poors 500 Index. Once again, the insurance company may take the risk associated with delivering benefits at the promised growth rate and may issue the policy either on participating or non-participating basis. All of the designs mentioned thus far are examples of general account policies. All policy reserves are held within the general account of the insurance company and are general obligations of the insurance company. Insurance companies might also design a disability policy with policy reserves held in a separate account. The benefit obligations of these policies are supported by the underlying assets held within the separate account and is not a general obligation of the insurance company. Assets held in the separate account are reserved for the exclusive benefit of policyholders and are not chargeable with any other obligation of the insurance company. Annual accrued benefit contributions and account balances within both general account policies and separate account policies may be allocated by participants (generally, among several investment divisions). Under this approach, the investment risk associated with investment performance is borne primarily by each disabled participant (as opposed to the insurer).

Individuals can voluntarily purchase the various disability policy or benefit designs described above or coverage may be made available on some other basis. The financial institution offering a particular IRA product could offer the feature at no charge as a means of competing against other commercial IRA providers. Investment product vendors such as mutual fund companies may incorporate a disability completion feature within certain mutual funds and absorb the cost of providing the feature. They can also offer the feature as an optional benefit and charge higher fees. Insurance companies might provide an annuity with a similar feature or rider and either charge an additional fee or premium or absorb the cost. Employers might pay for a benefit, either insured or otherwise, on the behalf of employees. This is more likely in those situations where an employer makes an IRA available to employees under a payroll deduction plan or on some other sponsored basis.

The form or design of coverage or benefits can vary greatly. Group or individual disability policies may be used. It may be offered through a rider to some other form of insurance policy. The benefit may be provided as an implicit feature or provision of an account or other investment vehicle. The investment vehicle or account in turn might purchase insurance to indemnify all or a portion of the risk. Benefits can be paid in installments or in a lump sum.

Because there are currently no known disability policies or benefits on the market that defer disability benefit payments until retirement (or early retirement), there are no known computer software systems in existence (with the exception of the above-referenced Ser. No. 08/936,037) to track deferred disability payments, benefits, account balances, reserves or obligations. There are no known computer software systems available to track the growth or hypothetical growth of deferred disability benefits at either fixed rates or rates tied to indices with the risk for attaining such growth borne by the insurance companies (either with a participating policy or a non-participating policy), reinsurance companies, mutual fund companies or any other company. There are currently no known systems available to track the growth of deferred disability benefits with the growth of the deferred disability benefits tied to investment options selected by the disabled participant with the investment risk borne by the participant. There are no known computer software systems that calculate reserves, profits, losses, loss ratios, liabilities, or other actuarial factors for disability policies or benefits with benefits deferred until retirement or other specified period. There are no known computer software systems designed for primary insurance companies (insurance companies issuing the deferred disability policy) designed to interact on an automated basis with the computer software systems of reinsurance companies reinsuring deferred disability coverage. There are no known computer software systems available to provide accounting, record keeping or other administrative processes to insurance companies, reinsurance companies, mutual fund companies or any other company desiring to offer disability policies with benefits that are deferred until retirement or early retirement.

In our previous patent application (U.S. patent application Ser. No. 08/936,037), we identified a need for disability coverage protecting retirement benefits of individual participants within certain retirement plans qualified under Internal Revenue Code Section 401(a). We also stated that it may in some instances be preferable to provide such coverage on a deferred basis (deferred until retirement or early retirement). Except for our subsequently discussed invention, we know of no one else who has identified one other potential need to defer the payment of disability benefits until retirement or early retirement in connection with retirement plans qualified under Internal Revenue Code Section 401(a), as follows. Many employers offer two or more retirement plans to employees that are qualified under IRC Section 401(a). In such cases, the employer may wish to provide coverage to protect the contributions made on behalf of individual participants who are participants in more than one plan. In such cases, it may be undesirable to purchase two or more separate policies (one in each of the plans qualified under Internal Revenue Code Section 401(a)) for each participant. This would likely involve unnecessary duplication of certain expenses such as policy administration fees. It would be more economical to purchase a single policy covering all contributions, or an approximation of all contributions made on behalf of a single participant in two or more retirement plans qualified under Internal Revenue Code Section 401(a). This will require placing such coverage in a single retirement plan qualified under Internal Revenue Code Section 401(a). Payment of such consolidated coverage at the time of disability may not always comply with funding limitations for the selected plan. Therefore, it may be necessary to pay such benefits directly to the participant at retirement or early retirement (or the accrued benefit to a beneficiary in the event the participant dies during such period). In making the subsequently discussed invention, we believe that we are the first to have discovered this need or problem.

In recent years, politicians and others have opined that the current U.S. social security retirement system is heading toward fiscal crises. Some believe that the financial danger is attributable to both the changing demographics of the working population (the ratio of people who are employed to the people who are receiving social security retirement benefits has been steadily dropping for decades) and the low investment performance of current social security plan assets.

Historically, social security has not maintained or administered individual retirement accounts. Rather, aggregate plan liabilities determine aggregate funding goals.

In recent years, there have been several federal legislative proposals to reform the U.S. social security retirement system. Among these proposals are plans calling for the establishment of individual social security retirement accounts. Under one recent proposal, workers would be able to select investment options by filling out forms filed with their taxes. Although such plans are not yet in operation for U.S. workers, the present invention is useful for such accounts for workers of those nations that currently provide social security retirement plans with individual plans, and of course the computing for such accounts can be carried out anywhere (such as in the United States).

In light of the future financial problems of the current U.S. social security retirement system, legislation reforming the current system seems almost unavoidable. Currently, social security disability benefits are not based on individual retirement accounts. If legislation is passed that includes the establishment of individual social security retirement accounts, there will be an analogous need for entirely new type(s) of disability benefits protecting retirement benefits. (Note that the present invention is directed to computing operations, such that a particular embodiment of the invention and program code and/or data may reflect changeable but readily discernable matters from whatever facts or law may be applicable, U.S. or otherwise.)

There are many possible ways of preserving individual social security retirement account benefits in the event of disability.

In the case of individual social security retirement accounts, the cost and amount of coverage and benefits may be calculated individually based upon individual contributions or individual account balances. The cost of the benefit may be charged according to individual coverage amounts or may be assessed according to other factors. It may be insured through private insurance companies or self-insured by the Social Security Administration (used herein as an example but intended to encompass the like). If self insured, it may be self-insured through the establishment of a special fund or reserve or the risk can be borne by the system in some other fashion. The Social Security Administration might purchase insurance to indemnify all or a portion of the risk. If insured by private insurance companies, a group policy might be used. Benefits may be deferred until normal retirement or be payable at a special early retirement date. It is possible that both current and deferred benefits may be offered. Current and or deferred benefits might be linked to other social security disability benefits or may be calculated and funded separately.

The existing Social Security Administration computer software system(s) doesn't administer (record, process, measure, facilitate, manage, etc.) disability benefits based upon individual social security retirement accounts because the system doesn't maintain individual retirement account records at all. In fact, currently no known computer software system exists to administer individual social security retirement accounts. A private study (see "Study Finds individual Account Costs Can Be Small" in Defined Contribution News Mar. 29, 1999 Vol. Vii, No. 7) was recently completed by Fred Goldberg, former Internal Revenue Service Commissioner, to assess the cost and feasibility of the creation of a computer system capable of administering approximately 130 million individual social security retirement accounts. While the study was optimistic regarding the cost and feasibility of a computer system to administer such accounts, no such system currently exists. More recently, the Employee Benefit Research Institute (EBRI) published a book titled "Beyond Ideology: Are Individual Social Security Accounts Feasible?" The book is the compilation of the writings and research of 24 distinguished authors. The entire book is dedicated to the questions of whether a system can be developed to administer individual retirement accounts for 148 million workers, and if so, to identify the logistics for implementing and administering such a gargantuan plan. Most of the authors agree that it is feasible, however, there is considerable disagreement as to the feasibility of certain approaches. Although the book is over 200 pages long and provides detailed lists and descriptions of complex tasks a system would have to perform to administer several possible plan designs, there is not a single mention of the need to administer disability benefits as an element of the individual accounts.

These aspects of our subsequently discussed invention are believed to be representative of the background of the invention so far as we know and subject to correction.

V. SUMMARY OF THE INVENTION

An object of the present invention is to address the issues of discussed above with improved computer support.

More particularly, it is an object of the present invention to provide a method, apparatus, article of manufacture, data structures, and inherent and necessary intermediates of a computer system to support disability benefits or coverage to be offered to individual IRA participants with payment of disability benefits deferred until retirement or early retirement.

It is an other object of the present invention to enable disability issuing insurance carriers, mutual fund companies, other IRA providers and the Social Security Administration or an entity performing administration on behalf of the Social Security Administration, a digital system to perform data processing, calculation of coverage and or benefits, premium, and/or other consideration, record keeping and other requisite functions attendant to offering and administering group or individual disability insurance or benefits protecting retirement benefits under IRA plans and or individual social security retirement accounts (both internal and external to the plan).

It is an other object of the present invention to provide fully automated digital importing and exporting capabilities, allowing data to be quickly imported, processed and exported in any system format.

It is an other object of the present invention to provide an automated means calculating individual benefits or coverage and premium amounts according to the differing criteria and methodology of any issuing carrier, mutual fund company, or other IRA provider and or Social Security Administration or an entity performing administration on behalf of the Social Security Administration.

It is an other object of the present invention to provide an automated means tracking initial and ongoing compliance of the disability benefits or coverage under applicable state and federal law.

It is an other object of the present invention to provide disability issuing insurance carriers, mutual fund companies, and other IRA providers and the Social Security Administration or an entity performing administration on behalf of the Social Security Administration, a single digital system capable of performing all functions attendant to offering and administering the benefit or coverage—irrespective of whether the benefit or coverage is contributory, non-contributory, voluntary, or mandatory.

It is an other object of the present invention to provide disability issuing insurance carriers, mutual fund companies and other IRA providers, and or Social Security Administration or an entity performing administration on behalf of the Social Security Administration, a digital system capable of performing all functions attendant to offering and administering the benefits or coverage—irrespective of whether coverage is paid for on a voluntary basis or mandatory basis.

It is an other object of the present invention to provide automated premium, contribution or other consideration calculations based upon disability benefit payments being made payable either at the time of disability or at a later time (e.g., early or normal retirement or at the death of the participant).

It is an other object of the present invention to provide an automated means tracking and reporting morbidity experience, mortality experience, and termination experience based upon any combination of in force business desired by carrier, mutual fund company, other IRA provider, Social Security Administration, or an entity performing administration on behalf of the Social Security Administration.

It is an other object of the present invention to provide an automated means providing (or supporting providing) benefits or coverage internal to the IRA or individual social security retirement account or external to the IRA or individual social security retirement account.

It is an other object of the present invention to provide an automated method of creating a paid-up (pre-paid) certificate or policy to individuals terminating premium payments or contributions for benefits or coverage.

It is an other object of the present invention to provide automated tracking on a daily or periodic basis of unused premiums or contributions and to provide automated reporting of any premium refunds due to participants who terminate benefits or coverage.

It is yet another object of the present invention to provide a method, apparatus, article of manufacture, and data structures for a disability insurance or benefit computer system to receive data on an automated basis from parties that perform plan record keeping for retirement plans on behalf of sponsoring employers or the Social Security Administration.

It is yet another object of the present invention to provide a method, apparatus, article of manufacture, and data structures for a disability insurance or benefit computer system to deliver data to the record keepers on an automated basis.

It is yet another object of the present invention to provide a method, apparatus, article of manufacture, and data structures for a disability insurance or benefit computer system to perform unused or unearned premium or contribution calculations on a daily basis for each covered defined contribution plan participant and calculates applicable premium refunds and reserves for a person terminating benefits or coverage.

It is yet another object of the present invention to provide a method, apparatus, article of manufacture, and data structures for a disability insurance or benefit computer system to calculate disability amounts due in the event of the disability of a covered participant and provide amount to the insurer, mutual fund companies, other IRA providers and the Social Security Administration or an entity performing administration on behalf of the Social Security Administration on an automated basis.

It is yet another object of the present invention to provide a method, apparatus, article of manufacture, and data structures for a disability insurance computer system to automatically create a pre-paid certificate or policy (either printed hard copy or digital extracts) for each plan participant who terminates plan participation or premium payments or contributions prior to the final day of the benefits plan or policy year.

It is still another object of the present invention to provide a method, apparatus, article of manufacture, and data structures for a disability insurance or benefit computer system to automatically import a participant census in any type of digital extract from another computer system, and convert into any type of digital extract required by a different party (e.g., receive an ASCII fixed width file from a record keeper and convert it into an ASCII delimited file for the insurance carrier providing insurance).

It is yet another object of the present invention to provide a method, apparatus, article of manufacture, and data structures for a disability insurance or benefit computer system to calculate premium or contribution rates to insure against lost retirement benefits under IRA plans and individual social security retirement accounts irrespective of whether coverage is provided under a group policy or an individual policy.

It is yet another object of the present invention to provide a method, apparatus, article of manufacture, and data structures for a disability insurance or benefits computer system to calculate premium or contribution rates to insure against lost retirement benefits under IRA plans and individual social security retirement accounts irrespective of whether coverage is insured directly, self-insured, partially self-insured, reinsured or partially reinsured.

It is still a further object of the present invention to provide a method, apparatus, article of manufacture, and data structures for a disability insurance or benefits computer system to calculate premium or contribution rates to insure against lost retirement benefits under IRA plans and individual social security retirement accounts irrespective of whether benefits are payable at the time of disability or deferred to a predetermined date (e.g., normal or early retirement).

It is still a further object of the present invention to provide a method, apparatus, article of manufacture, and data structures for a disability insurance or benefit computer system to automatically provide morbidity experience, mortality experience, termination experience, reserves and reports to IRA plan sponsors, insurers and the Social Security Administration or an entity performing administration on behalf of the Social Security Administration based upon any combination of the covered or insured population.

These and other objects of the present invention are carried out by a digital system performing the digital signal processing for generating output useful in supporting and/or administrating disability benefits or coverage for participants of all types of retirement plans maintaining individual retirement accounts and to perform every aspect of ongoing administration of such coverage or benefits.

The computer system used to enable issuing insurance carriers, mutual fund companies, other IRA providers and the Social Security Administration to offer disability coverage or benefits to the participants of IRA plans or the individual social security retirement accounts. The computer system in an extremely robust environment and with features and automated capabilities to allow any combination of premium payment or contribution sources and any combination of benefit payment timing and recipients. Our computer system allows an issuing insurance carrier, mutual fund company and other IRA providers to offer disability products or benefits to the majority of Americans dependent upon IRA plans for part of their retirement benefits.

The computer system also includes features and automated capabilities to allow any combination of premium payment, contributions, reserve contributions, accrued liability calculations, and reserve amounts to be recorded in connection with individual social security retirement accounts.

The computer system is structured to calculate individual disability coverage or benefit amounts for individual social security retirement account plan participants must be capable of receiving participant census and contribution data from record keeping systems responsible for collecting such data or must be incorporated into the existing recode keeping systems containing such data. If the computer system cannot effectively interface with record keeping systems, the Social Security Administration or an entity performing administration on behalf of the Social Security Administration is required to manually enter all the required data necessitating extra work, expense and inconvenience.

One example of the inadequacy of prior computer systems revolves around the system's ability or inability to track pre-disability assets separately from post-disability assets. Many disability carriers, mutual fund companies, other IRA providers and the Social Security Administration or an entity performing administration on behalf of the Social Security Administration will require that a portion of disability benefits be inaccessible to disabled participants until retirement. Under IRC 408, IRA plans must allow disabled participants to access their plan benefits early in the event of certain qualifying hardships (this usually includes disability). While it is impossible to know at this time, Individual Social Security Retirement Accounts, if created in the U.S. too, may include similar provisions. If benefits are paid into or accrued within an IRA plan, or individual social security retirement accounts at the time of disability and the record keeper can not account for them (along with investment earnings) separately from the pre-disability asset and subsequent earnings, than some means of separation must be provided. One solution for IRAs is to direct disability payments into an annuity external to the IRA plan. Conventional disability insurance computer programs were not designed to interact with annuity providers on an automated basis. Our system was structured to address this need.

There are several additional features that prior disability insurance computer systems did not take into consideration because of they were not designed with the special needs and requirements of IRA plans or individual social security retirement accounts in mind. Our system was specifically designed to accommodate the special needs of offering disability protection or benefits against contributions to IRAs and individual social security retirement accounts. A comprehensive description of these features and capabilities is included in the system description.

More particularly, the invention includes a method for using a digital electrical apparatus programmed for signal processing in accordance with the method including: providing a digital electrical computer apparatus comprising a first digital electrical computer having a processor, the processor electrically connected to store and receive electrical signals at a memory device, to receive electrical signals representing the input information from an input device, to convert output electrical signals into printed documentation at a printer, wherein the processor is programmed to control the first digital electrical computer to receive the input electrical signals and to process the input electrical signals to produce the output electrical signals, including: receiving the input information at the input device, the input information including amounts of contribution for participants in a IRA plan; and or participants in individual social security retirement accounts processing the input electrical signals from a first format such that for each of the participants, a respective coverage amount is computed by using the contributions to the IRA plan and or individual social security retirement account; processing the input electrical signals such that for each of the coverage or benefit amounts, a corresponding insurance premium or other contribution is calculated; generating a billing or contribution statement at the printer from the output electrical signals, the output electrical signals representing billing or contribution statement data including the participants coverage amounts and the insurance premiums and or contributions; storing the billing or contribution statement data; recalling the stored billing or contributions statement data, and for each of the participants in the IRA plan and or individual social security retirement account terminated prior to an end of a year for the respective plans, using the stored billing or contribution statement data to compute an amount of consideration to be given the participant terminated; and generating a record at the printer from further output electrical signals representing a confirmation of the consideration. Further, the invention includes a multi-computer system incorporating the foregoing. A second digital electrical computer is programmed for storing the electrical signals in a second memory, the electrical signals representing the input information in a second format exported to the input device connected to the first digital electrical computer; the method further comprising the steps of: converting the second format into the first format to enable the step of receiving the input information to be carried out by reading the exported electrical signals from the second digital electrical computer; and, wherein the step of storing is carried out by converting the first format into the second format for exporting the billing or contribution statement data to the second digital electrical computer for storage at a second memory electrically connected to the second digital electrical computer.

The invention can thus be viewed as a digital system capable of performing calculations required to illustrate and offer disability coverage or benefits to participants of all types of IRA plans and individual social security retirement account plans and to perform every aspect of ongoing administration of such coverage or benefits. The system is capable of performing calculations, illustrations and ongoing administrative functions regardless of whether coverage or benefits are provided through a group insurance contract, through individual policies, through a self-insured plan, through a partially self-insured plan, and through a reinsured plan. The system performs these functions irrespective of whether the cost of coverage (premium or other consideration) is paid for by the participant, paid for by an employer, is shared by participant and employer, is paid by the insurer, the mutual fund company, the IRA provider, paid through FICA withholdings, or from other federal taxes. The timing of benefits paid in the event of the disability of a covered participant may either occur at the time of disability or may be deferred until normal or early retirement or paid to a beneficiary in the event of the death of the participant. The system manages all requisite records irrespective of the timing of benefit payments. The system is structured to perform comprehensive functions attendant to various mechanical and or structural approaches for providing coverage or benefits and calculates premium cost or other consideration, including:

1. Premiums or other consideration are paid within an IRA plan with disability benefits payable to the IRA plan, including to an annuity contract within the plan.
2. Premiums or other consideration are paid within an IRA plan with disability benefits payable directly to the disabled participant or named beneficiary at the time of disability or deferred until retirement early retirement or the death of the participant.
3. Premiums or other consideration are paid within an IRA plan with disability benefits payable to a group or individual annuity outside of the IRA plan.
4. Premiums or other consideration are paid within an IRA plan with disability benefits payable to a trust which may hold funds in various investments including group or individual annuities.
5. Premiums or other consideration are paid outside an IRA plan with disability benefits payable to a separate IRA plan.
6. Premiums or other consideration are paid outside an IRA plan with disability benefits payable to the disabled participant or named beneficiary at the time of disability or deferred until retirement early retirement or the death of the participant.

7. Premiums or other consideration are paid outside an IRA plan with disability benefits payable to a group or individual annuity outside of the IRA plan.
8. Premiums or other consideration are paid outside an IRA plan with disability benefits payable to a trust which may hold funds in various investments including group or individual annuities.
9. Premiums or other consideration are paid within a Internal Revenue Code (IRC) Section 125 Welfare Benefit Plan trust with disability benefits payable to an IRA plan, including to an annuity contract within the trust.
10. Premiums or other consideration are paid in a IRC Section 125 Welfare Benefit Plan trust with disability benefits payable to the disabled plan participant or named beneficiary at the time of disability or deferred until retirement, early retirement or the death of the participant.
11. Premiums or other consideration are paid in a IRC Section 125 Welfare Benefit Plan trust with disability benefits payable to a group or individual annuity outside of the IRA plan.
12. Premiums or other consideration are paid in a IRC Section 125 Welfare Benefit Plan trust with disability benefits payable to a trust which may hold funds in various investments including group or individual annuities.
13. Premiums or other consideration are paid in a IRC Section 501(c)(9) Welfare Benefit Plan with disability benefits payable to an IRA plan, including to an annuity contract within the IRA.
14. Premiums or other consideration are paid in a IRC Section 501(c)(9) Welfare Benefit Plan with disability benefits payable to the disabled plan participant or named beneficiary at the time of disability or deferred until retirement, early retirement or the death of the participant.
15. Premiums or other consideration are paid in a IRC Section 501(c)(9) Welfare Benefit Plan with disability benefits payable to a group or individual annuity outside of the trust.
16. Premiums or other consideration are paid in a IRC Section 501(c)(9) Welfare Benefit Plan with disability benefits payable to a trust which may hold funds in various investments including group or individual annuities.
17. Premiums or other consideration are paid in a IRC Section 419 (e) Welfare Benefit Plan with disability benefits payable to an IRA plan, including to an annuity contract within an IRA.
18. Premiums or other consideration are paid in a IRC Section 419 (e) Welfare Benefit Plan with disability benefits payable to the disabled plan participant or named beneficiary at the time of disability or deferred until retirement, early retirement or the death of the participant.
19. Premiums or other consideration are paid in a IRC Section 419 (e) Welfare Benefit Plan with disability benefits payable to a group or individual annuity outside of the IRA.
20. Premiums or other consideration are paid in a IRC Section 419 (e) Welfare Benefit Plan with disability benefits payable to a trust which may hold funds in various investments including group or individual annuities.
21. Premiums or other consideration are paid by a mutual fund company or other IRA provider on behalf of a common group of IRA participants.
22. Premiums or other consideration are absorbed by a mutual fund company or other IRS provider on behalf of a common group of IRA participants.
23. Premiums or other consideration are paid for from a portion of FICA taxes for participants of individual social security retirement accounts.
24. Premiums or other consideration are paid from taxes other than FICA tax for participants of individual social security retirement accounts.

When premiums are paid within any of the qualified Welfare Benefit plans identified above, the system is capable of performing certain tasks and calculations that otherwise may not be required—including calculating imputed income for each plan participant. Imputed income is calculated according to net premiums paid (taking into consideration any refunds or other adjustments during the calendar year) and when applicable will include any employer bonus to cover all or a portion of the tax expense for imputed income. Additionally, the system is able to automatically create IRS 1099 Forms to report imputed income to each participant yearly. Alternatively, the system can provide digital extracts in multiple system formats or hardcopy to allow another party to prepare the 1099 Forms (i.e., employer, Welfare Benefit Plan record keeper, payroll service, insurance company, disability plan TPA, or other authorized party).

In the event the policy or benefit is portable (the employee can optionally continue to pay premiums and retain coverage after terminating employment with an original sponsoring employer), the system will automatically create the billing documents to be mailed to each terminated employee electing to continue coverage or benefits. The system can generate the actual hard copy billing statement for direct mailing or provide digital extracts in multiple system formats to provide the billing electronically via the Internet or to allow another party to prepare and or forward the bill (i.e., insurance company, disability plan TPA, or other authorized party).

The system creates the plan level billing statement for all plan participants in a sponsored Plan to include the total plan premium cost on any billing cycle required for a given plan (i.e., annually, semi-annually, quarterly, monthly, bi-monthly, weekly or other billing cycle). The system automatically provides digital extracts in multiple system formats or hard copy to allow another party (i.e., employer, Welfare Benefit Plan, record keeper, payroll service, insurance company, disability plan TPA, mutual fund company or other party) to prepare and deliver the billing to the appropriate party (i.e., employer, plan trustee, payroll service or participant).

Even more particularly, the present invention relates to an improved digital electrical computer-based system configured to address the foregoing objects, including a machine (programmed computer), methods for making and using it, products produced by the method, data structures, and necessary intermediates, collectively referenced herein after as the method (for the sake of brevity). The present invention includes a computer-aided method of computing coverage benefit costs for a retirement plan having respective accounts for individuals, the method comprising the steps of: converting input plan contribution data for at least one of said accounts of said retirement plan into corresponding input digital electrical signals; manipulating the input digital electrical signals in computing the coverage benefit costs for the at least one of said accounts according to said retirement plan; and producing output at an output device the output including the computed coverage benefit costs for the at least one of said accounts of said retirement plan.

In any of the embodiments discussed herein, the computing can include computing the coverage benefit costs for the at least one of said individual accounts of said retirement plan according to an individual social security account.

In any of the embodiments discussed herein, the computing can include computing the coverage benefit costs for the at least one of said individual accounts of said retirement plan, said plan being qualified under Internal Revenue Code Section 408.

In any of the embodiments discussed herein, the computing can include computing the coverage benefit costs for the at least one of said individual accounts of said retirement plan, said plan being qualified under Internal Revenue Code Section 408 wherein said individual account qualifies as a ROTH IRA.

In any of the embodiments discussed herein, the computing can include computing the coverage benefit costs for the at least one of said individual accounts of said retirement plan, said plan being qualified under Internal Revenue Code Section 401(a).

In any of the embodiments discussed herein, the computing can include computing the coverage benefit costs for the at least one of said individual accounts of said retirement plan, said plan being qualified under Internal Revenue Code Section 401(a) in which there are designated plus accounts for qualified plus contributions.

In any of the embodiments discussed herein, the computing can include computing the coverage benefit costs for the at least one of said individual accounts of said retirement plan, said plan being qualified under Internal Revenue Code Section 403(b).

In any of the embodiments discussed herein, the computing can include computing the coverage benefit costs for the at least one of said individual accounts of said retirement plan, said plan being qualified under Internal Revenue Code Section 457.

In any of the embodiments discussed herein, the computing can include computing the coverage benefit costs for at least two of said individual accounts of a single participant of at least two said retirement plans, said plans being qualified under Internal Revenue Code Section 401(a).

In any of the embodiments discussed herein, the computing can include computing the coverage benefit costs for benefits commencing at the earliest of retirement, early retirement, or the death of the participant, and the computing also includes computing the coverage benefit costs for the at least one of said individual accounts of said retirement plan according to an individual social security account.

In any of the embodiments discussed herein, the computing can include computing the coverage benefit costs for benefits commencing at the earliest of retirement, early retirement, or the death of the participant, and the computing also includes computing the coverage benefit costs for the at least one of said individual accounts of said retirement plan, said plan being qualified under Internal Revenue Code Section 408.

In any of the embodiments discussed herein, the computing can include computing the coverage benefit costs for benefits commencing at the earliest of retirement, early retirement, or the death of the participant, and the computing also includes computing the coverage benefit costs for the at least one of said individual accounts of said retirement plan, said plan being qualified under Internal Revenue Code Section 408 wherein said individual account qualifies as a ROTH IRA.

In any of the embodiments discussed herein, the computing can include computing the coverage benefit costs for benefits commencing at the earliest of retirement, early retirement, or the death of the participant, and the computing also includes computing the coverage benefit costs for the at least one of said individual accounts of said retirement plan, said plan being qualified under Internal Revenue Code Section 401(a).

In any of the embodiments discussed herein, the computing can include computing the coverage benefit costs for benefits commencing at the earliest of retirement, early retirement, or the death of the participant, and the computing also includes computing the coverage benefit costs for the at least one of said individual accounts of said retirement plan, said plan being qualified under Internal Revenue Code Section 401(a) in which there are designated plus accounts for qualified plus contributions.

In any of the embodiments discussed herein, the computing can include computing the coverage benefit costs for benefits commencing at the earliest of retirement, early retirement, or the death of the participant, and the computing also includes computing the coverage benefit costs for the at least one of said individual accounts of said retirement plan, said plan being qualified under Internal Revenue Code Section 403(b).

In any of the embodiments discussed herein, the computing can include computing the coverage benefit costs for benefits commencing at the earliest of retirement, early retirement, or the death of the participant, and the computing also includes computing the coverage benefit costs for the at least one of said individual accounts of said retirement plan, said plan being qualified under Internal Revenue Code Section 457.

In any of the embodiments discussed herein, the computing can include computing the coverage benefit costs for benefits commencing at the earliest of retirement, early retirement, or the death of the participant for at least two of said individual accounts of a single participant of at least two said retirement plans, said plans being qualified under Internal Revenue Code Section 401(a).

In any of the embodiments discussed herein, converting input plan contribution data can include converting input FICA tax data.

In any of the embodiments discussed herein, converting input plan contribution data can include converting input Federal Old Age, Survivors, and Disability Insurance tax data.

In any of the embodiments discussed herein, converting input plan contribution data can include converting input Federal Old Age, Survivors Insurance tax data.

Representative of a preferred embodiment of the invention, please consider the following brief description of the drawings set forth below.

VI. BRIEF DESCRIPTION OF THE DRAWINGS

FIG. 25 is a representation of a screen produced on a visual output device in accordance with the present invention.

FIG. 38 is a representation of a screen produced on a visual output device in accordance with the present invention, the screen including output for incorporating into printed output at a hard copy output device.

VII. DETAILED DESCRIPTION OF A PREFERRED EMBODIMENT

Figure 1:
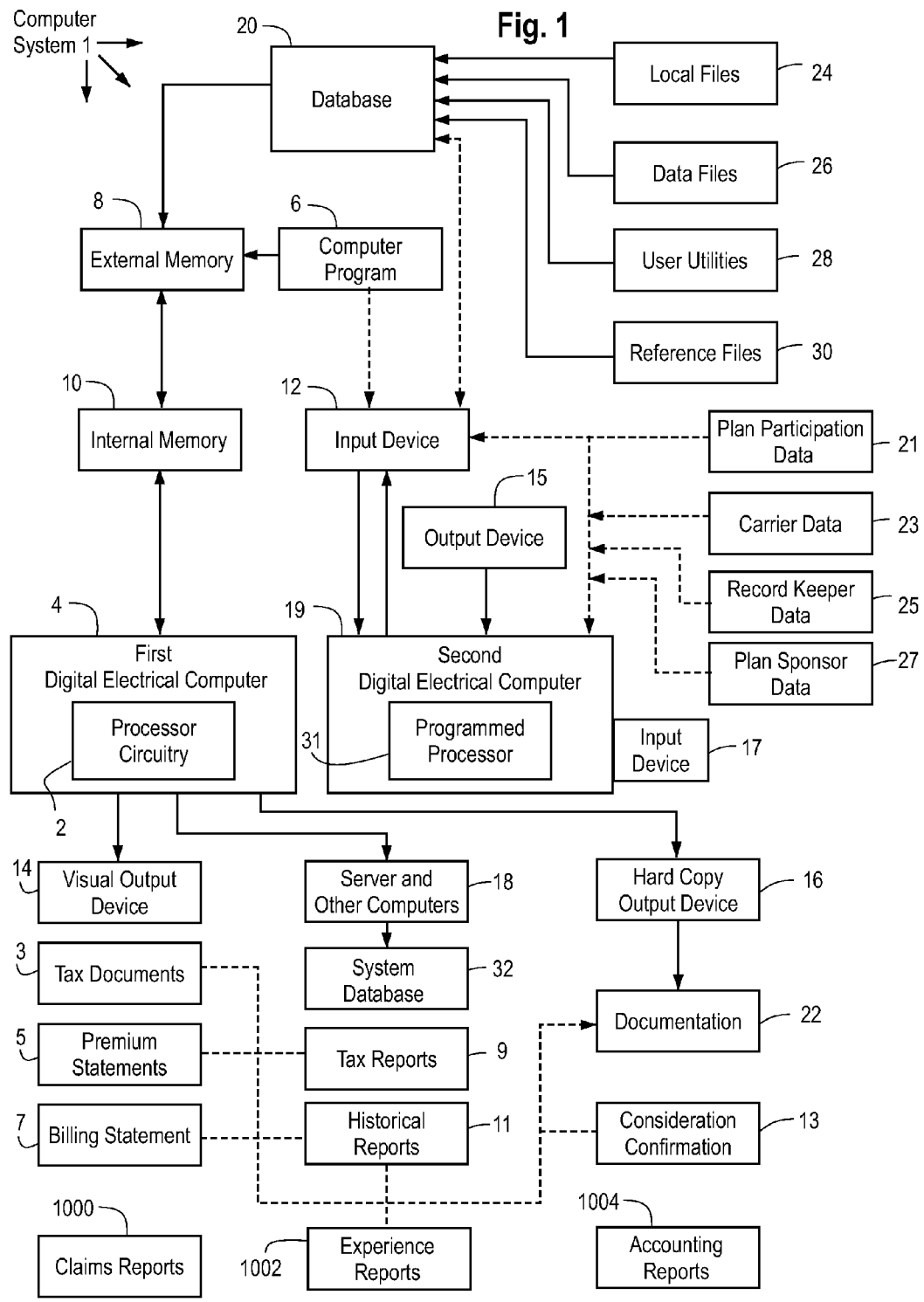
FIG. 1 is a representation of an apparatus in accordance with the present invention.

As a preferred embodiment exemplifying the invention, begin by considering FIG. 1, which shows, in block diagram form, the computer-based elements which can be utilized to implement the present invention. The present invention involves computer apparatus system 1, which includes processor circuitry 2 in a first digital electrical computer 2, which can for example be at a workstation, PC, etc. For flexibility, it is preferable to have the processor circuitry 2 formed by means of a computer program programming programmable circuitry, i.e., programming the computer (processor) logic circuitry. The programming can be carried out with a computer program (or programs) 6, which for flexibility should be in the form of software stored in an external memory 8, such as a diskette, hard disk, virtual disk, or the like. (The virtual disk is actually an extended internal memory 10 which may assist in speeding up computing.) A diskette approach is optional, but it does provide a useful article of manufacture for inputting or storing data structures or the host software. Of course storing the computer program 6 in a software device is optional because it is well known in the art that the same result can be obtained by storing the computer program in a hardware storage device, e.g., by burning the computer program 6 into a ROM.

An embodiment could equivalently be carried out in hardware, though this is not recommended as it is an inflexible approach. Accordingly, a hardware implementation is described here for exemplary purposes, but a software approach is preferable for flexibility. Of course it is well known that a computer program can be stored in hardware by many approaches, not the least of which is burning it into a ROM. More sophisticated than burning a ROM, but also entirely conventional, is to use techniques to translate the computer program 6 into an ASIC or a chip that will carry out the invention in an equivalent manner, and in fact with equivalent circuitry to that formed by programming programmable computer circuitry. It is all just digital electrical circuitry processing digital electrical signals, transforming them to output different electrical signals.

An internal memory 10 works in cooperation with the external memory 8. An input device 12 could be a keyboard, scanner, modem, disk drive, mouse, or equivalent means for a user to input the data discussed below (which can alternatively be input indirectly via another computer 18 or 19 linked by modem or network and server computer 4—or data can alternatively be read from a disk or other memory media having data produced thereon by such a digital electrical computer). A visual display unit 14 can be employed for a visual representation, and a hard copy output device 16, such as a laser printer, bubble jet printer, dot matrix printer or the like, can be employed for producing hard copy output documentation 22. The documentation can include, for example, tax documents 3, premium statements 5 or other consideration confirmations 13, billing statements 7, tax reports 9, historical reports 11, experience reports 1002, claims reports 1000, accounting reports 1004, and consideration confirmations 13 (discussed further below).

Note that output electrical data can also be stored to memory 8 in database 20, moved to the server and other computers 18, or conveyed to an output device 15, such as a modem (which could be the same modem as the input device 12).

Local files 24, data files 26, user utilities 28, and reference files 30 are shown in FIG. 1 as located in database 20, though these are mostly system files available to the System Database 32.

Note too how there are two routs for certain data to be conveyed into the computer 4. The first way is to take such information as plan participation data 21, carrier data 23, record keeper data 25, and plan sponsor data 27 and input the information at the input device 12, e.g., scan hard copy, type in at keyboard, etc. In this case, input device 12 receives input information and, in response, changes the information into (input) electrical signals corresponding to the input information. A second way is to do the same at an input device 17 connected to some second digital electrical computer having a programmed processor 31.

The present invention can be carried out by using a Client Server 18 running in Microsoft Windows 95, Windows 98, Windows 2000 and Microsoft Windows NT. Presently, there are two separate versions of the system: (1) a development version; and (2) a production version.

A development version of program 6 is used for system development, bug fixes, additions and enhancements. There is a front-end (user interface) designed with Microsoft Access 97 and a back-end (database area) is also designed with Microsoft Access 97. Using Microsoft Access 97 as a back-end for development purposes enables a programmer to take full advantage of the flexibility offered by Microsoft Access 97 or Microsoft Access 2000 to make changes easily at the back-end level.

A production version of program 6 is for administration of disability policies. As above, the front-end (user interface) in designed with Microsoft Access 97 and the back-end (database area) is designed with Microsoft SQL Server version 7.0. Note that the front end may also be designed in another program such as ASP. In order to incorporate changes made in the development version to the production version, we use Microsoft's upsizing wizard that converts the Microsoft Access 97 back-end into Microsoft SQL Server version 7.0.

Figure 2:
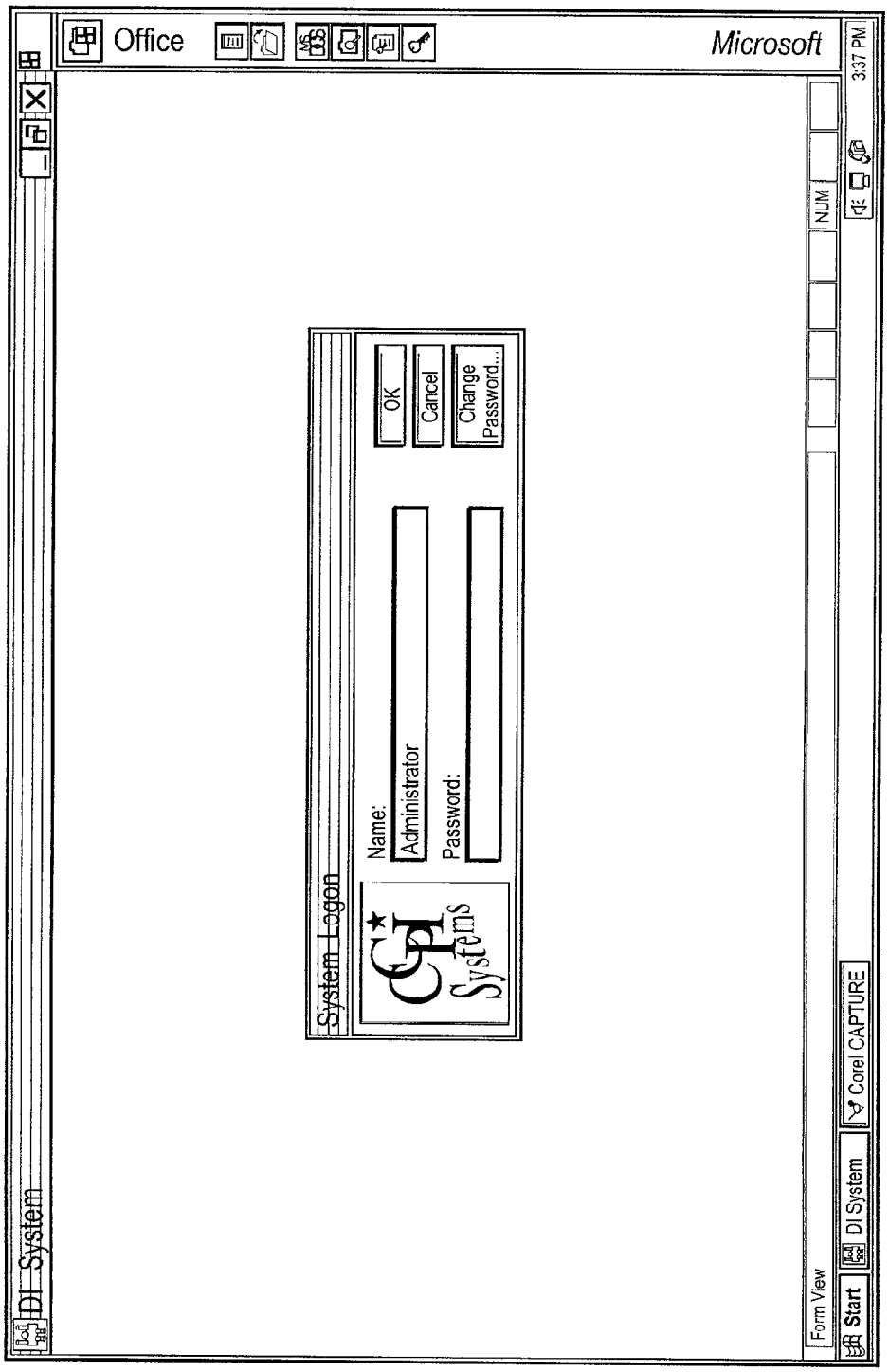
FIG. 2 is a representation of a screen produced on a visual output device in accordance with the present invention.

Consider now the administrative process of the present invention, commencing with a User Log On Screen in FIG. 2. The user logs onto the system 1 by entering a USERNAME and a PASSWORD to Screen in FIG. 2. User names and passwords are necessary to introduce several levels of security in the system. Each level of security corresponds to a user group and each user belongs to a user group. Therefore each user group has its own level of security. One of the groups may be called <USERS>, system administrators may not want members of the USERS group to be able to access certain screens or modify specific information. This is very helpful to prevent USERS from modifying data created by the members of another group. The user also has the option to EXIT the System 1 or to change his/her password. The user clicks on an OK button to get to the Main Menu (Screen in FIG. 3).

The user can create a new external system, which typically is the first step in using the System 1. In order to set up a new case, a listing of participants with all pertinent underwriting and administration-related information (a census file) must be entered into the System 1 via Input Device 12. This information can be input manually, scanned from hard copy or imported. Most frequently the information will be imported because it is more convenient, faster, and far more accurate than the other methods. In order to make importing data available as often as possible, the System 1 is designed to accept input data no matter what source, system, or format is being used by the census file provider. Further, the System 1 allows for the user to easily add unlimited automated census file formats to a list of set import alternatives.

Before importing a new census, the user needs to define an import layout that describes the composition of the census file so that the system can successfully import the new census. From the Main Menu Screen in FIG. 3, the user clicks on the LIBRARIES command button to open up LIBRARIES Screen in FIG. 4. This Screen in FIG. 4 contains all the libraries (or data categories) available to System 1. The user double clicks on a SYSTEM library button to open up a SYSTEM LIST Screen in FIG. 5.

The user then creates a new external system. The System 1 can interact with an unlimited number of external systems. Within the System 1, the user creates external systems with their own properties and conversion tables. A conversion table is a set of codes that an external system will use for a specific database field. For example: the user may want to import a census from external system XYZ. The fields in the census can be as follows:

Social security number

Status.

Social security number is a universal field because a participant's social security number will not vary from external system to external system, whereas status is a system specific field. Each external system will likely use a different set of code for the status field. Therefore the System 1 needs to know what set of codes the external system is using so that it can convert them into its own code. Following the previous example, the external system may use <1> for active, <2> for terminated. The System 1 needs to know these codes so that it can convert them into its own code. The means by which the System 1 can convert all those code is a conversion table that matches external system's codes with the codes of System 1.

The use of conversion tables is critical because no external system will ever be required to comply with the codes of System 1, and information that might be extraneous or cause system errors will automatically be removed prior to being imported.

To add a new external system, the user clicks on a command button with the blank page icon (Screen in FIG. 5), and a new screen (not shown in the Figures) opens up where the user enters a name for the new external system, as well as a brief description. The user clicks on an EXIT command button (has a door with arrow icon) to add and return to the SYSTEM LIST Screen in FIG. 5 where the new external system has been added. The user selects the new external system and clicks on the EDIT command button (with the magnifying glass icon) to open up the SYSTEM INFORMATION Screen in FIG. 6.

Figure 7:
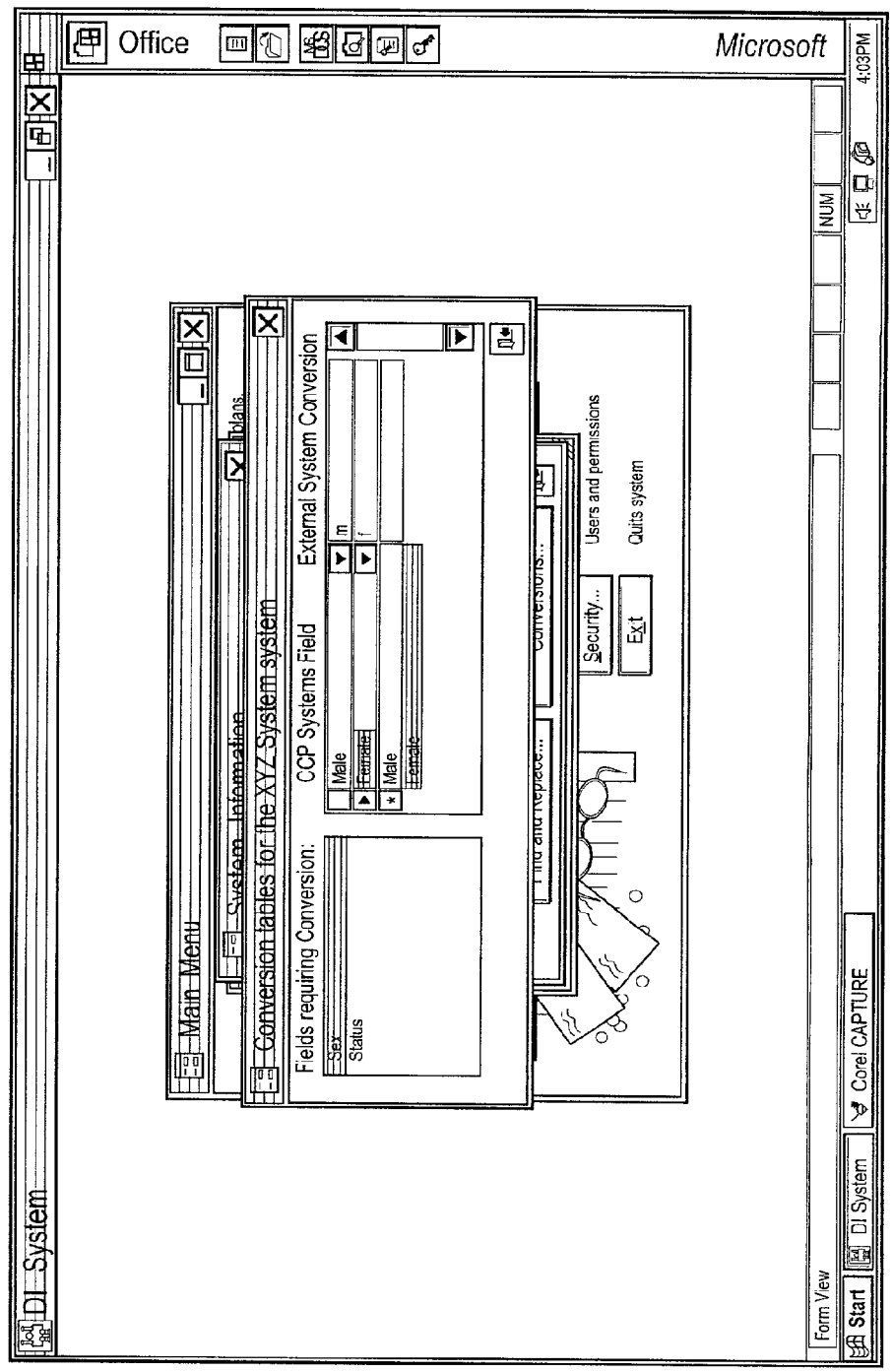
FIG. 7 is a representation of a screen produced on a visual output device in accordance with the present invention.

The user then needs to setup the conversion tables for the newly created external system. The user clicks on a CONVERSIONS command button and opens up a CONVERSION TABLES Screen in FIG. 7. The user selects a field requiring conversions on the left side of the Screen in FIG. 7 and enters the appropriate external system conversion on the right. Each selected field comes with a separate set of items requiring conversions. For example, the field SEX requires a conversion for <male> and <female>.

Figure 6:
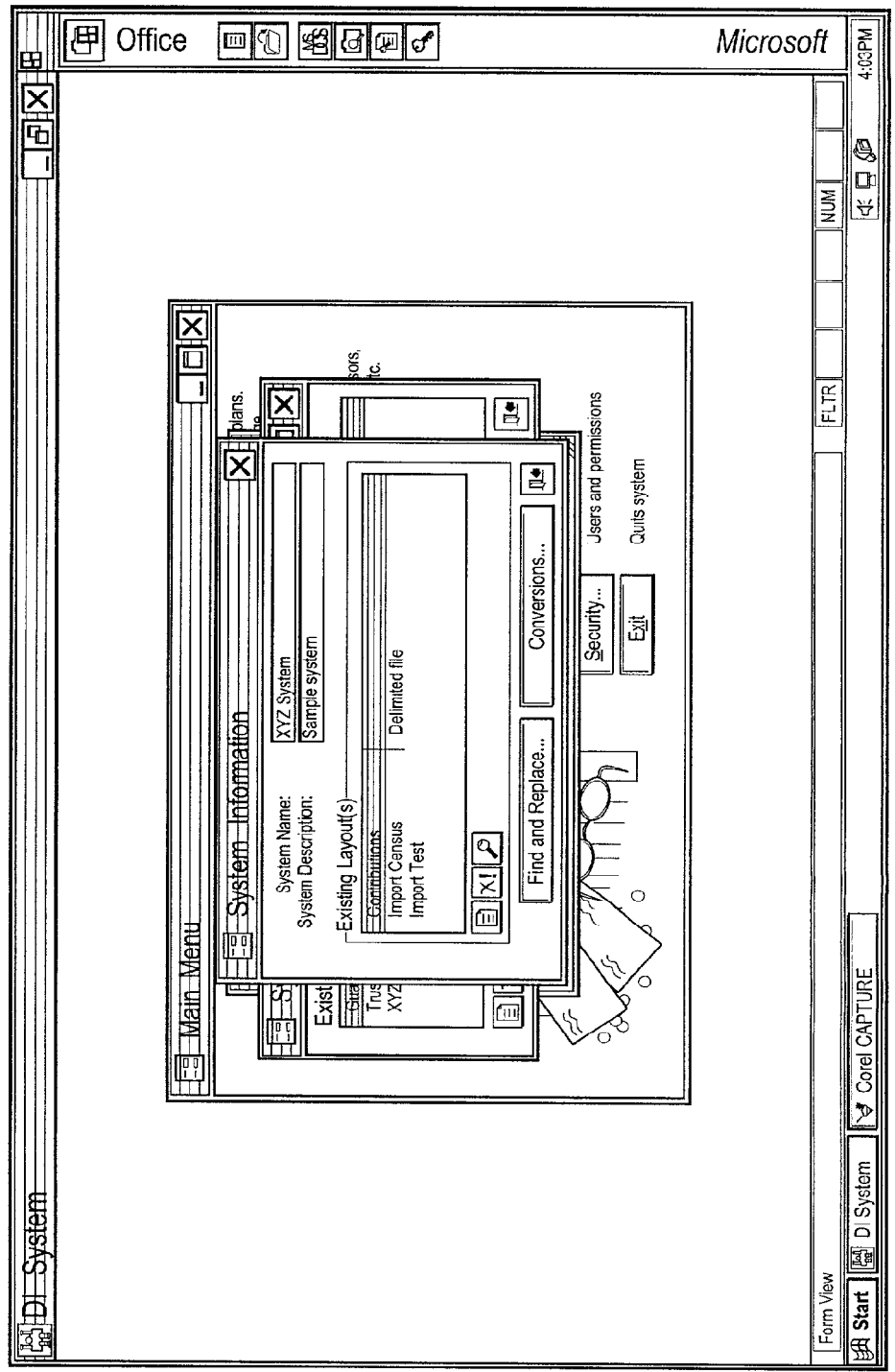
FIG. 6 is a representation of a screen produced on a visual output device in accordance with the present invention.

Once the conversions have been entered, the user clicks the EXIT button to return to the SYSTEM INFORMATION Screen in FIG. 6.

The user now clicks on a FIND AND REPLACE command button to replace certain unwanted strings in the file by other strings; for example, some when a date of retirement is expected for an insured but the insured has not retired yet, some external systems will indicate 00/00/0000 as a retirement date. By using the FIND AND REPLACE feature, the user can select to replace all <00/00/0000> strings by spaces. An unlimited number of FIND AND REPLACE activities can be programmed into the System 1.

Figure 8:
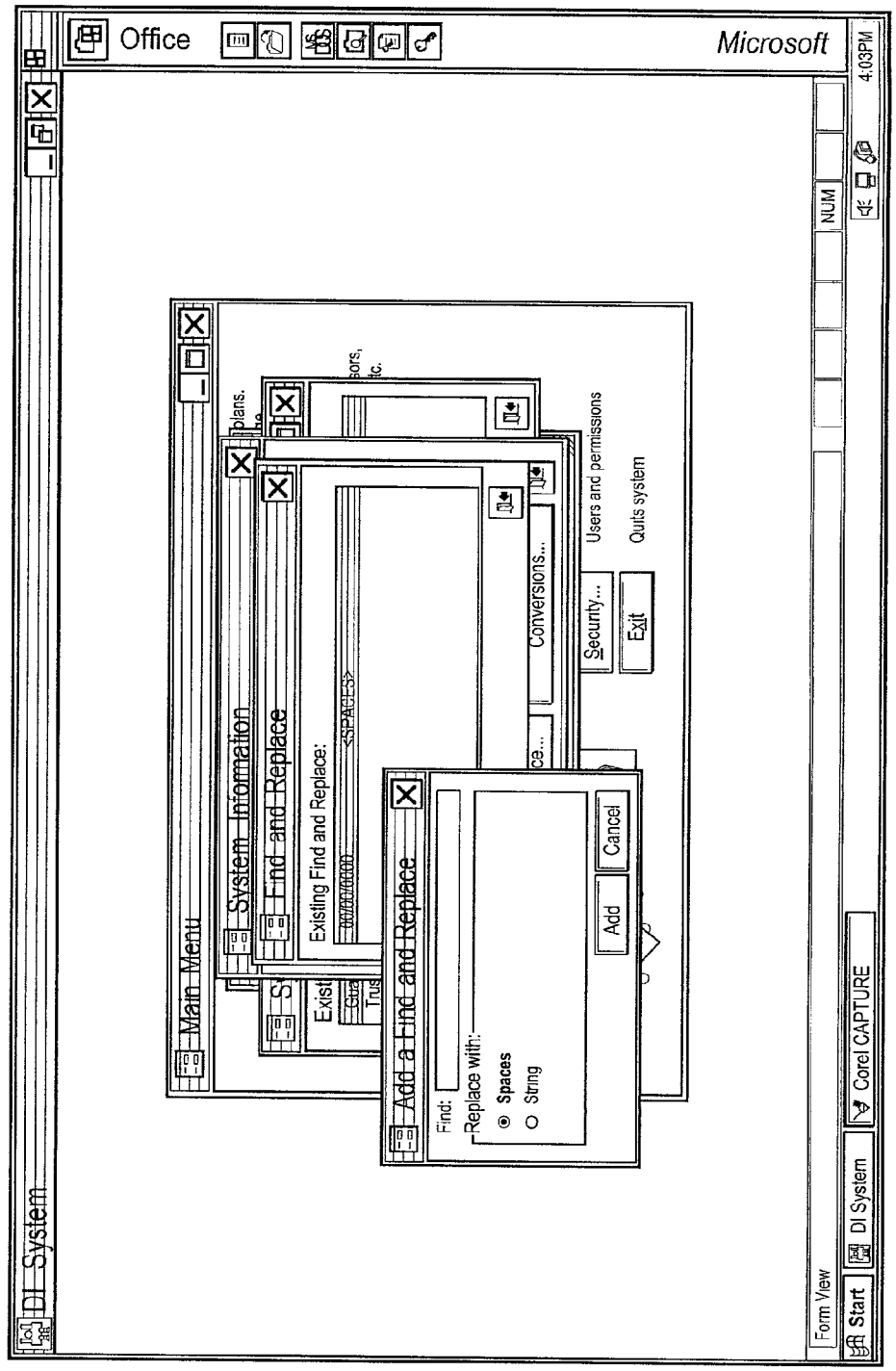
FIG. 8 is a representation of a screen produced on a visual output device in accordance with the present invention.

The FIND AND REPLACE Screen in FIG. 8 opens up, and the user enters the string to be searched, indicates whether he/she wants the string to be searched replaced by spaces or by a specific string. The user clicks on the EXIT command button and returns to the SYSTEM INFORMATION Screen in FIG. 6.

The user then creates a new import layout. Import layouts are custom definitions of the format and layout of a census file to be imported from an external system. Import layouts contain the footprints of the census file. When using import layouts, the user never has to require data in a specific layout from the external system. The user adds a new IMPORT LAYOUT by clicking on the command button with the blank page icon (Screen in FIG. 6), and a new screen (not shown in the figures) opens up where the user enters a name for the new IMPORT LAYOUT as well as a brief description. The user then clicks on the ADD button, and the new IMPORT LAYOUT is automatically added to the EXISTING LAYOUTS list box on the SYSTEM INFORMATION Screen in FIG. 6.

The user then clicks on the EDIT command button (with the magnifying glass icon). The LAYOUT DETAIL Screen in FIG. 9 opens up. In the FILE TYPE frame, the user can choose what type of file he/she is importing.

One of the key features of the System 1 is its ability to import ASCII delimited files and ASCII fixed width files. Generally, the user chooses the file format (delimited or fixed width) and then creates a layout that mirrors the file's layout. Instead of requiring specific layouts from external systems, the System 1 is taught how to read the import file regardless of its layout. Consider the following, example: the user may have just received the following file and needs to import it into the system:

Using the above layout, the System 1 will be able to read and import the file perfectly without ever requiring the external system to abide by any layout rules. Note that the last field is labeled <FILLER>, which tells the System 1 that this field is unwanted data.

Figure 9:
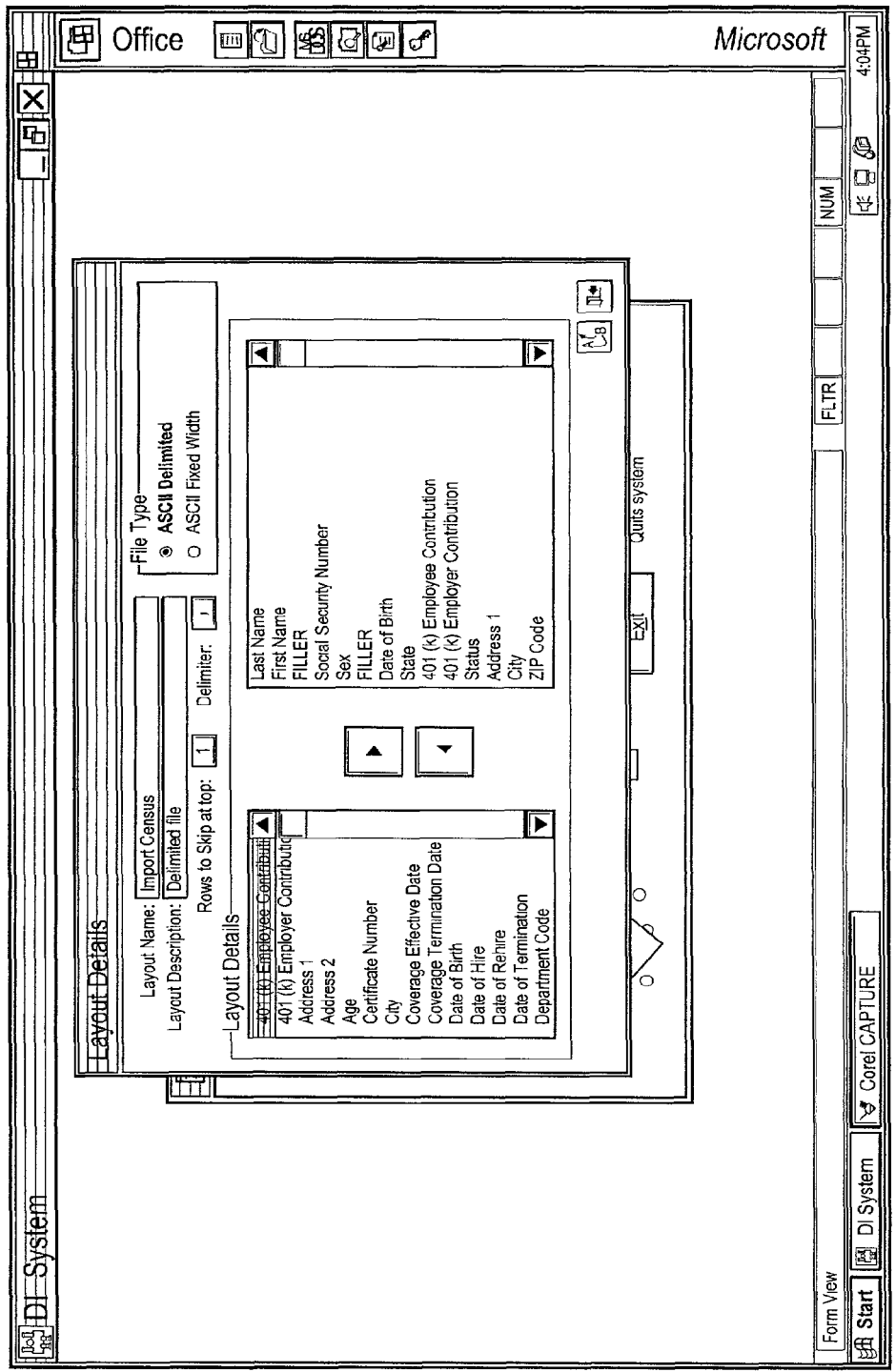
FIG. 9 is a representation of a screen produced on a visual output device in accordance with the present invention.
Figure 10:
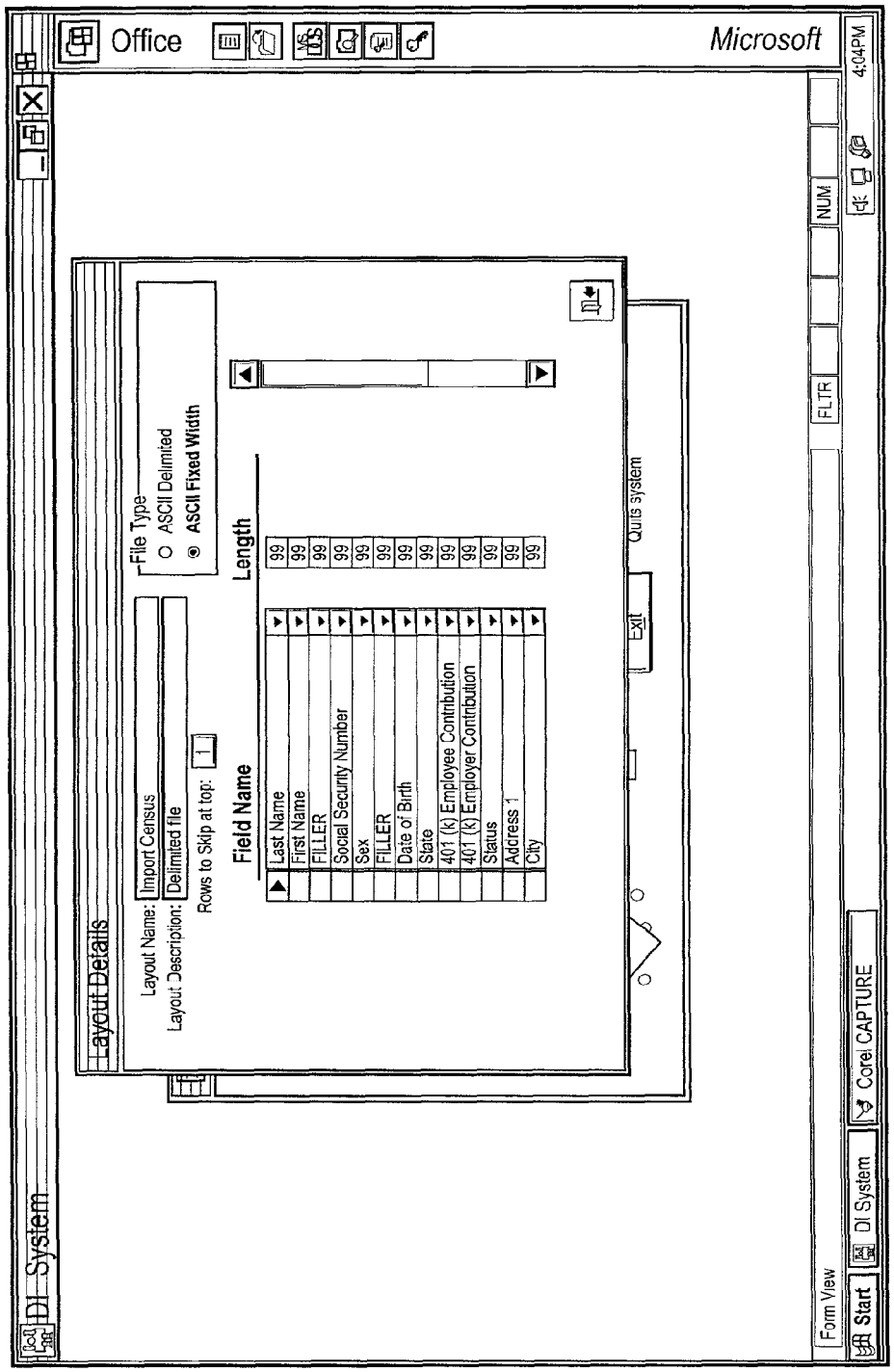
FIG. 10 is a representation of a screen produced on a visual output device in accordance with the present invention.

Note that the user's choice of the FILE TYPE determines which LAYOUT DETAIL Screen in FIG. 9 or 10 is displayed. If the user chooses the ASCII delimited FILE TYPE, the LAYOUT DETAIL Screen in FIG. 9 will display two list boxes: a field list library on a left containing all possible fields the user may import, and selected fields to import on the right. To add a field to the selected fields list box, the user selects the field he/she wants to add from the field list library on the left and then clicks on the ADD command button (with the arrow pointing to the right icon).

When clicking on the ADD command button, the System 1 will make sure that a field has the selected field to add has not already been selected. Because the user has selected an ASCII delimited file, the user will then enter a delimiter in a DELIMITER text box. The user also needs to specify whether he/she wants the System 1 to skip the first X rows when importing the file because sometime external systems include field names at the top of an ASCII file. The System 1 will then skip the first row (for example) and start importing data beginning at the second row.

If the user chooses the ASCII fixed width FILE TYPE, the LAYOUT DETAILS Screen in FIG. 10 displays a combo box and a text box for each field to be imported. To add a field to the selected fields list box, the user selects the field he/she wants to add from the pull down combo box, and the user must enter the length of the field because the user has selected a fixed width file type. As soon as a new field is selected from the pull down combo box, a new pull down combo box appears right below for a new field to be selected. When adding fields, the system will make sure that a field has the selected field to add has not already been selected. The user also needs to specify whether he/she wants the System 1 to skip the first X rows when importing the file because at times external systems may include field names at the top of an ASCII file.

Once the chosen IMPORT LAYOUT has been defined, the user clicks on an EXIT command button to return to the SYSTEM INFORMATION Screen in FIG. 6. The user then clicks on the EXIT command button to return to the SYSTEM LIST Screen in FIG. 5. The user then clicks on the EXIT command button to return to the LIBRARIES Screen in FIG.

| John | Doe | 000-00-0000 | 11 Park Avenue | New York | NY | 10034 | 4000 | 3A21 |
| Al | Facet | 999-09-0000 | 2 Place des Moulins | Albur | NJ | 06789 | 3000 | 23DEA |

The user will use LAYOUT DETAIL Screen in FIG. 9 or 10 to create a layout as follows:

| First Name | 5 |
| Last Name | 7 |
| Social Security Number | 11 |
| Address | 20 |
| City | 8 |
| State | 2 |
| Zip | 5 |
| Plan contribution | 4 |
| FILLER | 6 |

4. The user then clicks on the EXIT command button to return to the MAIN MENU Screen in FIG. 3.

The user can also import a new census. In order to import the census, the user clicks on the IMPORT command button located on the MAIN MENU Screen in FIG. 3. By clicking on the IMPORT command button, the user triggers the IMPORT WIZARD process that consists of five screens that will help the user in the import process.

The census will contain plan participant information including but not limited to the following fields:
Last Name
First Name
Middle Name
Middle Initial Status (active, terminated, disabled, Leave, Death, Retirement, Ineligible, suspended, not participating)
Date of Birth
Date of Hire
Date of Rehire
Date of Termination
Coverage Effective Date
Coverage Termination Date
Disability Date
Age
Sex
Social Security Number
Employee Code
Department Code
Certificate Number
W2 Wages
FICA
OASI
OASDI
Participant IRA Contribution
Participant Roth IRA Contribution
Participant Plan Contribution Amount
Participant Qualified Plus Contributions
Employer Plan Contribution Amount
Certificate Number
Address 1
Address 2
State
City
Zip
Country If the census has already been imported but some information may have changed (e.g., about the existing plan participants or new participants were added), then the system 1 will update its database 20 with the information that has changed (archiving old information) on the existing participants and add the new participants to its database 20.

When importing an existing census, the system 1 performs all the above checks as well as monitoring very closely data that changes for the existing insureds. The system 1 abides by the following rules when replacing data:
PRIVATE
EXISTING DATA NEW DATA ACTION
NULL NOT NULL OVERWRITE
NOT NULL NULL DO NOT OVERWRITE
NOT NULL NOT NULL OVERWRITE, ARCHIVE EXISTING DATA AND PRINT REPORT
NULL NULL NO ACTION Please note that censuses can also be scanned then recognized using OCR (Optical Character Recognition) and finally saved to ASCII files for import.

Figure 11:
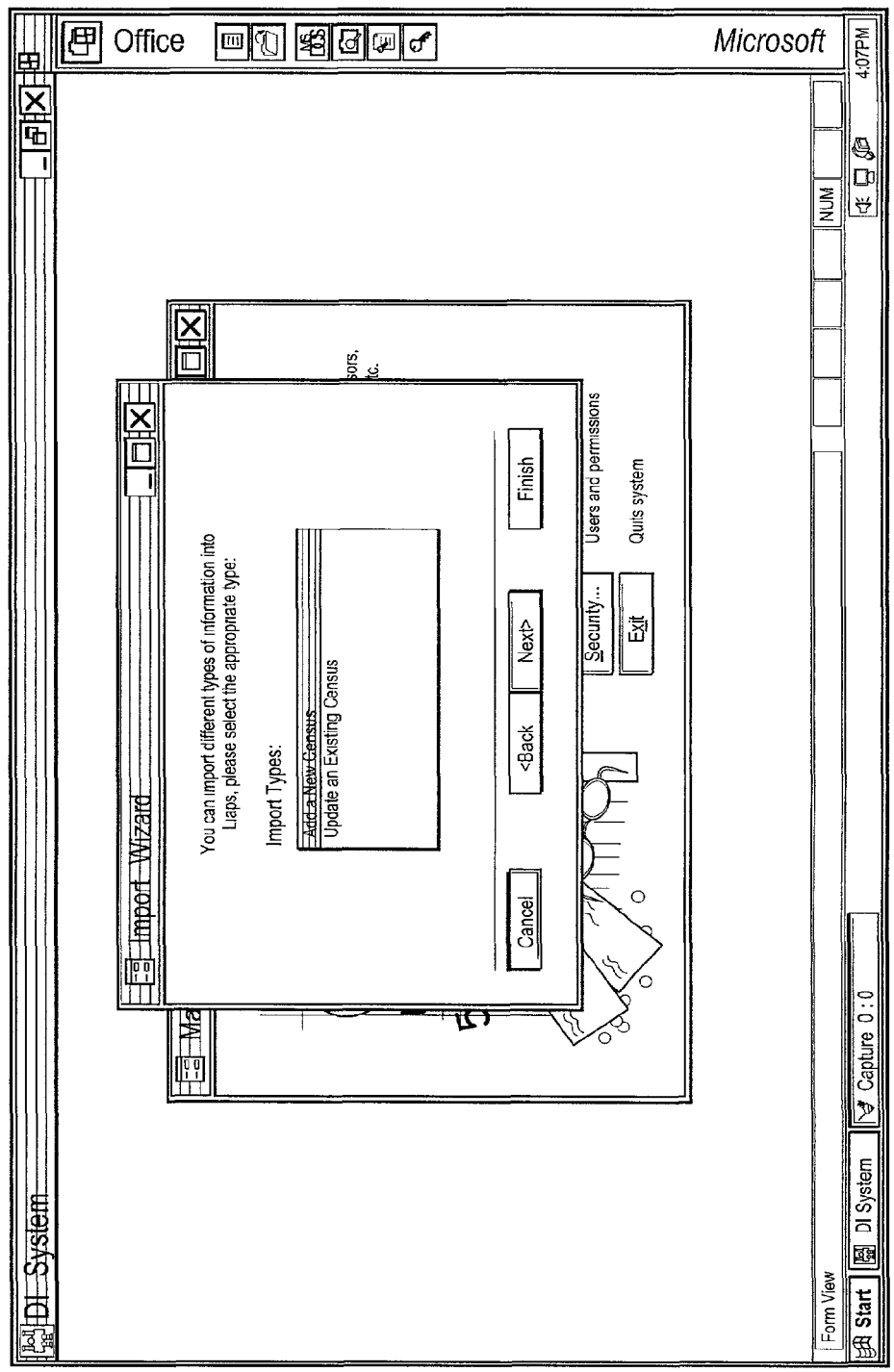
FIG. 11 is a representation of a screen produced on a visual output device in accordance with the present invention.

The user needs to select whether he/she is importing a new census in the System 1 or if he/she is updating data for an existing census. Using an IMPORT WIZARD Screen in FIG. 11, the user selects <ADD A NEW CENSUS> from the IMPORT TYPES list box. The user clicks on a NEXT button.

Figure 12:
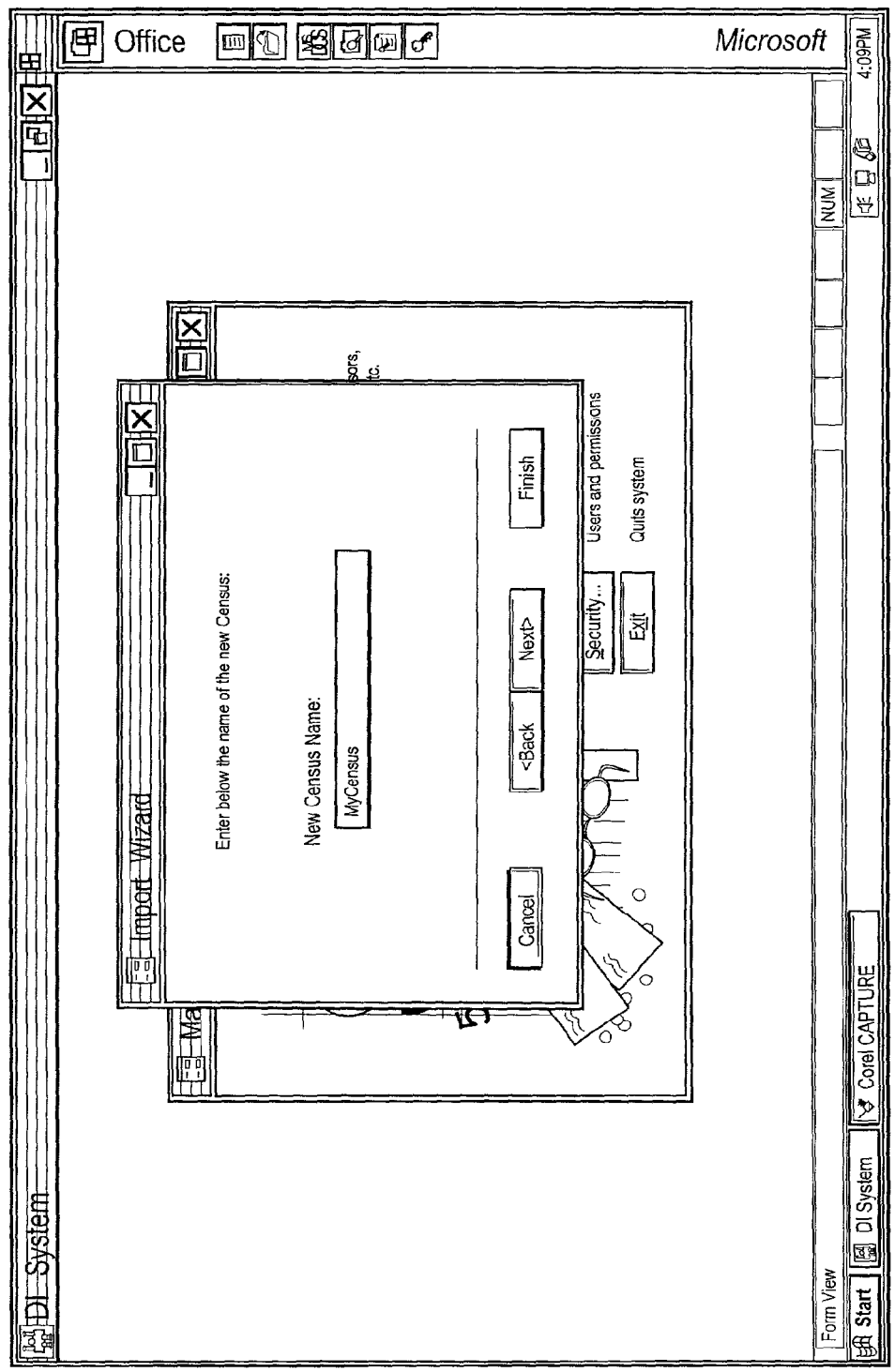
FIG. 12 is a representation of a screen produced on a visual output device in accordance with the present invention.
Figure 13:
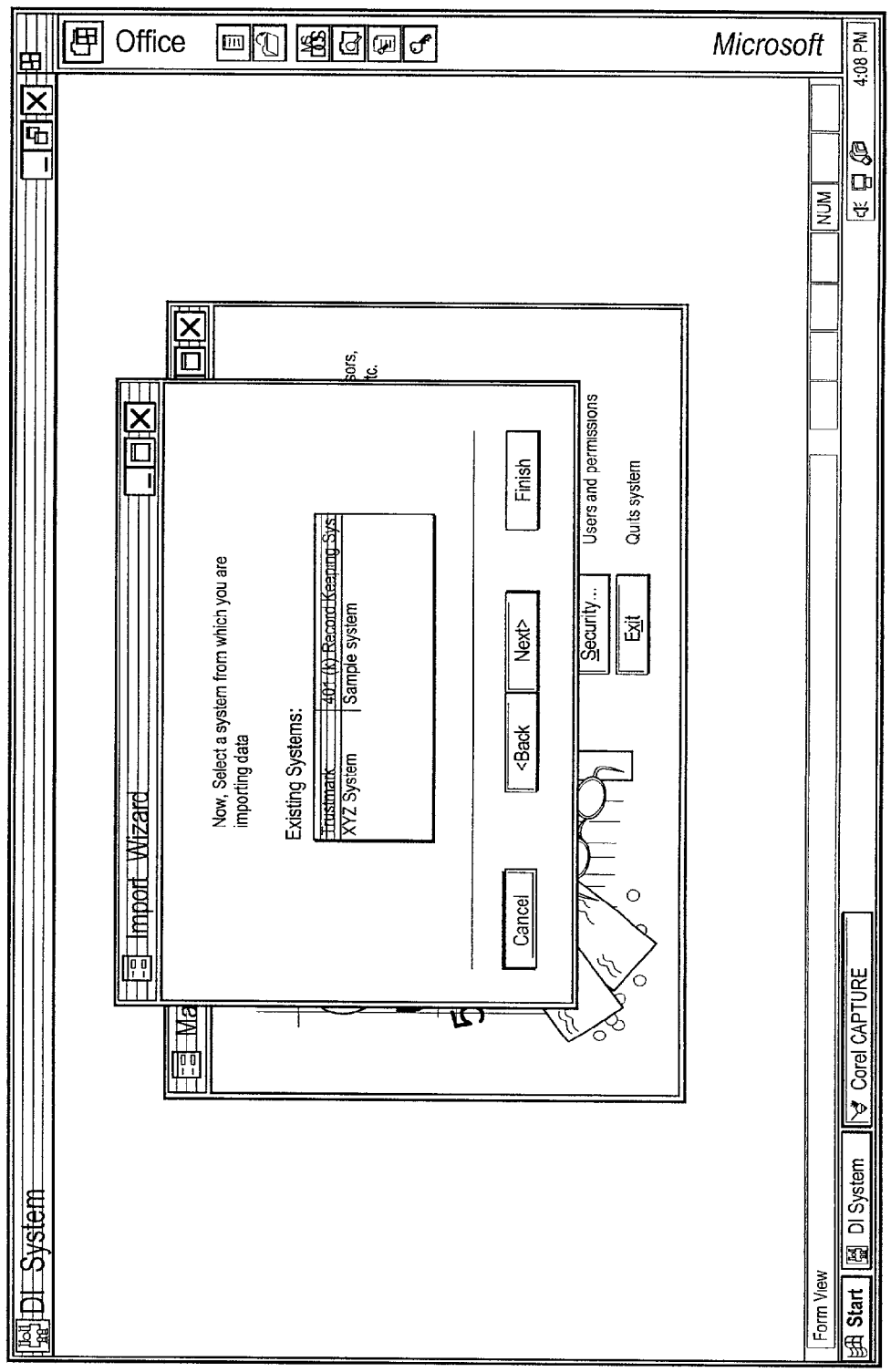
FIG. 13 is a representation of a screen produced on a visual output device in accordance with the present invention.
Figure 14:
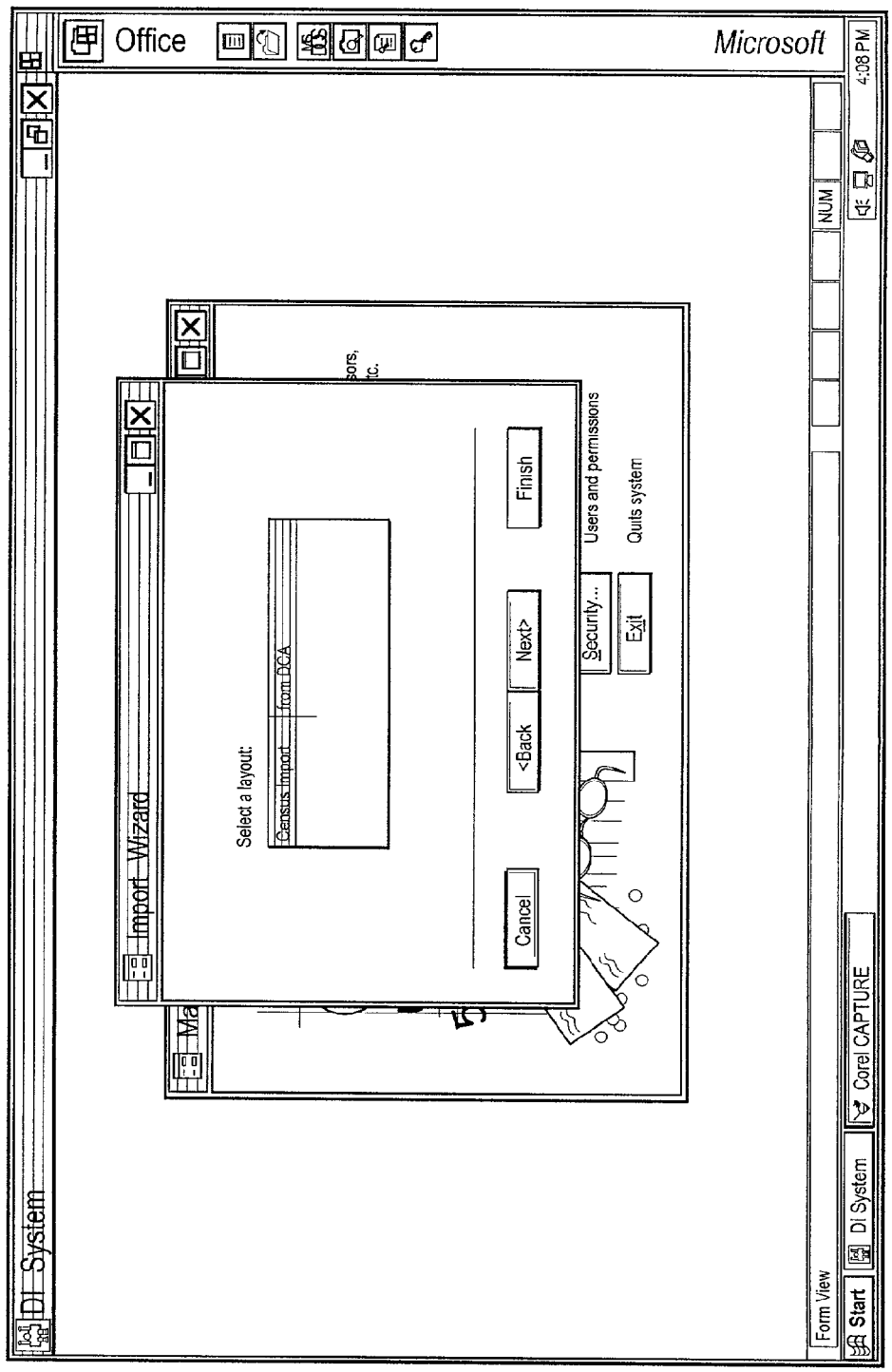
FIG. 14 is a representation of a screen produced on a visual output device in accordance with the present invention.
Figure 15:
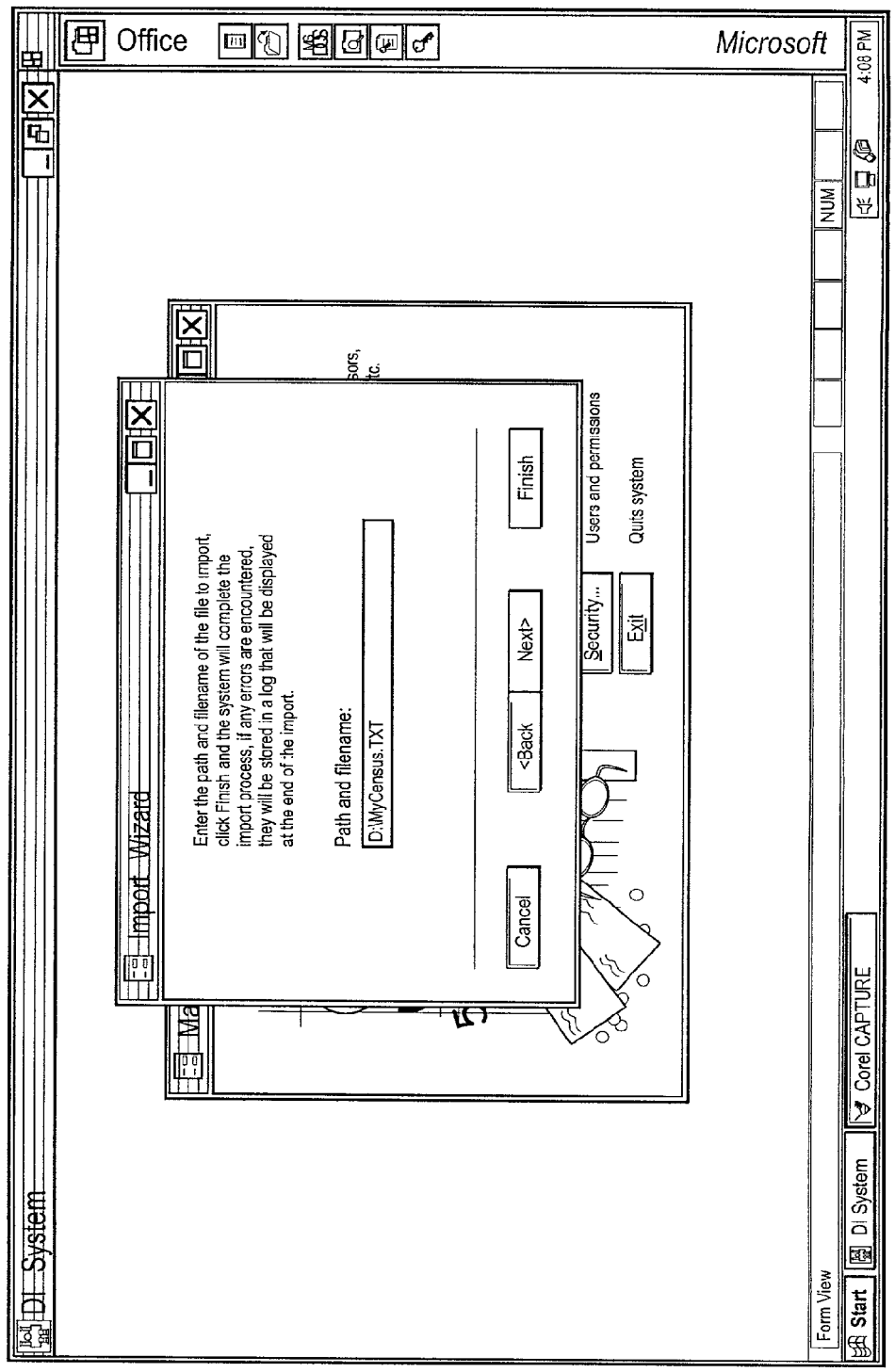
FIG. 15 is a representation of a screen produced on a visual output device in accordance with the present invention.

At the IMPORT WIZARD Screen in FIG. 12, the user enters the name of the new census for future reference. The user clicks on the NEXT button. At the IMPORT WIZARD Screen in FIG. 13, the user selects from the EXISTING SYSTEM list box from which external system he/she is importing the new census. The user clicks on a NEXT button. At the IMPORT WIZARD Screen in FIG. 14, the user selects which IMPORT LAYOUT he/she wants to use to import the new census. The user will select the IMPORT LAYOUT he/she just created. The user clicks on the NEXT button. At the IMPORT WIZARD Screen in FIG. 15, the user enters the path and filename of the file containing the new census to be imported. The user clicks on the FINISH button.

The System 1 will now perform the following tasks in order to successfully import the new census:

Task A—Check the file integrity. The System 1 makes sure that the number of fields contained in the file matches the number of fields specified in the import layout.

Task B—The System 1 will then perform a find and replace function that will replace any unwanted strings (succession of characters) with a more appropriate string. For example many external systems will print a null date to file (<00/00/0000>) which can create problems when importing, therefore the system finds and replaces those null dates with an equal number of spaces.

Task C—The System 1 then scans the file field by fields looking for potential errors including but not limited to alpha-numerical characters when numbers are expected and vice versa, wrong social security number, wrong state codes or data required that is not provided. In this case, a list of all errors will be printed to the screen containing an error message, the row number where the error occurred and the field name.

Task D—The System 1 imports data located on the file into its database. A message box will appear saying "THE CENSUS HAS BEEN IMPORTED SUCCESSFULLY". The user clicks on the OK command button and returns to the MAIN MENU Screen in FIG. 3.

Please note that the census can also be entered by hand, as discussed below.

In any case, the user also can calculate ages for the newly imported census. Ages may be imported within the census file. If this is not the case then the user can calculate ages internally on an age nearest birthday basis or age last birthday basis.

Figure 4:
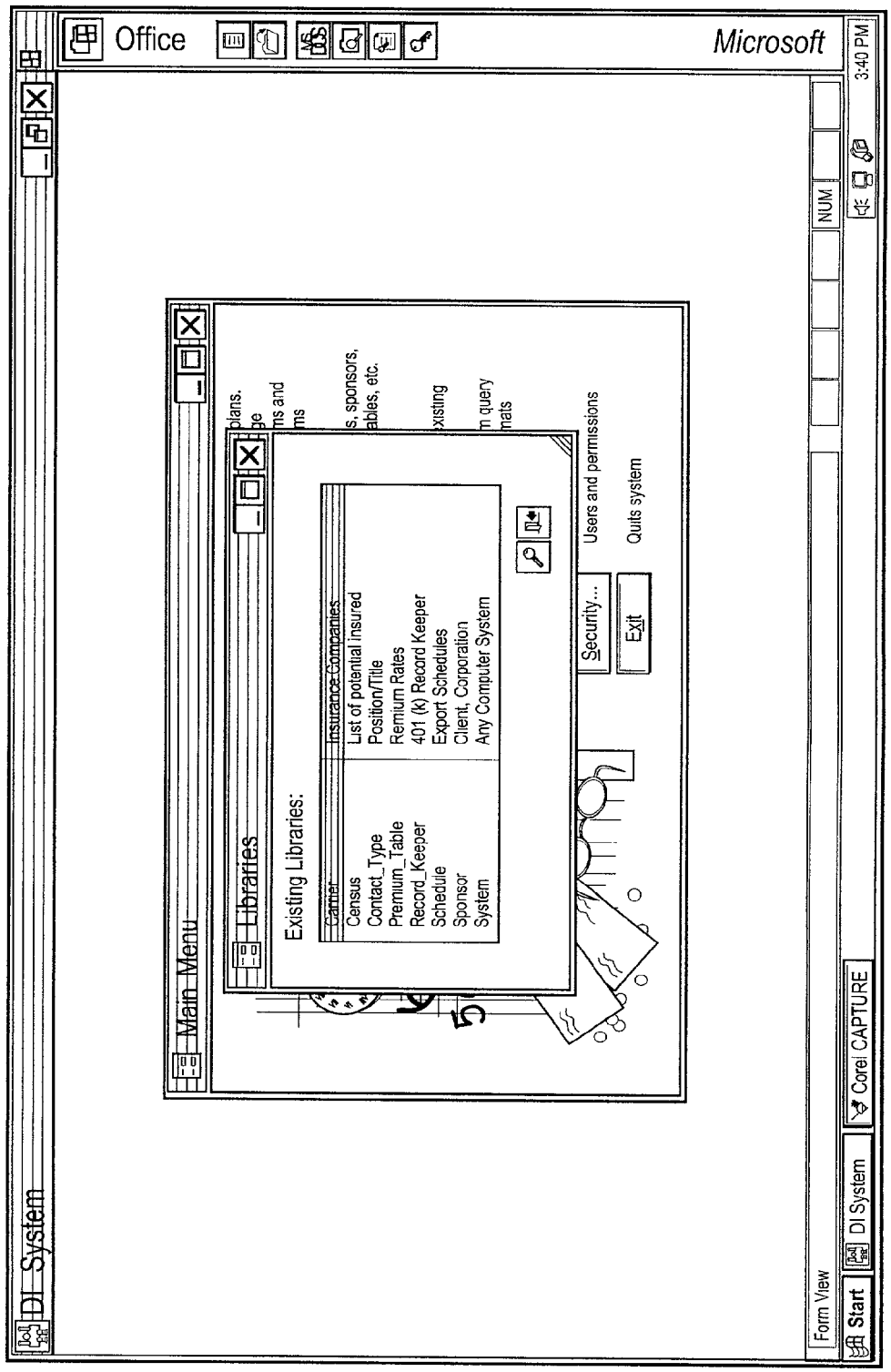
FIG. 4 is a representation of a screen produced on a visual output device in accordance with the present invention.
Figure 5:
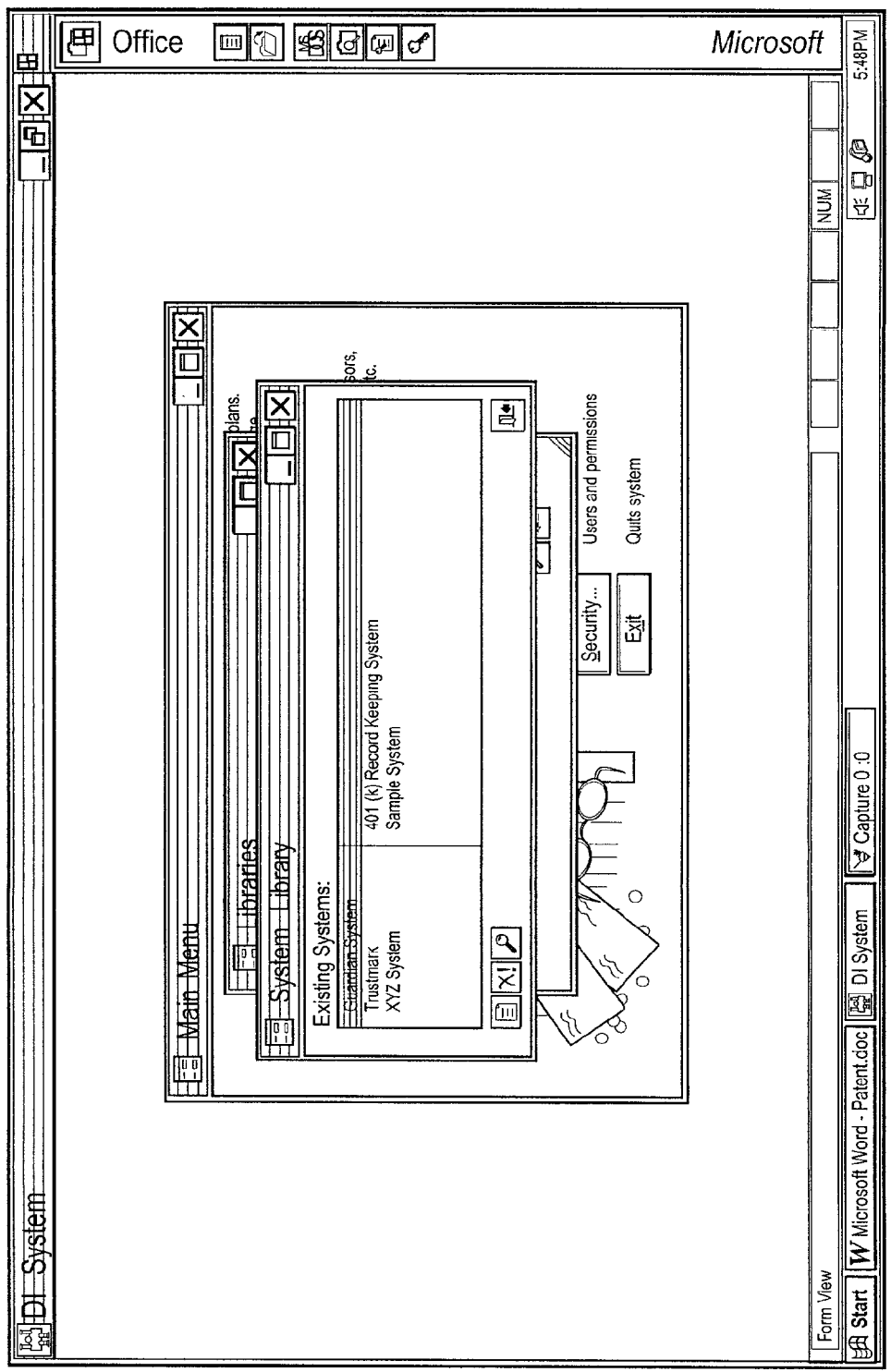
FIG. 5 is a representation of a screen produced on a visual output device in accordance with the present invention.

The user clicks on a LIBRARIES command button and opens up the LIBRARIES Screen in FIG. 4. The user double clicks on the CENSUS Library and brings up the CENSUS LIST Screen in FIG. 16. Next, the user double clicks on the new census he/she just imported to open up the CENSUS EDIT Screen in FIG. 17. In an AGE CALCULATION METHOD frame, the user selects which age calculation method he/she wants to use. The user can choose from AGE NEAREST BIRTHDAY or AGE LAST BIRTHDAY. The user then clicks on INSUREDS to access the INSURED LIST Screen in FIG. 18.

Figure 18:
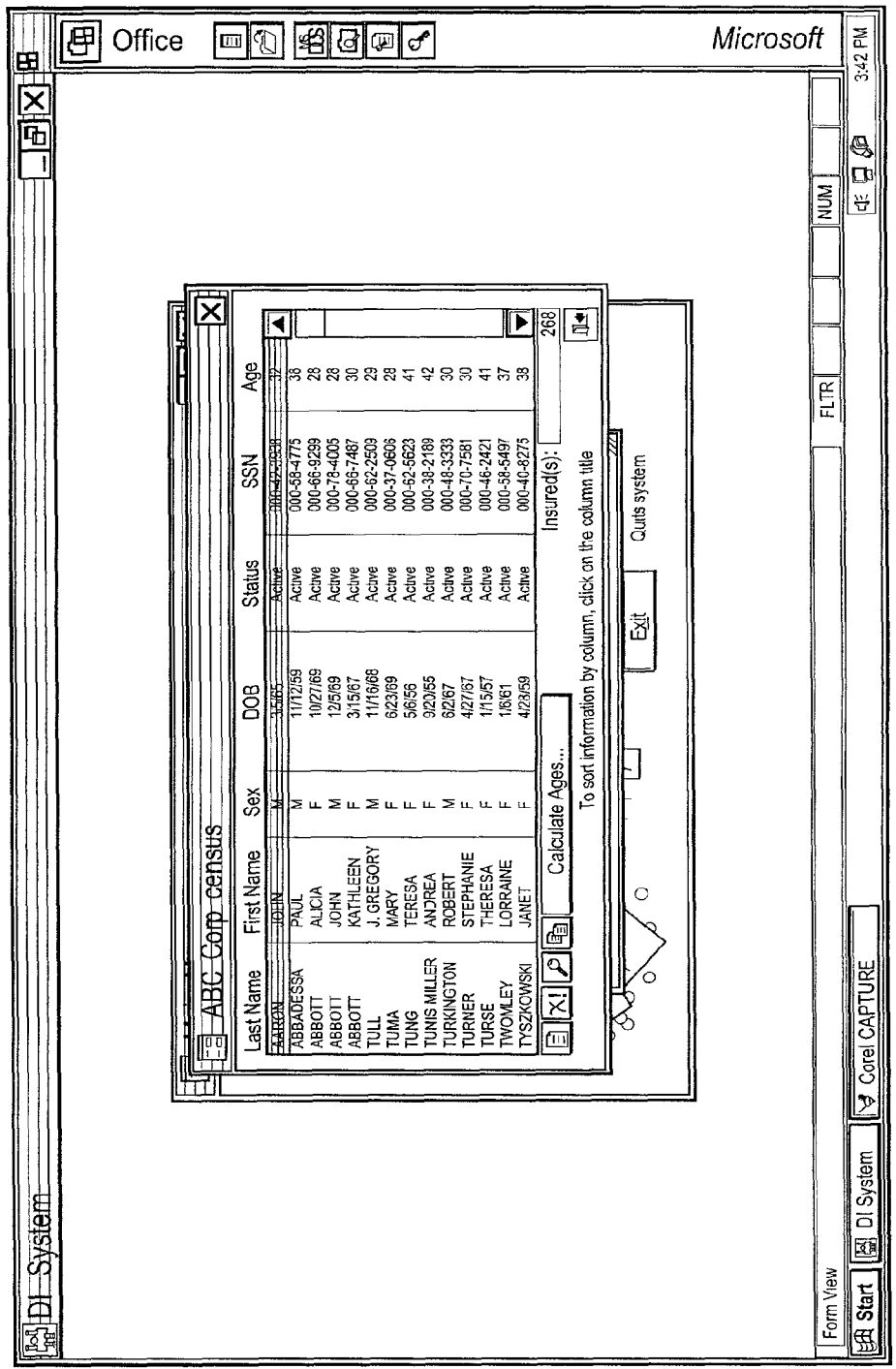
FIG. 18 is a representation of a screen produced on a visual output device in accordance with the present invention.

In order to calculate ages, the user needs to click on the CALCULATE AGES command button to open up the AGE CALC Screen in FIG. 18. The user enter the date as of which he/she elects to calculate ages and then clicks on the CALCULATE command button.

The System 1 then check each insured's date of birth for its existence and validity.

The System 1 executes the following process to calculate ages as of last birthday:

Sub $ALBCALC(B\text{day As Long}, B\text{Month As Long},$
$B\text{Year As Long}, p\text{Day As Long}, p\text{Month As}$
$\text{Long}, p\text{Year As Long}, ALB\_AGE \text{ As Long})$ Dim $D1$ As Long Dim $E1$ As Long $D1 = p\text{Month} - B\text{Month}$ If $D1 > 0$ Then $E1 = 0$

```
    End If

If D1<0 Then

E1=-1

End If

If D1=0 Then

If pDay>=Bday Then

E1=0

Else

E1=-1

End If

Else

E1=-1

End If

ALB_AGE=pYear—BYear+E1

End Sub
```

The System 1 executes the following process to calculate ages as of nearest birthday:

```
Sub ANBCALC(Bday As Long, BMonth As Long,
    BYear As Long, pDay As Long, pMonth As
    Long, pYear As Long, ANB_AGE As Long)

Dim D1 As Long

Dim E1 As Long

D1=pMonth-BMonth

If D1>5 Then

If D1=6 Then

If Bday>=pDay Then

E1=0

Else

E1=1

End If

Else

E1=1

End If

Else

If D1<-5 Then

If D1=-6 Then

If Bday>=pDay Then

E1=-1

Else

E1=0

End If

Else

E1=-1

End If

Else

E1=0

End If

End If

ANB_AGE=pYear-BYear+E1

End Sub
```

A message box then pops up informing the user that all ages were calculated successfully. The user clicks on OK and returns to the INSURED LIST Screen in FIG. 18. The AGE column on the INSURED LIST Screen in FIG. 18 is updated with the new ages.

Figure 16:
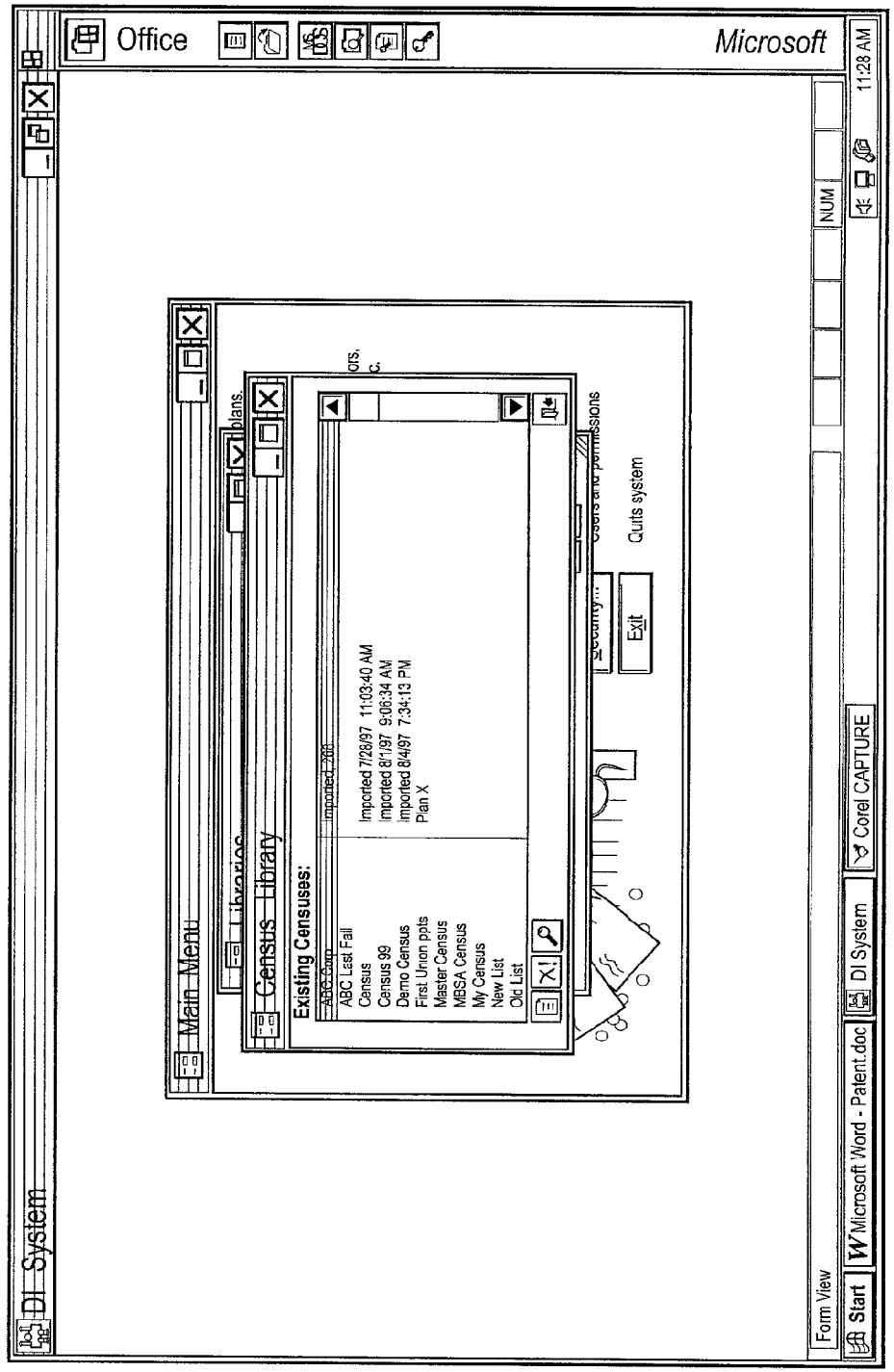
FIG. 16 is a representation of a screen produced on a visual output device in accordance with the present invention.
Figure 17:
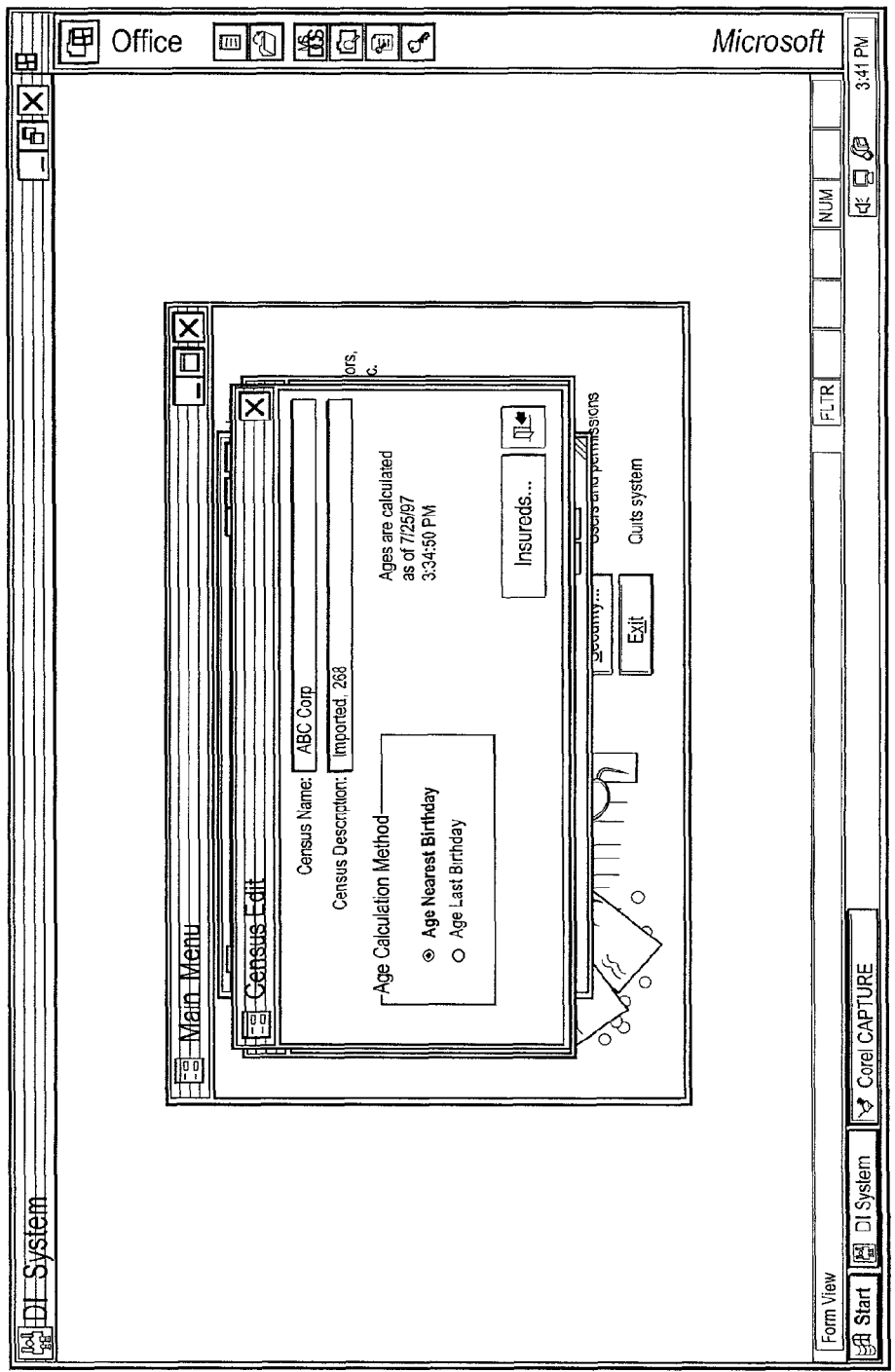
FIG. 17 is a representation of a screen produced on a visual output device in accordance with the present invention.

The user exits the INSURED LIST Screen in FIG. 18 by clicking on the EXIT command button and returns to the CENSUS EDIT Screen in FIG. 17. The user exits the CENSUS EDIT Screen in FIG. 17 by clicking on the EXIT command button and returns to the CENSUS LIST Screen in FIG. 16. The user exits the CENSUS LIST Screen in FIG. 16 by clicking on the EXIT command button and returns to the LIBRARIES Screen in FIG. 4.

The user can also create a new sponsor (e.g., the company that employs the insured, the mutual fund company offering the IRA, an other IRA provider, the Social Security Administration). The System 1 needs to track all sponsors for reporting and communication purposes. It is possible that a single sponsor may set up multiple plans based upon different participation criteria. For example, highly compensated employees of an employer sponsor may be provided a separate plan from rank and file employees. The employer or other sponsor may want policy pricing to be based on the combined experience of all employees under multiple plans. The system must be capable of tracking each plan separately yet combine them for various purposes. Carriers, insurers or reinsurers (carriers) may also want to customize reports based upon different combinations of plans or sponsors. The system must be capable of quickly generating customized reports, exporting and extracting them, and automatically delivering them to all interested and pre-authorized parties.

Figure 20:
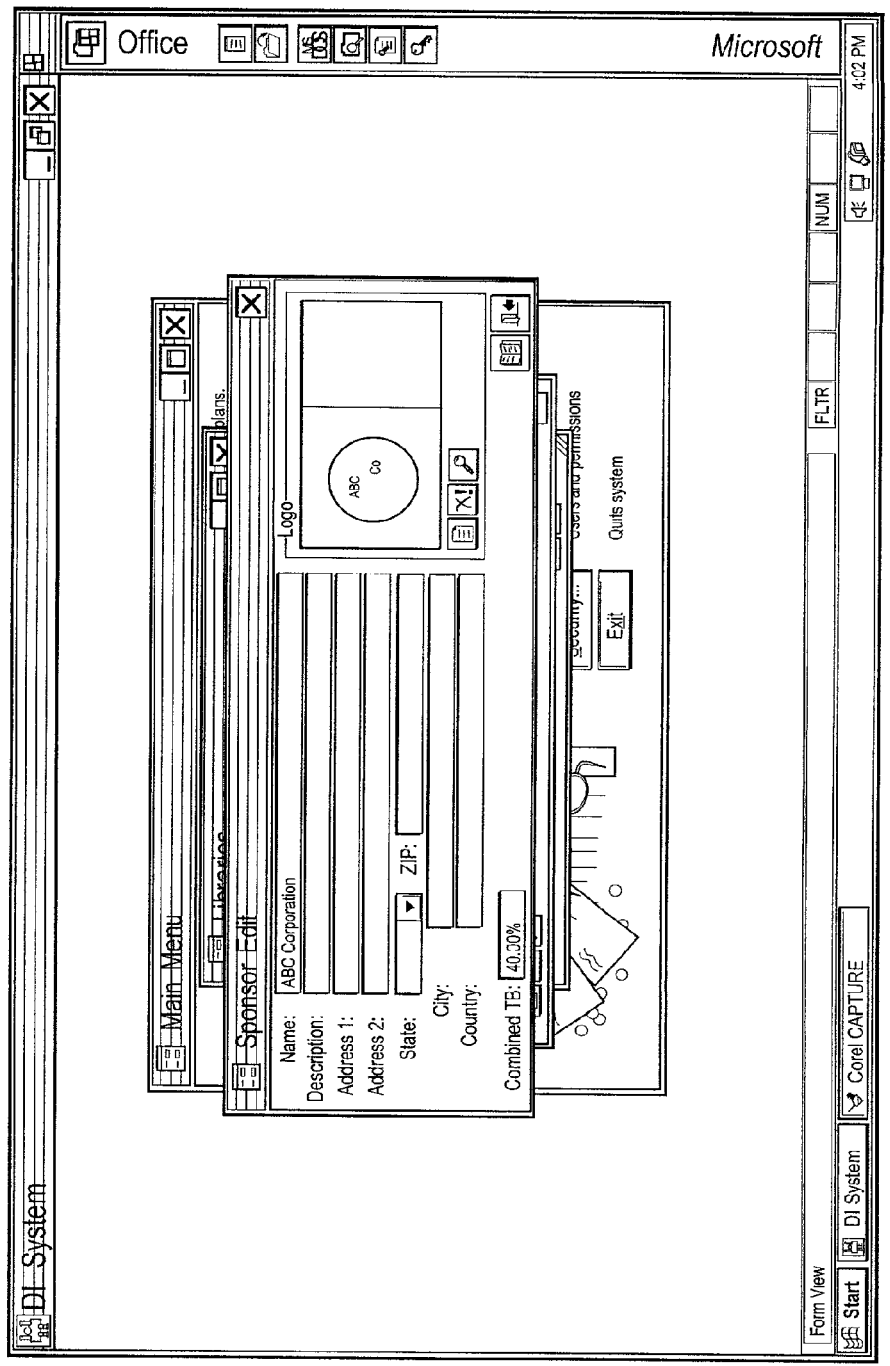
FIG. 20 is a representation of a screen produced on a visual output device in accordance with the present invention.

The user double clicks on the SPONSOR LIBRARY at Screen in FIG. 4 to open up the SPONSOR LIST Screen in Figure (not provided in the figures, but it is similar to the CENSUS LIST Screen in FIG. 16). The user adds a new SPONSOR by clicking on the command button with the blank page icon, and a new SPONSOR EDIT Screen in Figure (not shown in figures) opens up where the user enters a name for the new SPONSOR as well as a brief description. The user then clicks on ADD button, and the new SPONSOR is automatically added to the EXISTING SPONSORS list box on the SPONSOR LIST Screen in Figure. The user double clicks on the newly created SPONSOR to open up the SPONSOR EDIT Screen in FIG. 20. The user can now enter address, city, state, ZIP, country, and a logo for the SPONSOR. By clicking on a CONTACTS button (opened booklet icon), the user can enter contact information for the specific sponsor (this process will be described later in this document with CARRIER information).

The user exits the SPONSOR EDIT Screen in Figure by clicking on the EXIT command button and returns to the SPONSOR LIST screen. The user exits the SPONSOR LIST screen by clicking on the EXIT command button and returns to the LIBRARIES Screen in FIG. 4.

The user can also create a new carrier or selects an existing carrier. The carrier is either the insurance company (primary carrier or primary insurer) that insures the insured or the reinsurer who shares risk with the primary carrier or, in the case of self insured plans, shares risk with the plan sponsor. The System 1 needs to also track the carriers for reporting and communication purposes. The user double clicks on the CARRIER LIBRARY to open up the CARRIER LIST Screen in Figure (not provided, but similar to the CENSUS LIST screen).

Figure 23:
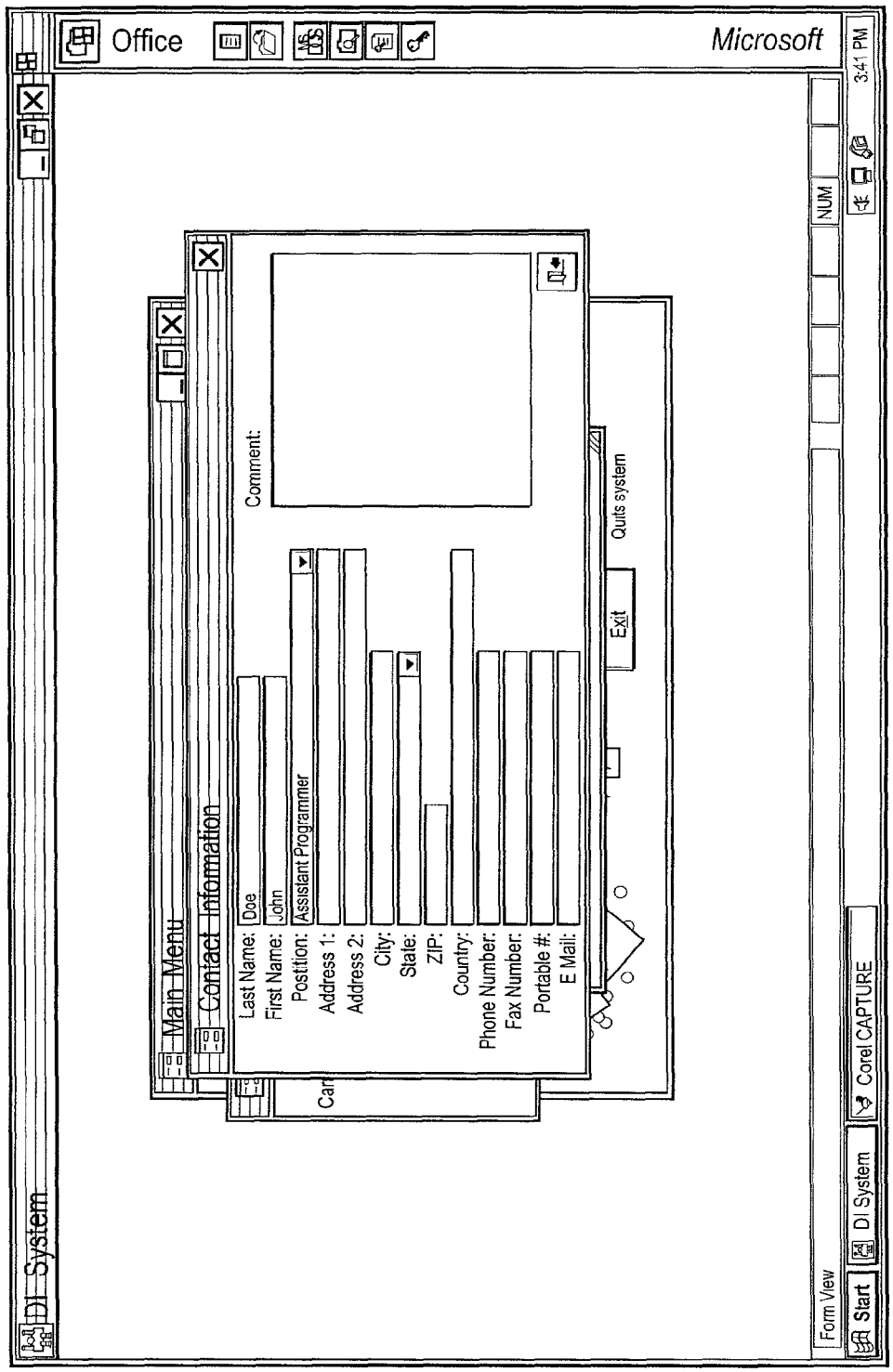
FIG. 23 is a representation of a screen produced on a visual output device in accordance with the present invention.

The user adds a new CARRIER by clicking on a command button with the blank page icon, and a new screen opens up where the user enters a name for the new CARRIER as well as a brief description. The user then clicks on ADD button and the new CARRIER is automatically added to the EXISTING CARRIERS list box on the CARRIER LIST screen. The user double clicks on the newly created SPONSOR to open up the CARRIER EDIT Screen in FIG. 21. The user can now enter address, city, state, ZIP, country, and a logo for the CARRIER. By clicking on the CONTACTS button (opened booklet icon), the user opens up the CONTACT LIST Screen in FIG. 22. The user may add a new contact by clicking on the command button with the blank page icon, and a new screen opens up where the user enters a name and a title. The user then clicks on ADD button, and the new CONTACT is automatically added to the EXISTING CONTACT list box on the CONTACT LIST Screen in FIG. 22. The user edits the new CONTACT by double clicking the new contact's name in the CONTACT list box. The CONTACT EDIT Screen in FIG. 23. The user may enter the following information for each contact:

Last Name
First Name
Position
Address
City
State
Zip
Country
Phone Number
Fax Number
Portable Number
E Mail The user exits the CONTACT EDIT Screen in FIG. 23 by clicking on the EXIT command button and returns to the CONTACT LIST Screen 22. The user exits the CONTACT LIST screen by clicking on the EXIT command button and returns to the CARRIER EDIT Screen in FIG. 21.

Figure 21:
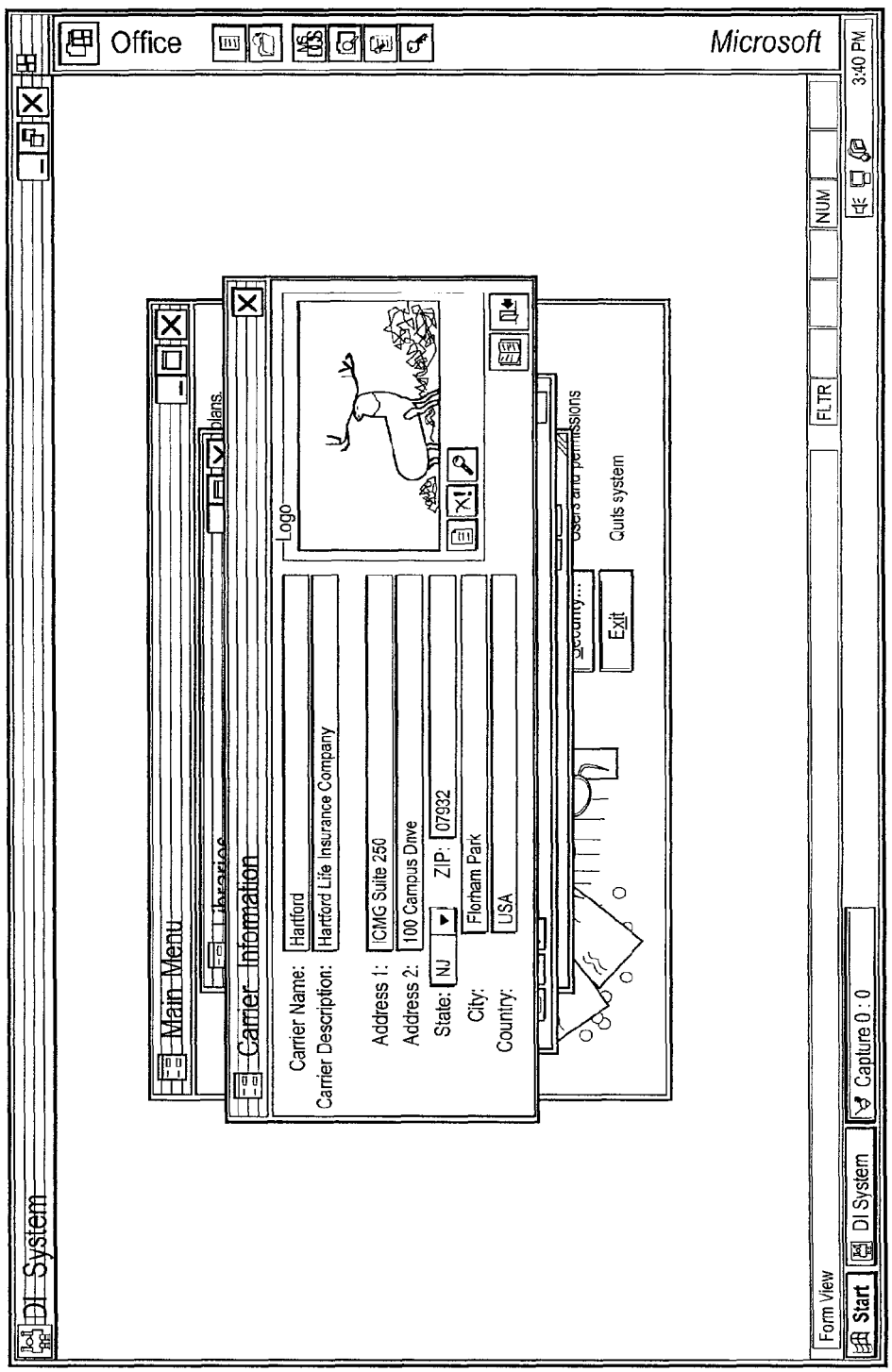
FIG. 21 is a representation of a screen produced on a visual output device in accordance with the present invention.

The user exits the CARRIER EDIT Screen in FIG. 21 by clicking on the EXIT command button and returns to the CARRIER LIST Screen in FIG. 21. The user exits the CARRIER LIST Screen in FIG. 21 by clicking on the EXIT command button and returns to the LIBRARIES Screen in FIG. 4.

The user can also create a new record keeper or select an existing record keeper. The record keeper administers the retirement plan containing individual accounts (e.g., IRAs, plans qualified under IRC Sections 401(a), 403(b), and 457, and Social Security, if adopted with individual accounts). It keeps track of plan participants' contributions, account balances, and status. The system needs to track record keepers for report and communication purposes. The user double clicks on the RECORD KEEPER library to open up the RECORD KEEPER LIST Screen in Figure (not provided, but similar to the CENSUS LIST Screen in Figure 16.

The user adds a new RECORD KEEPER by clicking on the command button with the blank page icon, and a new screen opens up where the user enters a name for the new RECORD KEEPER as well as a brief description. The user then click on ADD button, and the new RECORD KEEPER is automatically added to the EXISTING RECORD KEEPERS list box on the RECORD KEEPER LIST screen. The user double clicks on the newly created RECORD KEEPER to open up the RECORD KEEPER EDIT Screen in FIG. 24. The user can now enter address, city, state, ZIP, country, and a logo for the RECORD KEEPER. By clicking on the CONTACTS button (opened booklet icon), the user opens up the CONTACT LIST Screen in FIG. 24. The user may add a new contact by clicking on the command button with the blank page icon, and a new screen opens up where the user enters a name and a title. The user then click on ADD button, and the new CONTACT is automatically added to the EXISTING CONTACT list box on the CONTACT LIST Screen in FIG. 22. The user edits the new CONTACT by double clicking the new contact's name in the CONTACT list box. The CONTACT EDIT Screen in FIG. 23 opens up.

Figure 22:
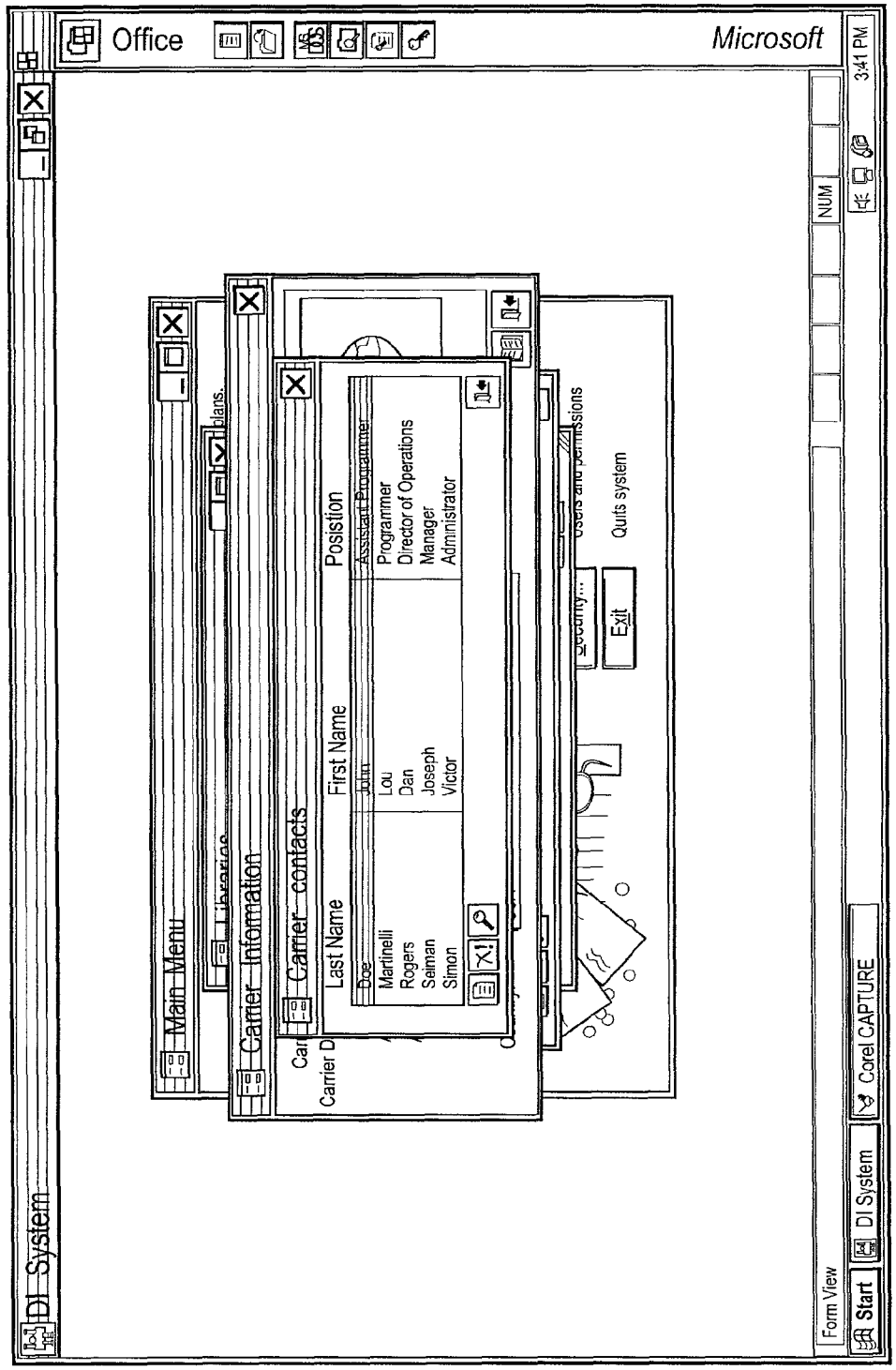
FIG. 22 is a representation of a screen produced on a visual output device in accordance with the present invention.

The user exits the CONTACT EDIT Screen in FIG. 23 by clicking on the EXIT command button and returns to the CONTACT LIST Screen in FIG. 22. The user exits the CONTACT LIST Screen in FIG. 22 by clicking on the EXIT command button and returns to the RECORD KEEPER EDIT Screen in FIG. 24.

Figure 24:
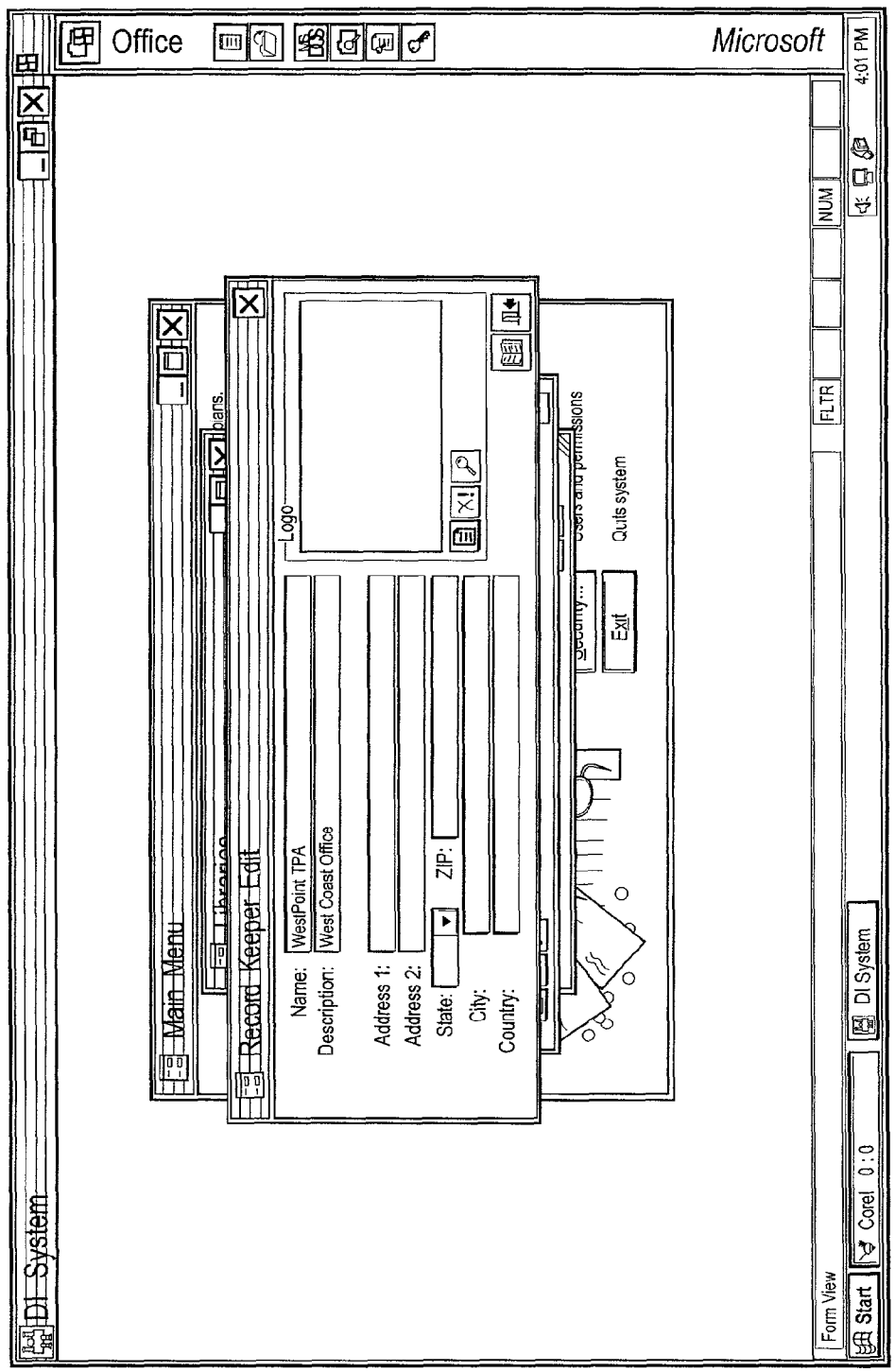
FIG. 24 is a representation of a screen produced on a visual output device in accordance with the present invention.

The user exits the RECORD KEEPER EDIT Screen in FIG. 24 by clicking on the EXIT command button and returns to the RECORD KEEPER LIST Screen in Figure. The user exits the RECORD KEEPER LIST Screen in Figure by clicking on the EXIT command button and returns to the LIBRARIES Screen in FIG. 3. The user exits the LIBRARIES screen by clicking on the EXIT command button and returns to the MAIN MENU Screen in FIG. 3.

Figure 26:
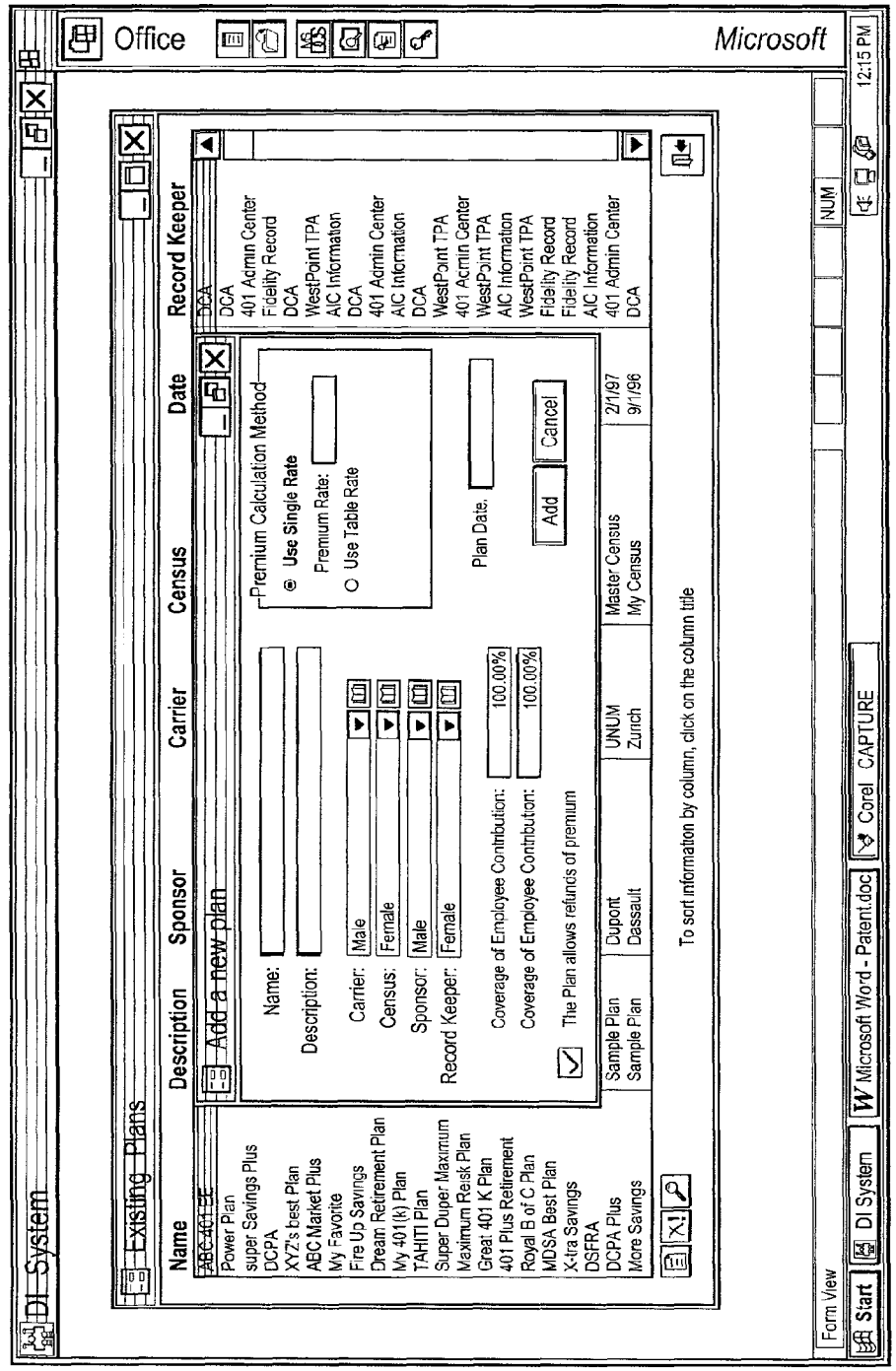
FIG. 26 is a representation of a screen produced on a visual output device in accordance with the present invention.

The user can also create a new plan or selects an existing plan. The user clicks on the PLANS command button to open up the PLAN LIST Screen in FIG. 25. A list of all the plans contained into the System 1 is displayed. The user adds a new PLAN by clicking on the command button with the blank page icon, and PLAN ADD Screen in FIG. 26 opens up where the user enters information about the new plan.

The information about the new plan includes, but is not limited to:
Plan name
Plan Type
Plan description
Plan carrier (the user would select the newly created carrier)
Plan carrier 2 (user would select if a reinsurer was being used)
Plan sponsor (the user would select the newly created sponsor)
Plan census (the user would select the newly imported census)
Plan 2 census (the user would select if the sponsor was insuring common participants of two or more plans)
Plan record keeper (the user would select the newly created record keeper)

Coverage of employee contribution: what percentage of the employee contribution do you want to insure (if applicable)?

Coverage of employer contribution: what percentage of the employer contribution do you want to insure (if applicable)?

Coverage of IRA participant: what percentage of the IRA participant contribution do you want to insure (if applicable)?

Coverage by IRA provider: what percentage of the IRA participant contribution do you want to insure (if applicable)?

Coverage of participant of individual social security account: what percentage of the participant's FICA do you want to insure (if applicable)?

Does the plan pay benefits at time of disability?
Does the plan pay benefits at early retirement?
Does the plan pay benefits at normal retirement?
Does the plan pay benefits at death?
Does the plan pay a lump sum benefit?
Does the plan allow for refund of premium?

In the event that an employee terminates employment, the plan may or may not refund the unearned portion of the premium for the balance of the plan year. If no refund is provided, then a paid up policy, or some other consideration may be provided.

Figure 27:
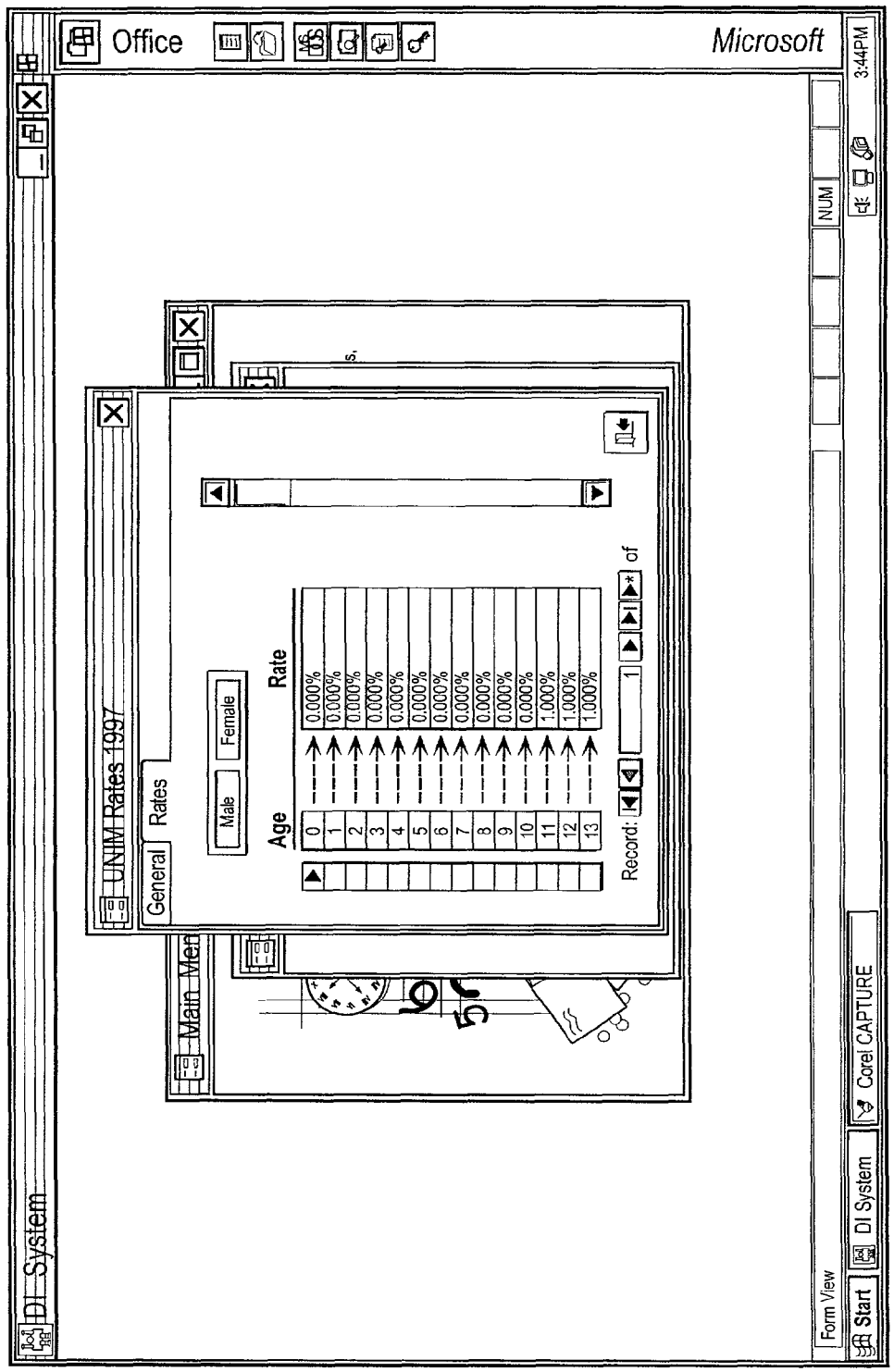
FIG. 27 is a representation of a screen produced on a visual output device in accordance with the present invention.

The premium calculation method will specify how premiums are calculated; there are two options: (1) the user either enters a premium rate that will be the same for all insureds regardless of age and sex; (2) the user selects TABLE RATE, and a pull down combo box appears with a list of available premium tables by age and sex (for an example of premium table please see Screen in FIG. 27.

The user can then enter a plan issue date.

Figure 25:
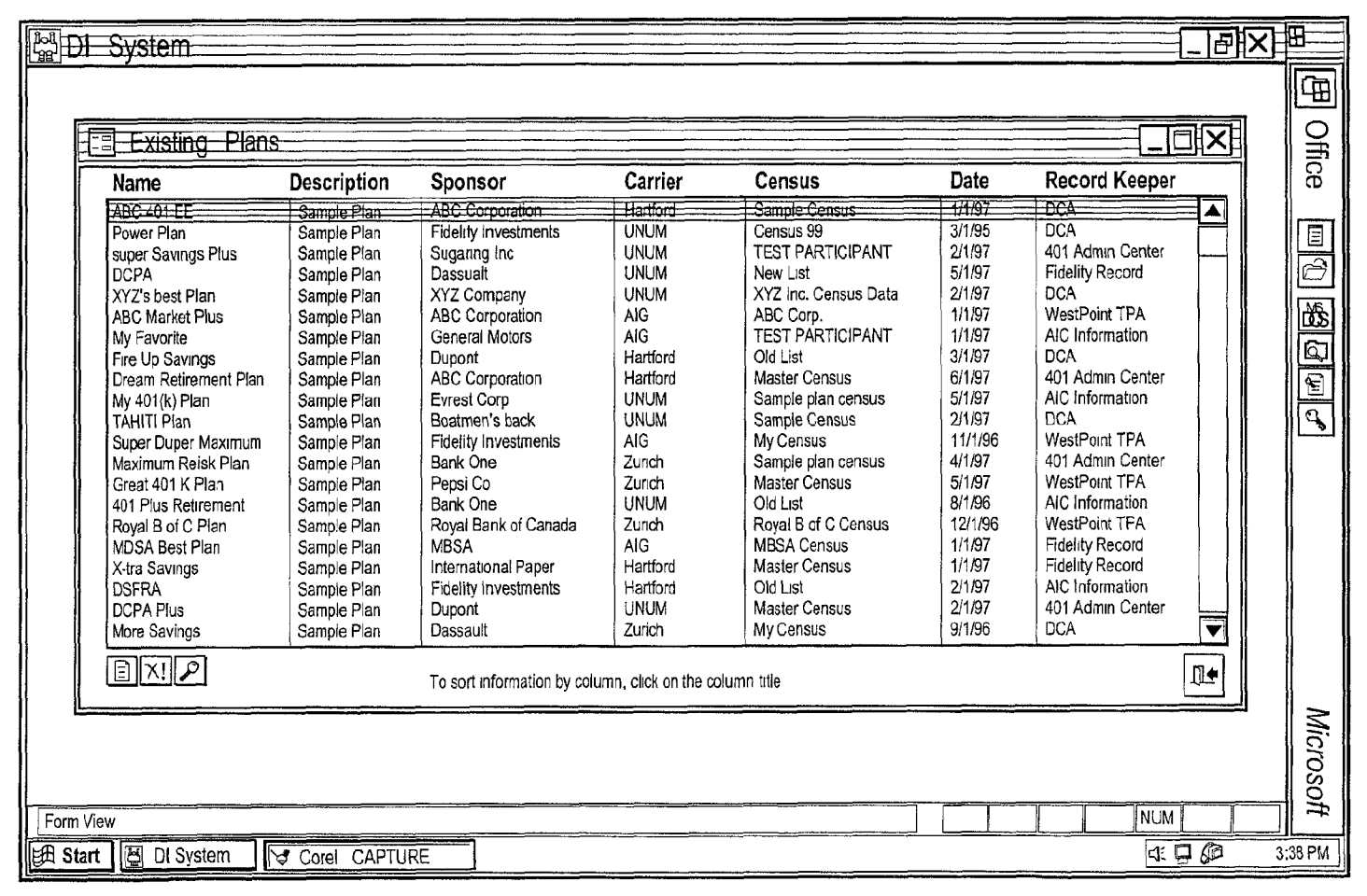
Figure 28:
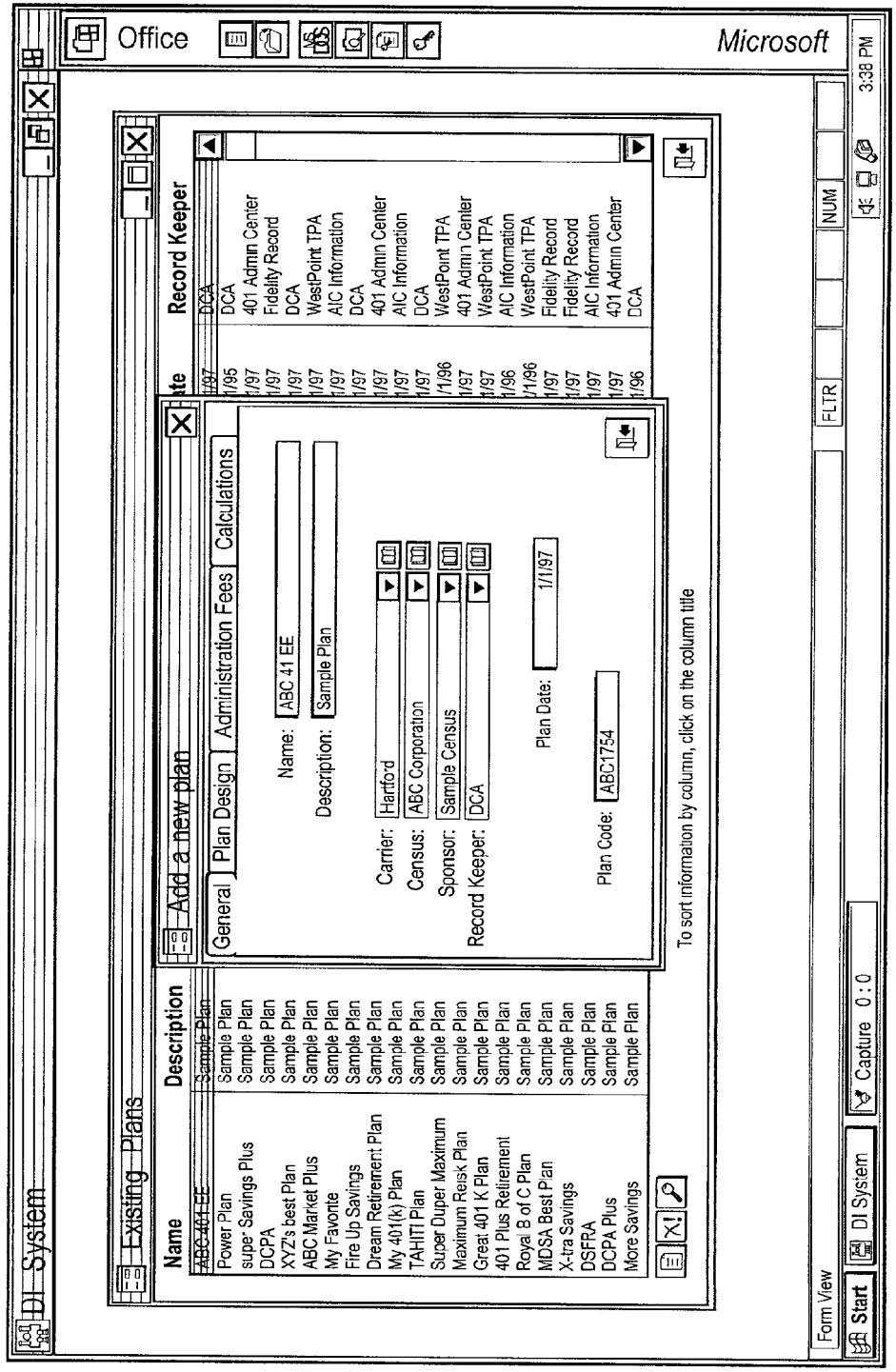
FIG. 28 is a representation of a screen produced on a visual output device in accordance with the present invention.

The user can then click on the ADD button, and the new PLAN is automatically added to the PLAN LIST list box on the PLAN LIST Screen in FIG. 25. The user double clicks on the newly created PLAN to open up the PLAN EDIT Screen in FIG. 28.

Figure 29:
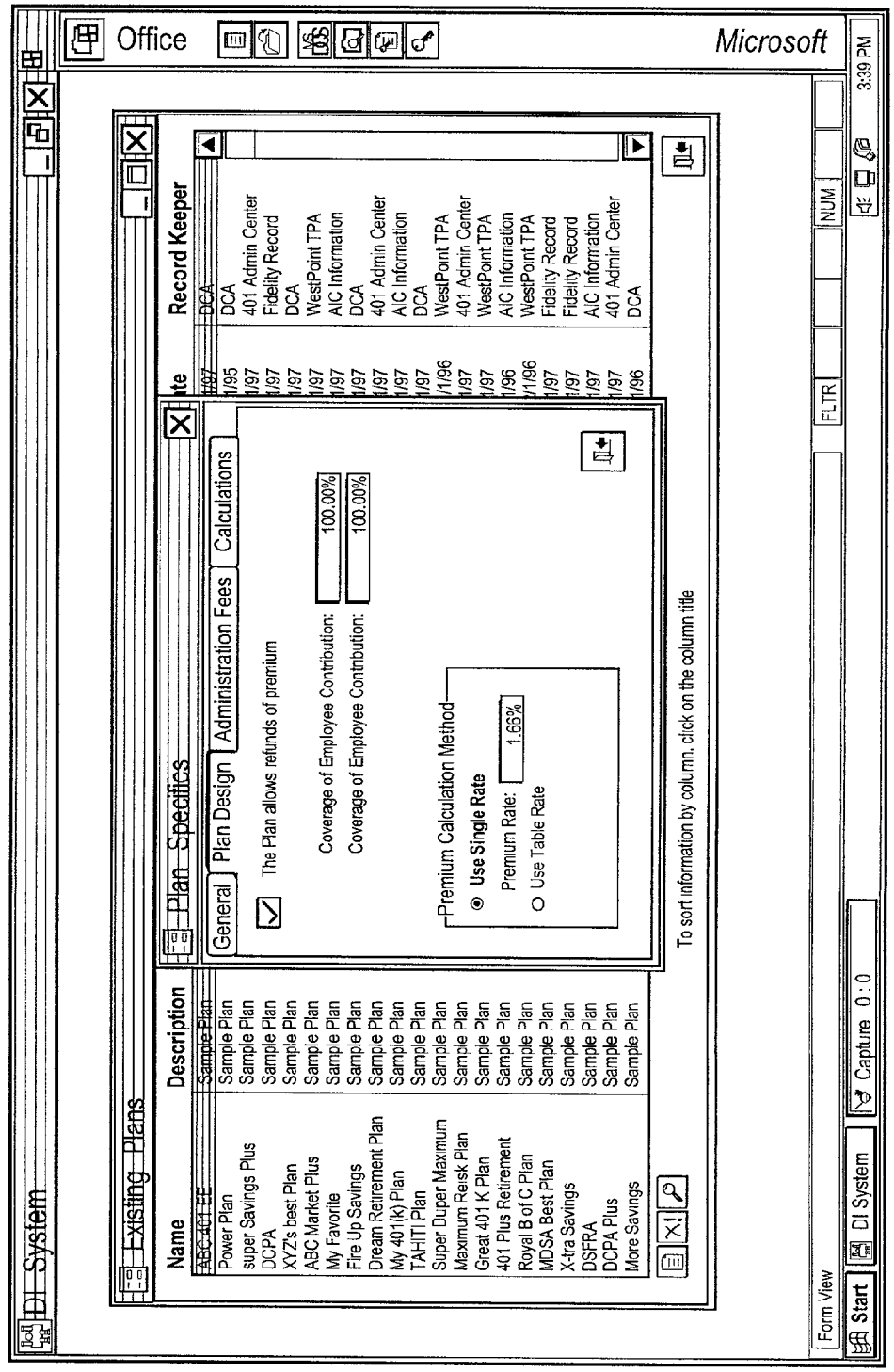
FIG. 29 is a representation of a screen produced on a visual output device in accordance with the present invention.
Figure 30:
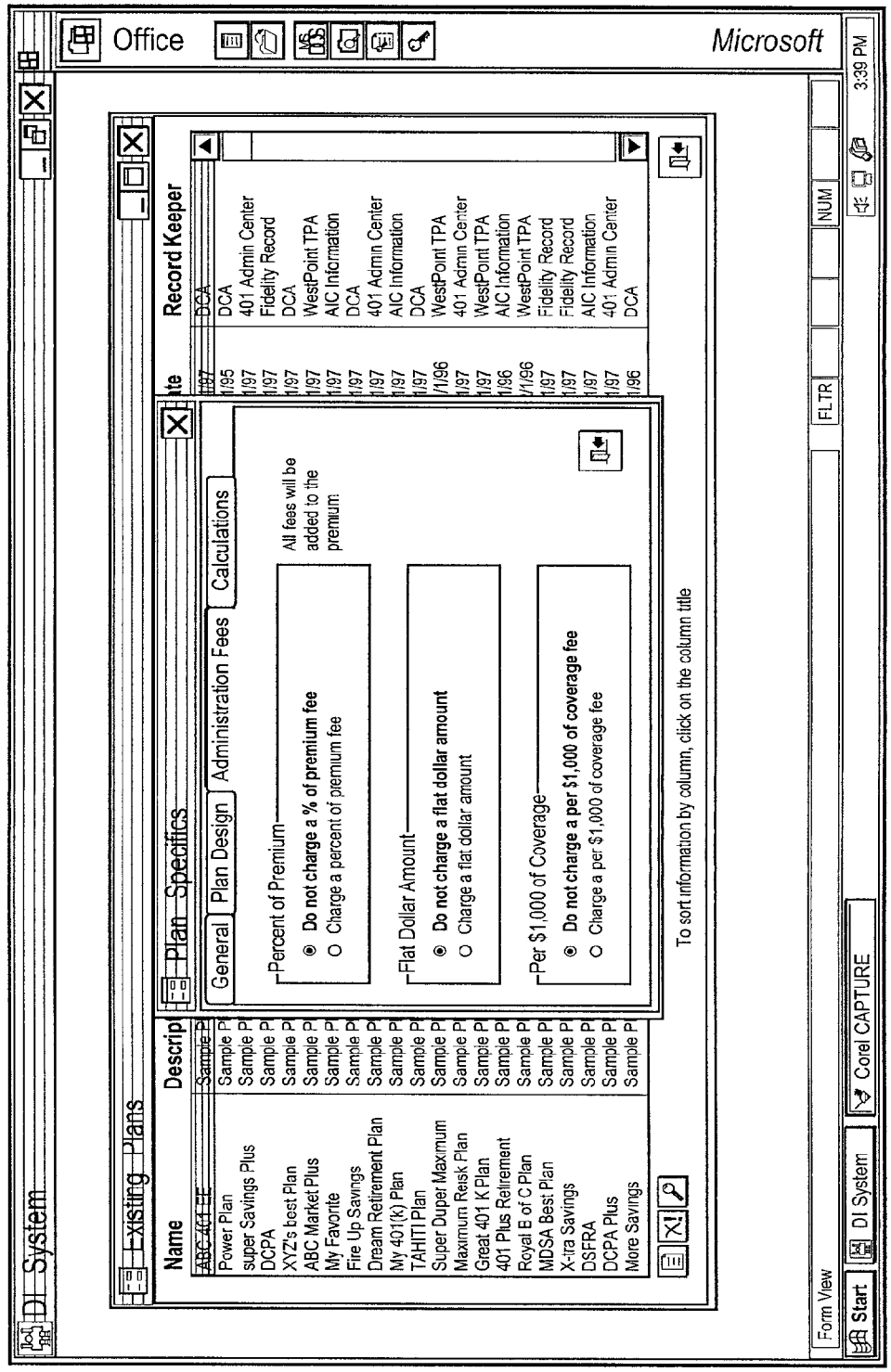
FIG. 30 is a representation of a screen produced on a visual output device in accordance with the present invention.

The PLAN EDIT screen contains 4 tabs. A first tab is the general tab, which contains all standard information about the plan including name, description, carrier, sponsor, census, record keeper, plan issue date and plan code. The second tab is the plan design tab (Screen in FIG. 29), which contains all plan design information including whether the plan allows for refunds of premium, the percentage of coverage of employee and employer contribution, whether benefits are payable at the time of disability or deferred until retirement, early retirement or death, the method for determining the growth of deferred benefits, the premium calculation method, the applicable method for establishing reserves for reported claims and for claims that are incurred but not reported, whether benefits are payable to the plan or directly to participants and beneficiaries, etc. The third tab is the administration fees tab (Screen in FIG. 30), which contains formulas to gross up the premium by an amount equal to the administration fee. This tab can also be used for creating commissions, marketing fees, or other fees.

As to this third tab, there are 3 possible formulas to create an administration and/or other fees: (1) charge a percent of premium fee where the administration fee is calculated as a percentage of premium; (2) charge a flat dollar amount; and (3) charge a per 1000 of coverage fee where the administration fee is calculated as a dollar amount for each $1,000 dollar of coverage.

The fourth tab is the calculations tab (Screen in FIG. 31), which provides four types of computing. The first type of computing is for updating the coverage and benefit payouts for all insureds. The user clicks on the UPDATE command button, and the System 1 calculates coverage and benefit payout amounts for all insureds. The System 1 loops through each insured and multiplies the coverage or benefit payout by the participant contribution percentage or other by the applicable type of contribution and stores the result in the participant coverage amount field. While looping through each insured, the System 1 also multiplies the coverage of employer or sponsor contribution by a percentage and stores the result in the employer or sponsor coverage amount field.

The second type of computing is for calculating the disability premiums. To calculate the disability premiums, the user clicks on the CALCULATE command button in the DISABILITY PREMIUMS frame. The System 1 will calculate two base premiums based on the newly calculated participant and employer or sponsor coverage amount. The System 1 takes the rate provided in the plan design tab (Screen in FIG. 29) and multiplies it by the coverage amount for both the participant coverage amount and employer or sponsor coverage amount. Once the base premiums are calculated the System 1 calculates the administration fee based on the chosen method of calculating the administration fee in the administration fee tab (Screen in FIG. 30) and adds the fee to the base premium to store the final disability premium for both the participant coverage amount and the employer coverage amount.

The third type of computing is for calculating unearned or unused premiums. To calculate unearned premiums for all insureds, the user clicks on the CALCULATE button in the UNEARNED PREMIUMS frame. The System 1 will calculate the number of days between the last plan anniversary date and divide that number by 365 to obtain the unearned ratio. The unearned ratio is multiplied by (the participant annual premium plus the employer annual premium) to obtain the participant unearned premium and the employer unearned premium.

The fourth type of computing is for calculating reserves. There are two types of reserves that are calculated. The first type of reserve is for claims that are incurred, but not reported. This is a reserve that is an estimate, generally based on the carriers previous experience, of the number of claims that have occurred, but have not yet been reported. The second kind of reserve is for claims that have been reported. This reserve can be further broken down into two broad category types. Reserves for reported claims for coverage with benefit payments made at the time of disability, and secondly, reserves for reported claims for coverage with benefit payments deferred until retirement, early retirement or death. Reserves for reported claims for coverage with benefit payments made at the time of disability are intended to represent the net present value of future benefits likely to be paid during the entire length of the disability (consequently, reserves start out high and generally diminish as payments are made). Two reserves must generally be established for reported claims for coverage with benefit payments deferred to retirement, early retirement or death represent. The first reserve is identical to that of coverage payable at the time of disability. The second must track the actual deferred benefits that have accrued on behalf of the participant to date.

Figure 31:
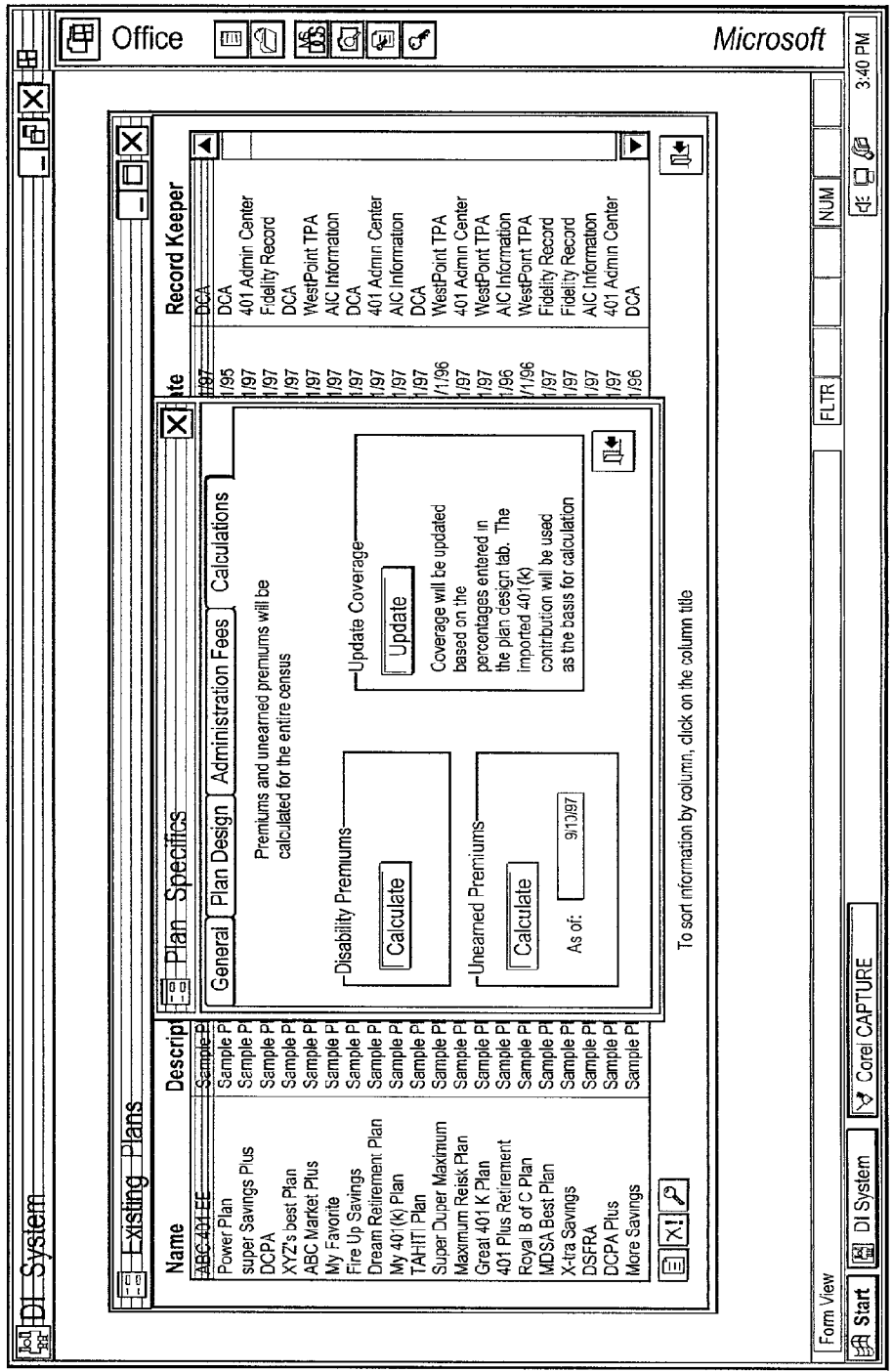
FIG. 31 is a representation of a screen produced on a visual output device in accordance with the present invention.

Now that the user has calculated the coverage amounts, the disability premium amounts and the unearned premium amounts, and can calculate reserves, the user exits the PLAN EDIT Screen in FIG. 31 by clicking on the EXIT command button and returns to the PLAN LIST Screen in FIG. 25. The user exits the PLAN LIST screen by clicking on the EXIT command button and returns to the MAIN MENU Screen in FIG. 3.

The user next verifies newly calculated information for all insureds. Once premiums have been calculated, the user can check the premiums by printing reports or by editing insured's information. From the MAIN MENU Screen in FIG. 7, the user clicks on the LIBRARIES command button to open up the LIBRARIES Screen in FIG. 4. The user double clicks on the CENSUS Library and brings up the CENSUS LIST Screen in FIG. 16.

Figure 19:
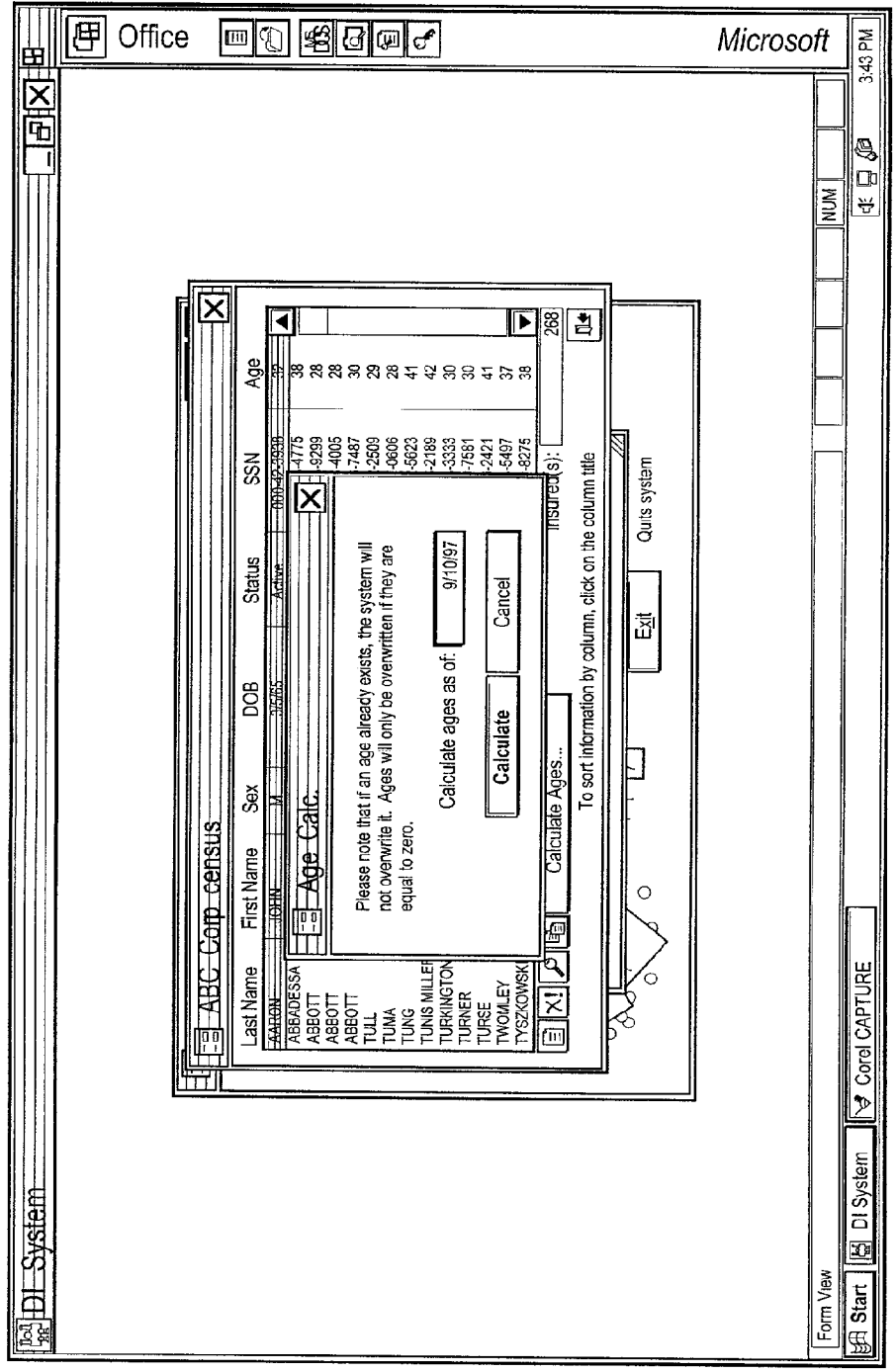
FIG. 19 is a representation of a screen produced on a visual output device in accordance with the present invention.

The user double clicks on the census that belongs to the plan he/she just created to open up the CENSUS EDIT Screen in FIG. 17. The user clicks on INSUREDS to access the INSURED LIST Screen in FIG. 18. To add a new insured by hand, the user clicks on the command button with the blank page icon, and a new screen opens up where the user enters a name for the new insured. The user then click on ADD button, and the new insured is automatically added to the INSURED list box on the INSURED LIST Screen in FIG. 19.

Figure 32:
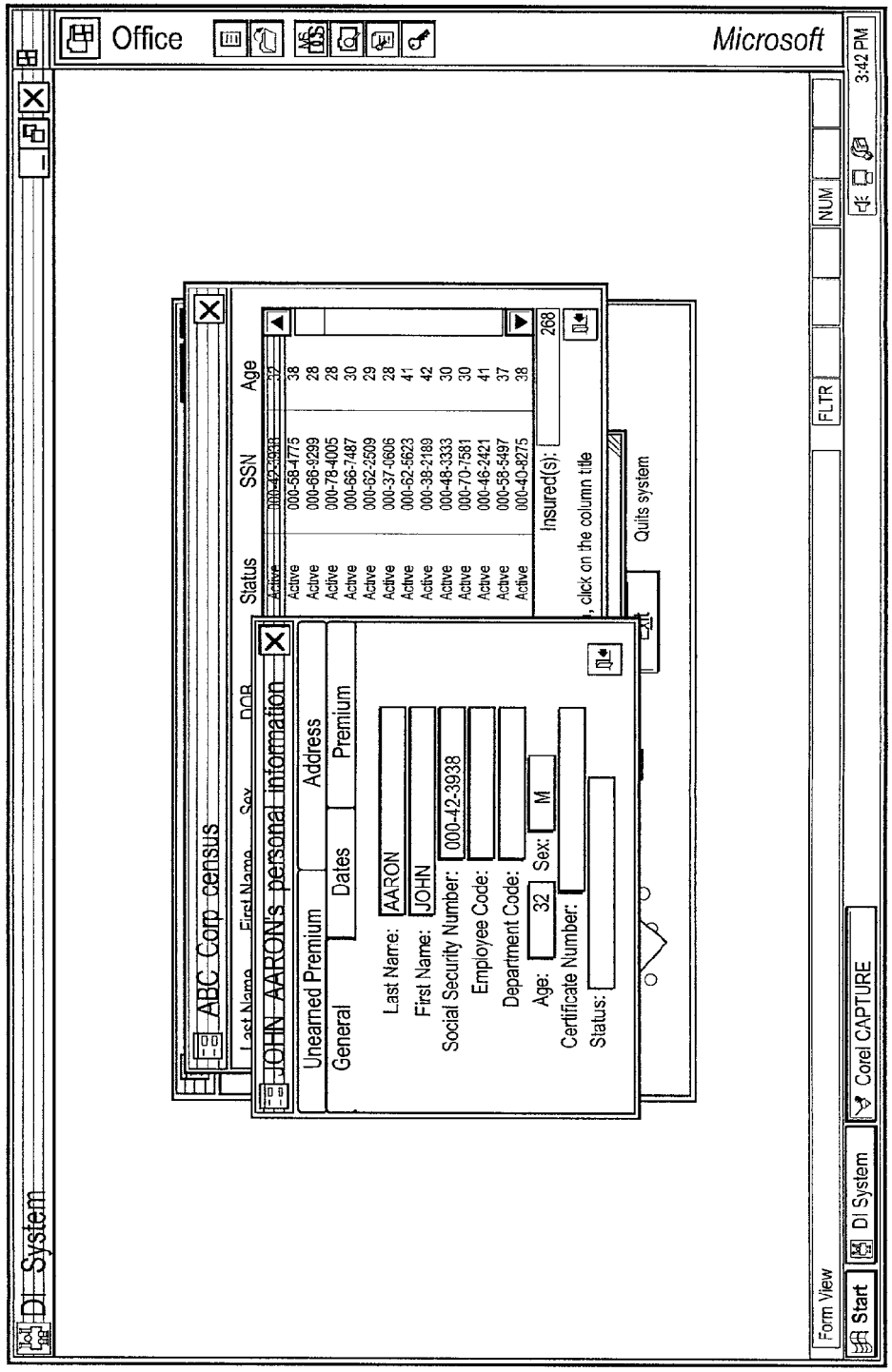
FIG. 32 is a representation of a screen produced on a visual output device in accordance with the present invention.

The user double clicks on any insured to open up the INSURED EDIT Screen in FIG. 32 and edits information about the selected insured. The INSURED EDIT Screen in FIG. 32 has 5 tabs:

The first tab is the GENERAL tab (Screen in FIG. 32), which contains standard information about the insured including but not limited to last name, first name, social security number, employee code, department code, age, sex, certificate number, and status.

Figure 33:
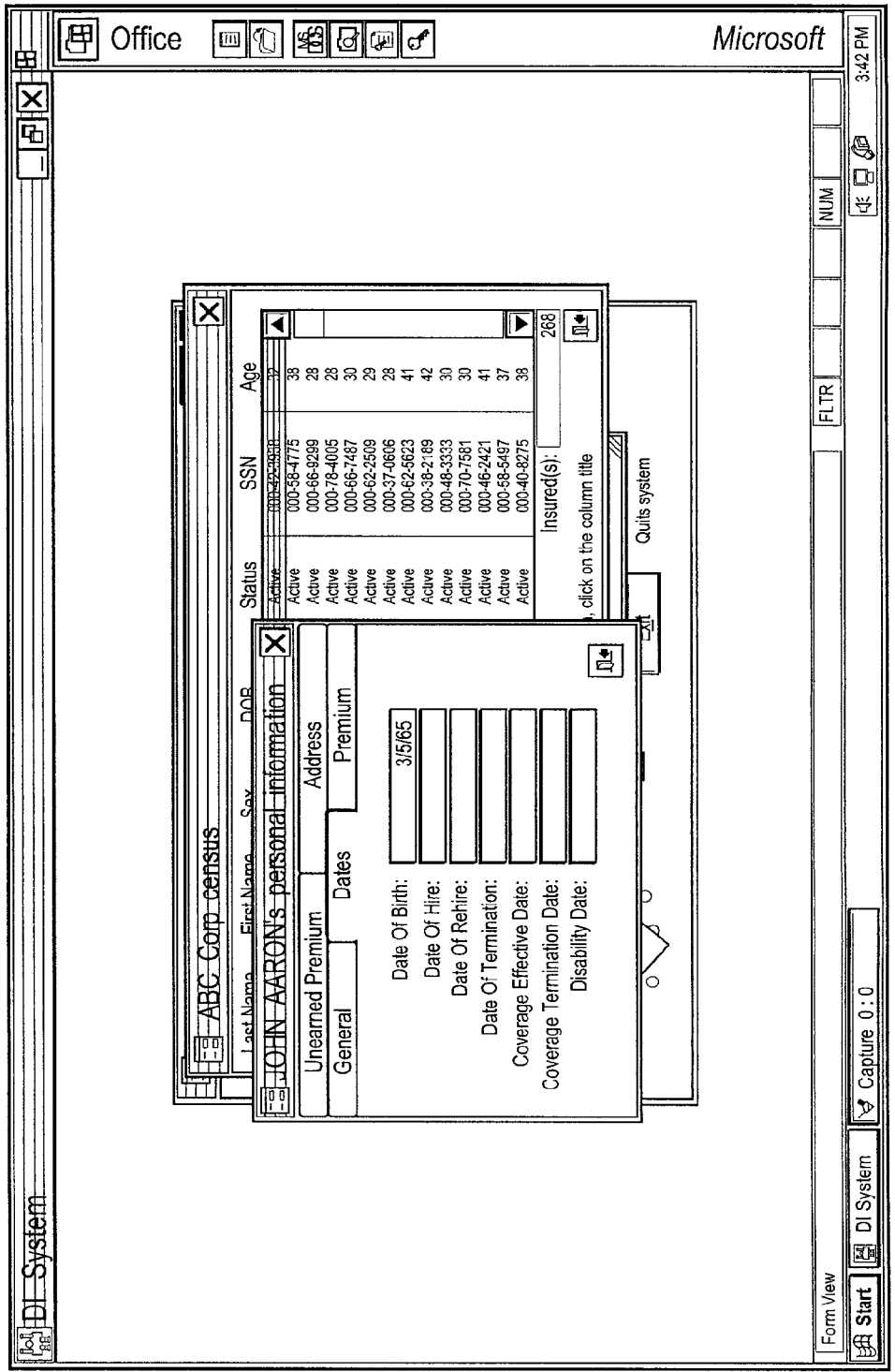
FIG. 33 is a representation of a screen produced on a visual output device in accordance with the present invention.

The second tab is the DATES tab (Screen in FIG. 33) contains all relevant dates to the status field of the insured. These dates include but are not limited to date of birth, date of hire, date of rehire, date of termination, coverage effective date, coverage termination date and disability date.

Figure 34:
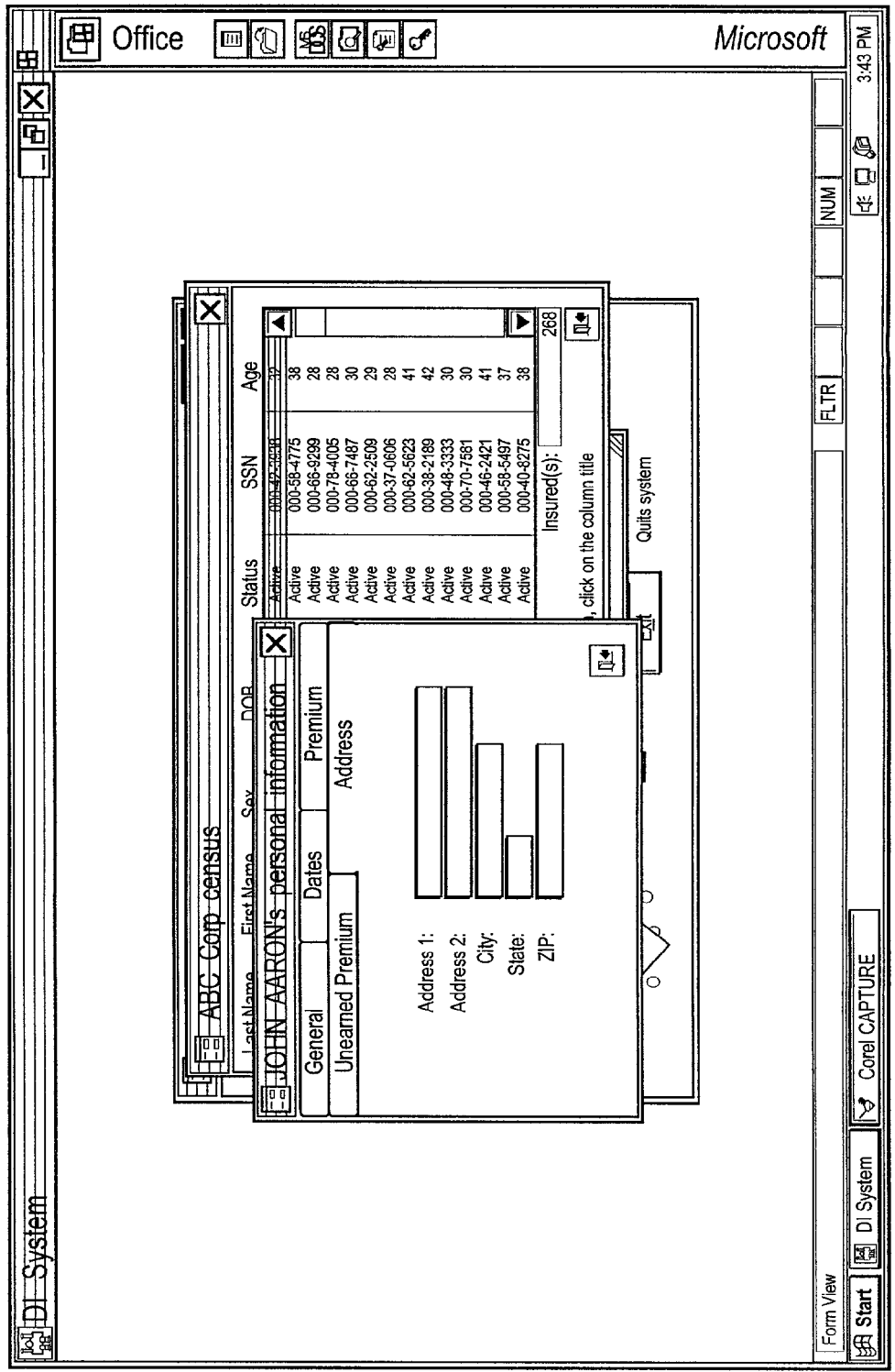
FIG. 34 is a representation of a screen produced on a visual output device in accordance with the present invention.

The third tab is the ADDRESS tab (Screen in FIG. 34), which contains address information including but not limited to street address, city, state, and ZIP.

Figure 35:
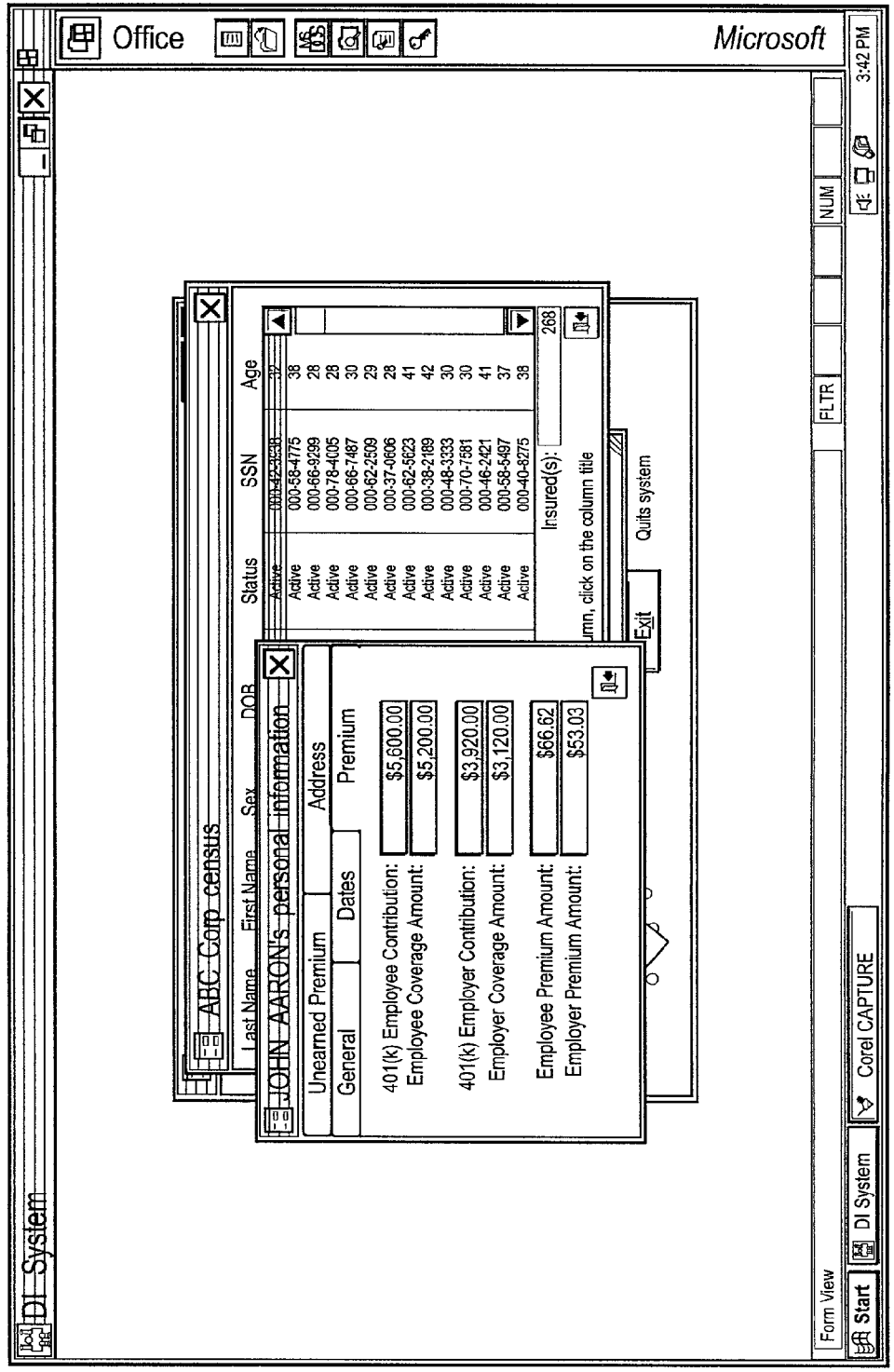
FIG. 35 is a representation of a screen produced on a visual output device in accordance with the present invention.

The fourth tab is the PREMIUM tab (Screen in FIG. 35), which contains the original participant and employer or sponsor contribution, the participant and employer or sponsor coverage amounts just calculated and reflecting the plan design coverage ratios, and the participant and employer premium amounts that were just calculated.

Figure 36:
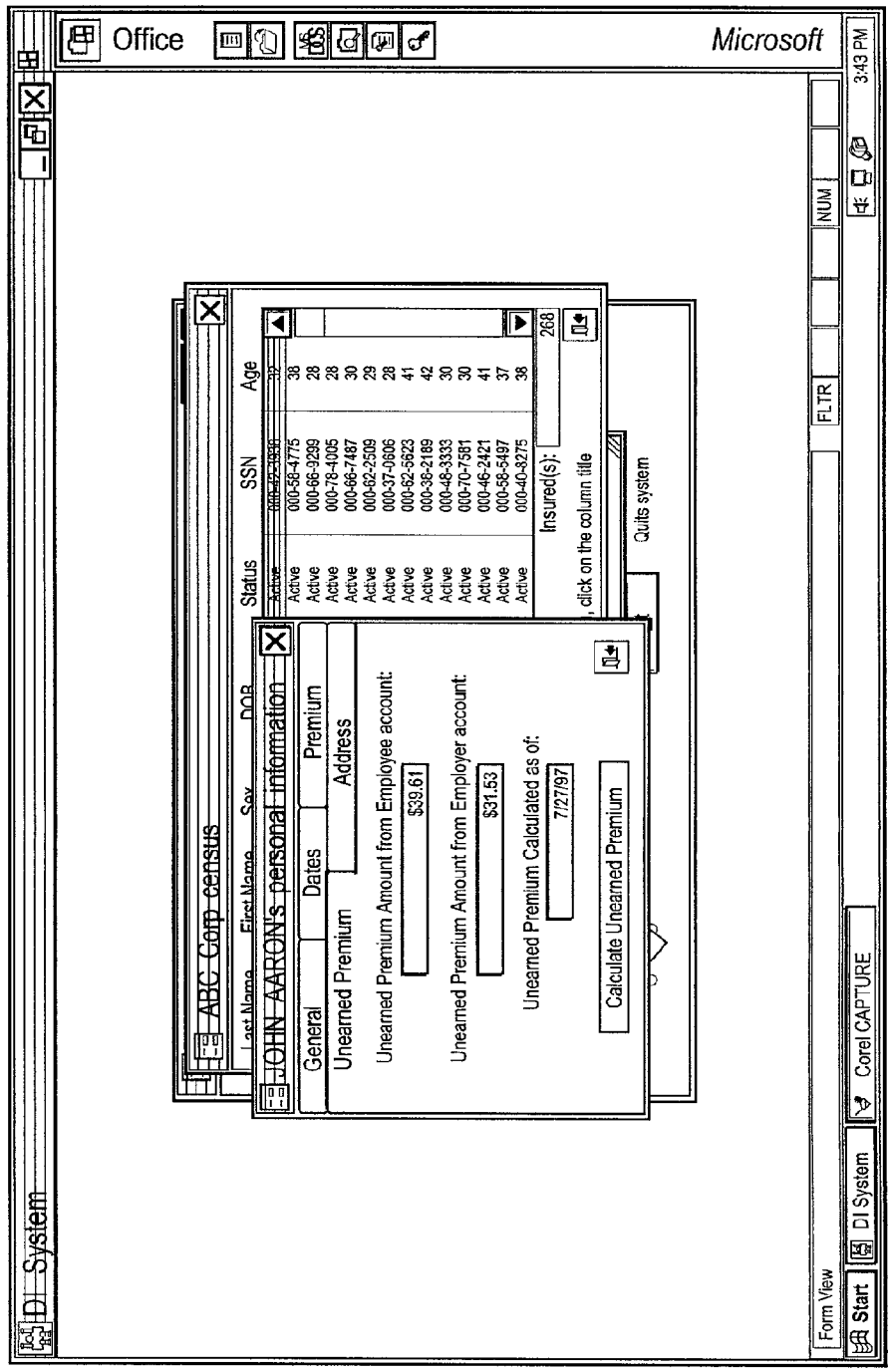
FIG. 36 is a representation of a screen produced on a visual output device in accordance with the present invention.

The fifth tab is the UNEARNED PREMIUM tab (Screen in FIG. 36), which contains the participant unearned premium amount, the employer or sponsor unearned premium amount, and the date as of which the unearned premium was calculated. The user can calculate unearned premiums for a specific insured by clicking on the CALCULATE UNEARNED PREMIUM command button.

The user exits the INSURED EDIT Screen in FIG. 32 by clicking on the EXIT command button and returns to the INSURED LIST Screen in FIG. 18. The user exits the INSURED LIST screen by clicking on the EXIT command button and returns to the CENSUS EDIT Screen in FIG. 17. The user exits the CENSUS EDIT screen by clicking on the EXIT command button and returns to the CENSUS LIST Screen in FIG. 16. The user exits the CENSUS LIST Screen in Figure by clicking on the EXIT command button and returns to the LIBRARIES Screen in FIG. 4. The user exits the LIBRARIES screen by clicking on the EXIT command button and returns to the MAIN MENU Screen in FIG. 3.

Figure 37:
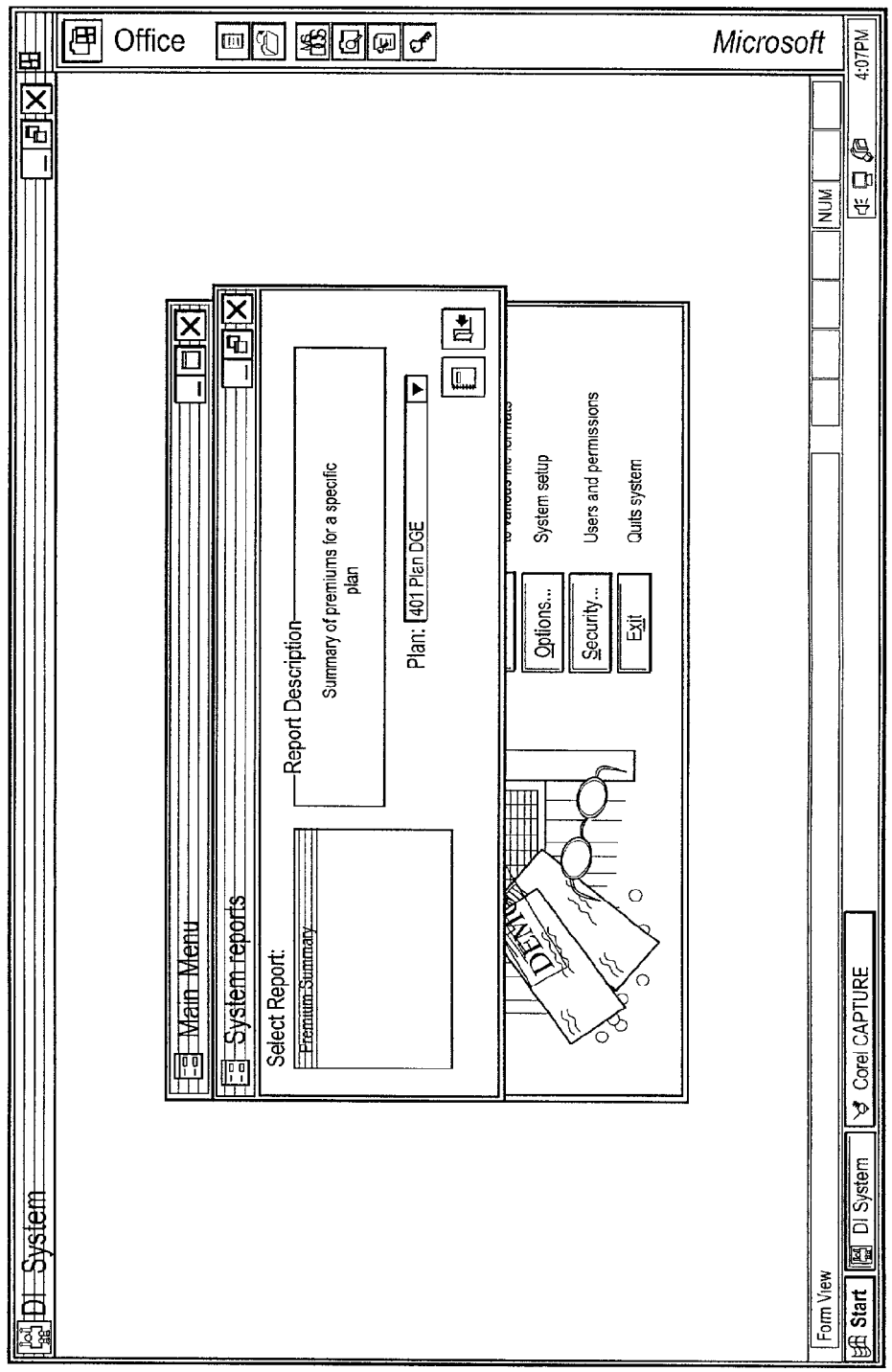
FIG. 37 is a representation of a screen produced on a visual output device in accordance with the present invention.

The user can then prepare reports and print reports or create print files. The System 1 can print custom designed reports for record keepers, carriers, and plan sponsors. The user clicks on the REPORTS command button to open up the REPORT Screen in FIG. 37. The user selects the report he/she wants to print in the SELECT REPORT list box and then selects which plan he/she wants the report based on in the PLAN pull down combo box. The user clicks on the REPORT command button (with a report icon), and the report is automatically sent to the Screen in FIG. 38. The user can then print to the printer, fax, or print the report to file to be e-mailed. The user exits the REPORT screen by clicking on the EXIT command button and returns to the MAIN MENU Screen in FIG. 3.

Additionally, the user can export data to external systems. This is one of the most critical features of the System 1. The System 1 can export data from its database to external systems. By creating custom exports, data can be very easily extracted from the System 1 and fed to external systems and report designers. The user has total control over the creation of the import: the user can export data in multiple available file formats, control the layout of the export (sequence of fields) and query the database for what data to extract.

Figure 39:
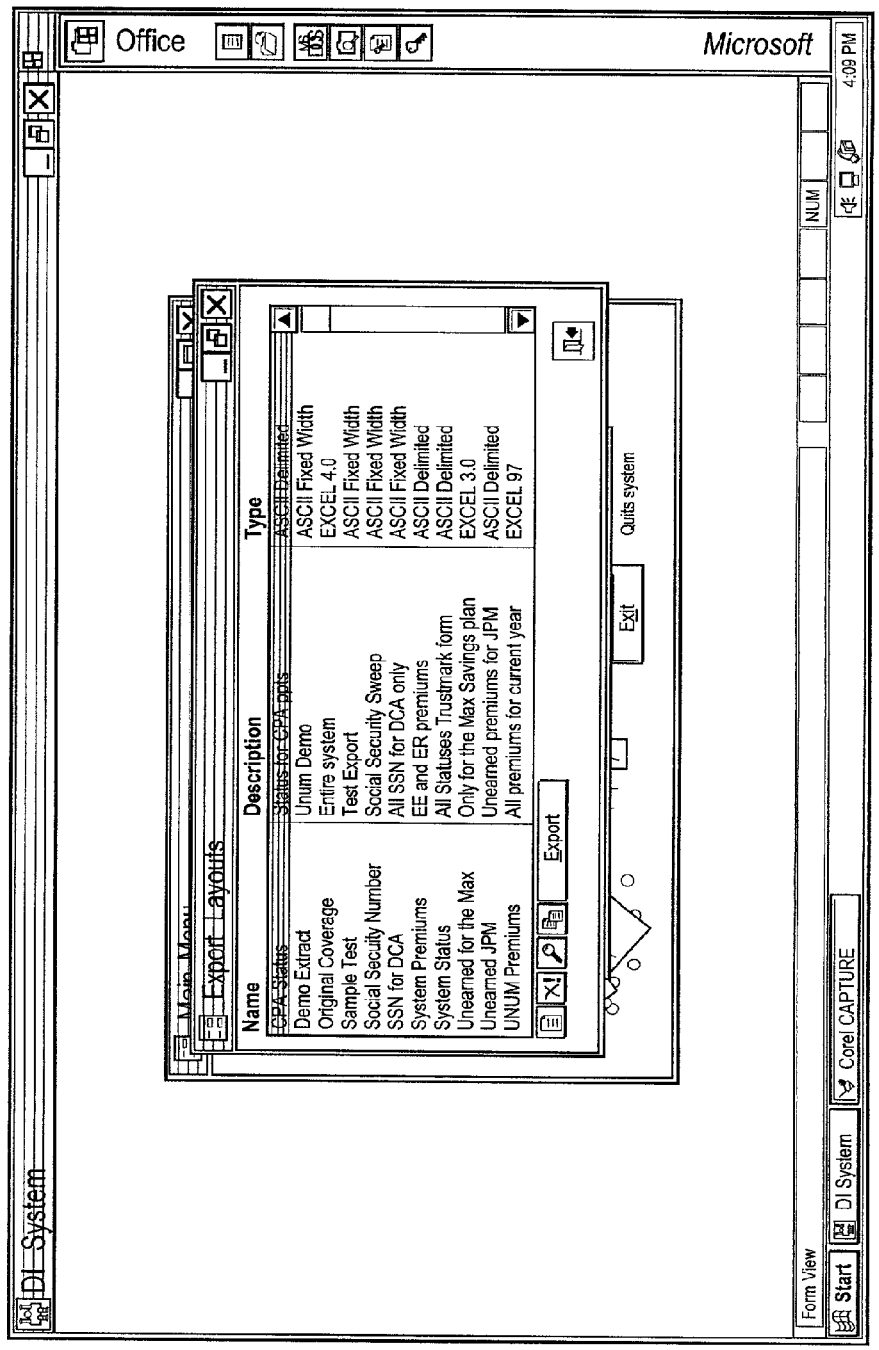
FIG. 39 is a representation of a screen produced on a visual output device in accordance with the present invention.
Figure 40:
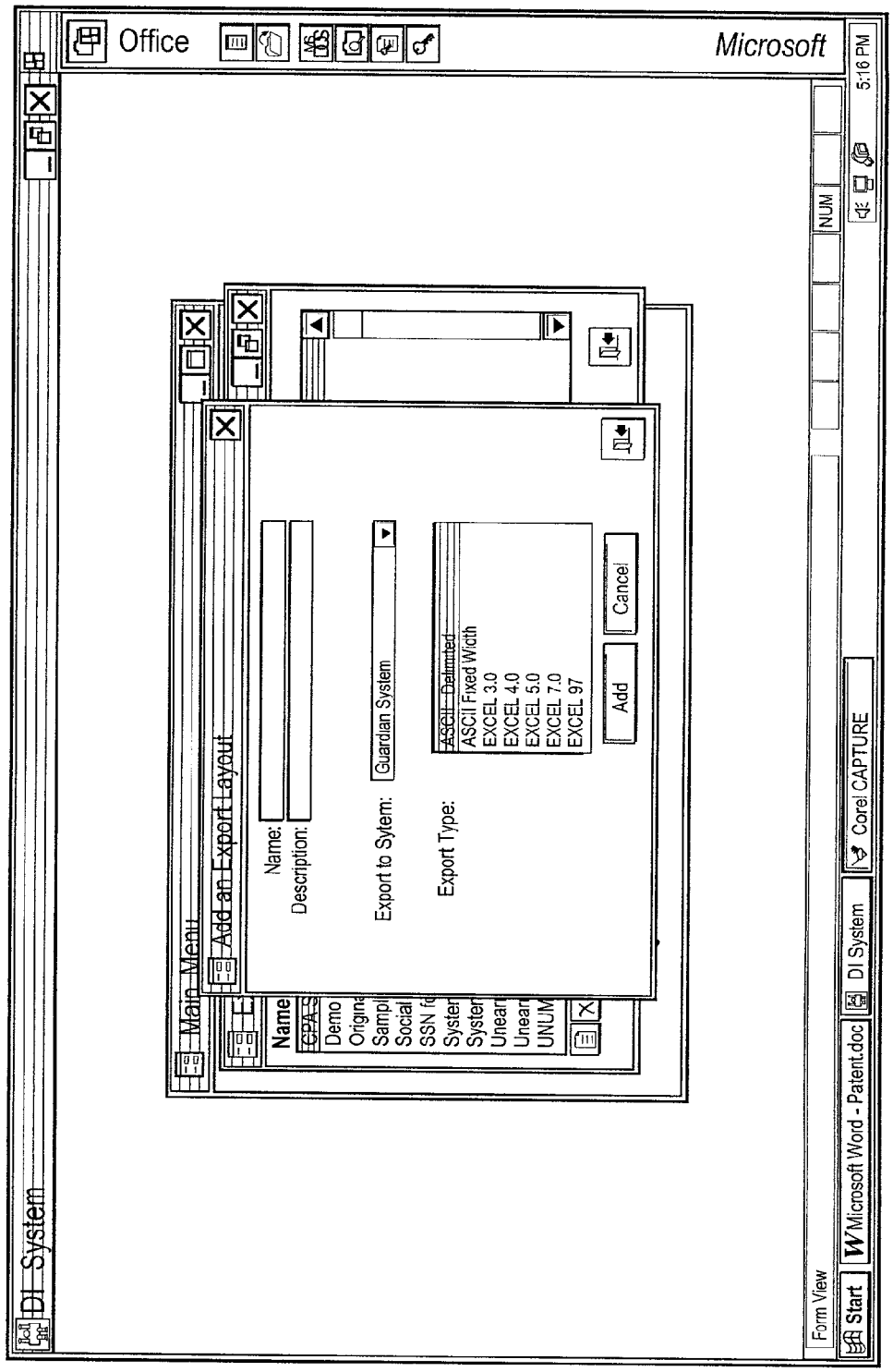
FIG. 40 is a representation of a screen produced on a visual output device in accordance with the present invention.

The insured clicks on the EXPORT command button to open up the EXPORT LIST Screen in FIG. 39. All exports are listed on this screen. The user adds a new EXPORT by clicking on the command button with the blank page icon, and the ADD EXPORT Screen in FIG. 40 opens up. The user enters the following information to create a new export:

Export name
Export description
The name of the external system to which this export is directed.

The reason why the user has to specify the name of the external system is because of the conversion tables. For example the user may want to export the field SEX to an external system that only understands <0> for males and <1> for females. The System 1 is designed to make that conversion automatically on behalf of the external system.

Figure 41:
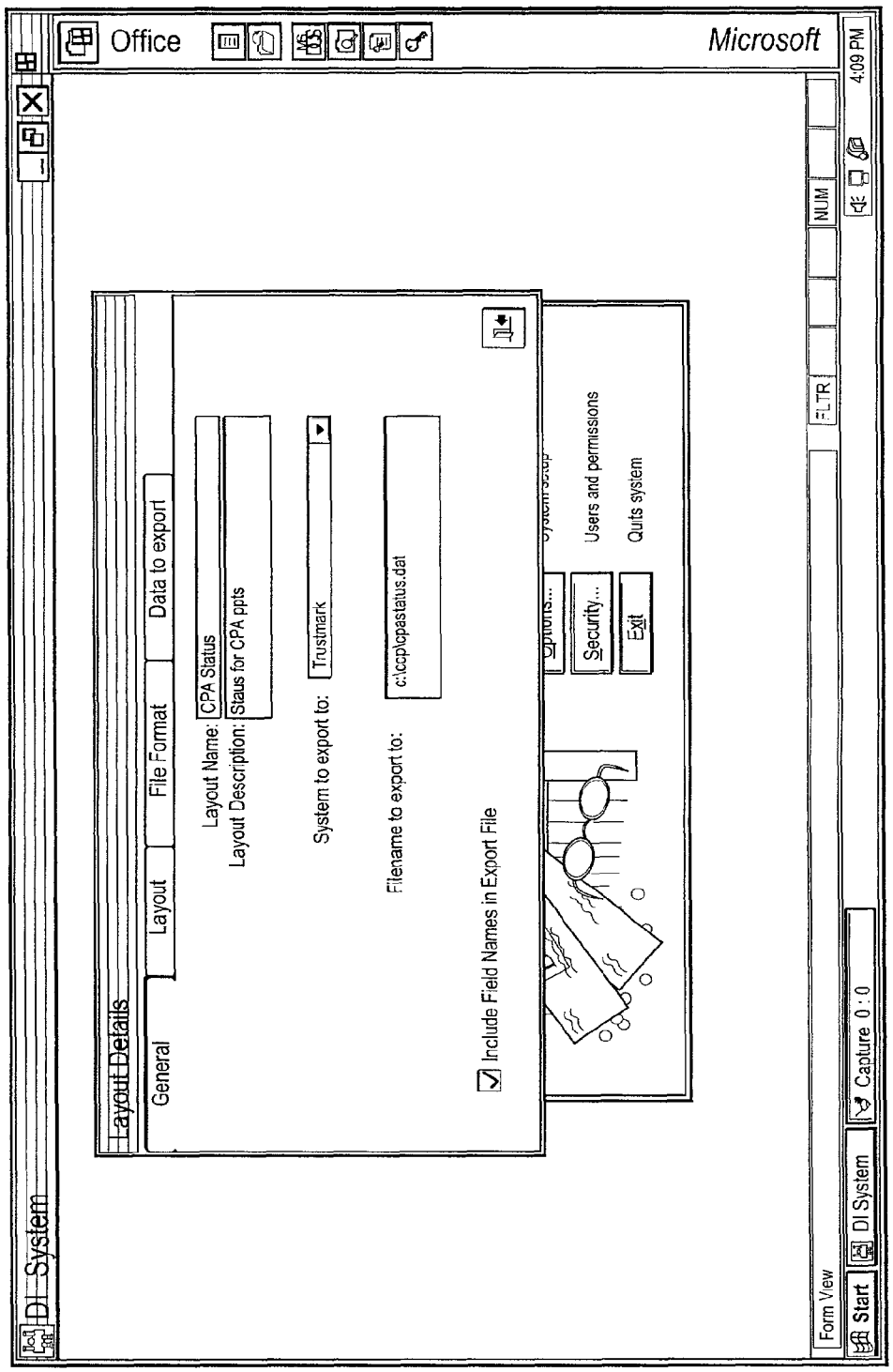
FIG. 41 is a representation of a screen produced on a visual output device in accordance with the present invention.

The export type, which can be of the following types:
ASCII delimited
ASCII fixed width
EXCEL 3.0
EXCEL 4.0
EXCEL 5.0
EXCEL 7.0
EXCEL 97
EXCEL 98
EXCEL 2000
LOTUS files The user then clicks on the ADD button and the new EXPORT is automatically added to EXPORT LIST list box on the EXPORT LIST Screen in FIG. 39. The user double clicks on the newly created EXPORT to open up the EXPORT EDIT Screen in FIG. 41.

The EXPORT EDIT screen contains 4 tabs, the first of which is the General tab (shown in Screen in FIG. 41) that contains the export name, the export description, the name of the external system to export to, the filename used to save the export, and the option to save the field names at the top of the export file.

Figure 42:
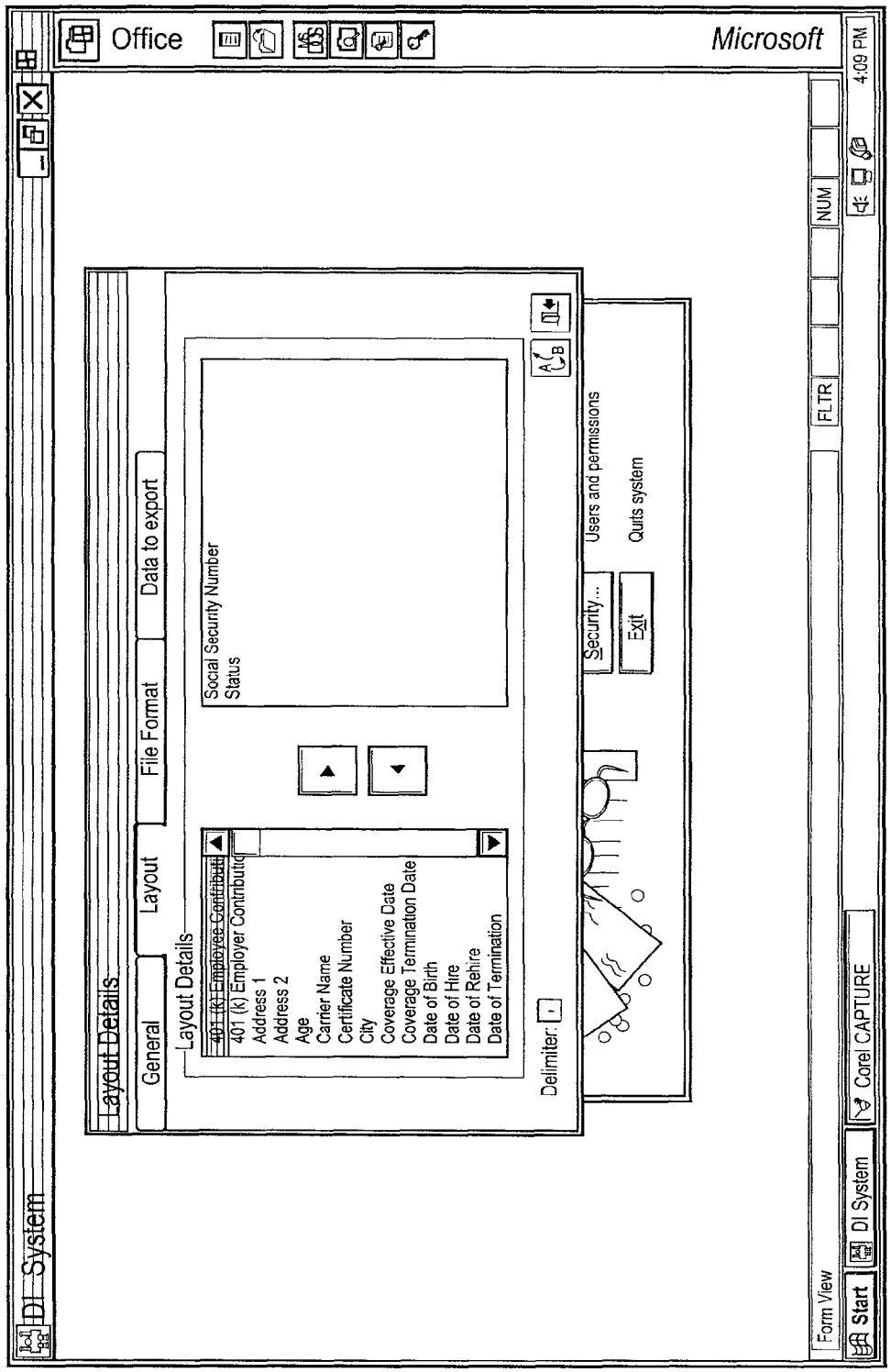
FIG. 42 is a representation of a screen produced on a visual output device in accordance with the present invention.

The second of the tabs is the Layout tab (Screen in FIG. 42) that allows the user to select which fields he/she would like to export and in what order. The user simply selects a field from the field library list box on the left and adds it by clicking on the ADD command button (button with arrow pointing towards right) to the list box on the right that contains the selected fields for export. To remove a field from the selected list box on the right, the user selects the field he/she wants to remove and clicks on the REMOVE command button (button with arrow pointing towards left). The user can virtually export any fields from the insured table in any sequence.

Figure 43:
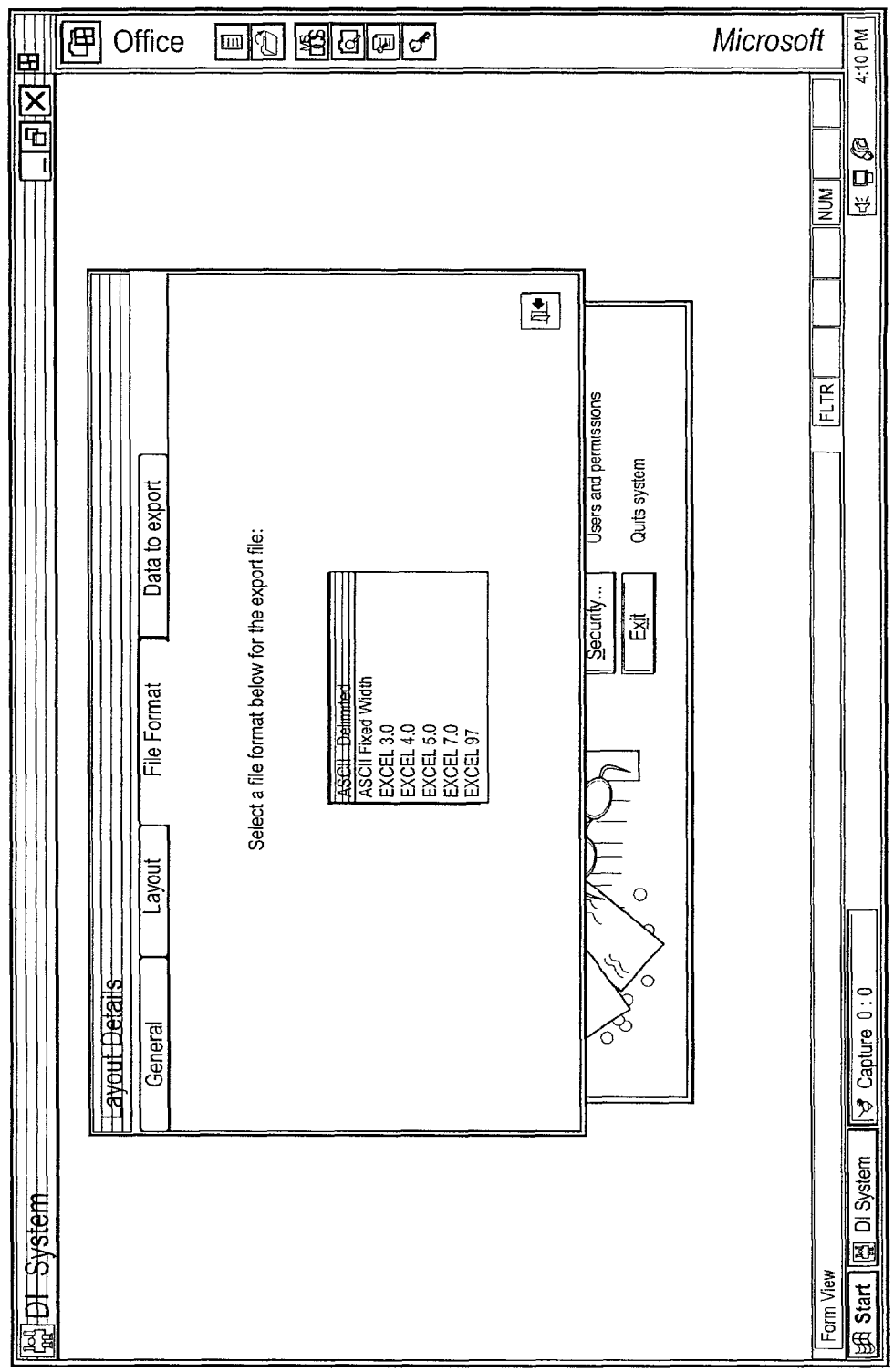
FIG. 43 is a representation of a screen produced on a visual output device in accordance with the present invention.

The third tab is the File Format tab (Screen in FIG. 43), which contains a list of available file formats to save the export file. Please refer to the above list.

The fourth tab is the Data to Export tab (Screen in FIG. 44), which contains the necessary variables to query the database as it relates to the data being exported. The user can select any combination of PLANS, CARRIERS, RECORD KEEPERS and SPONSORS.

Figure 3:
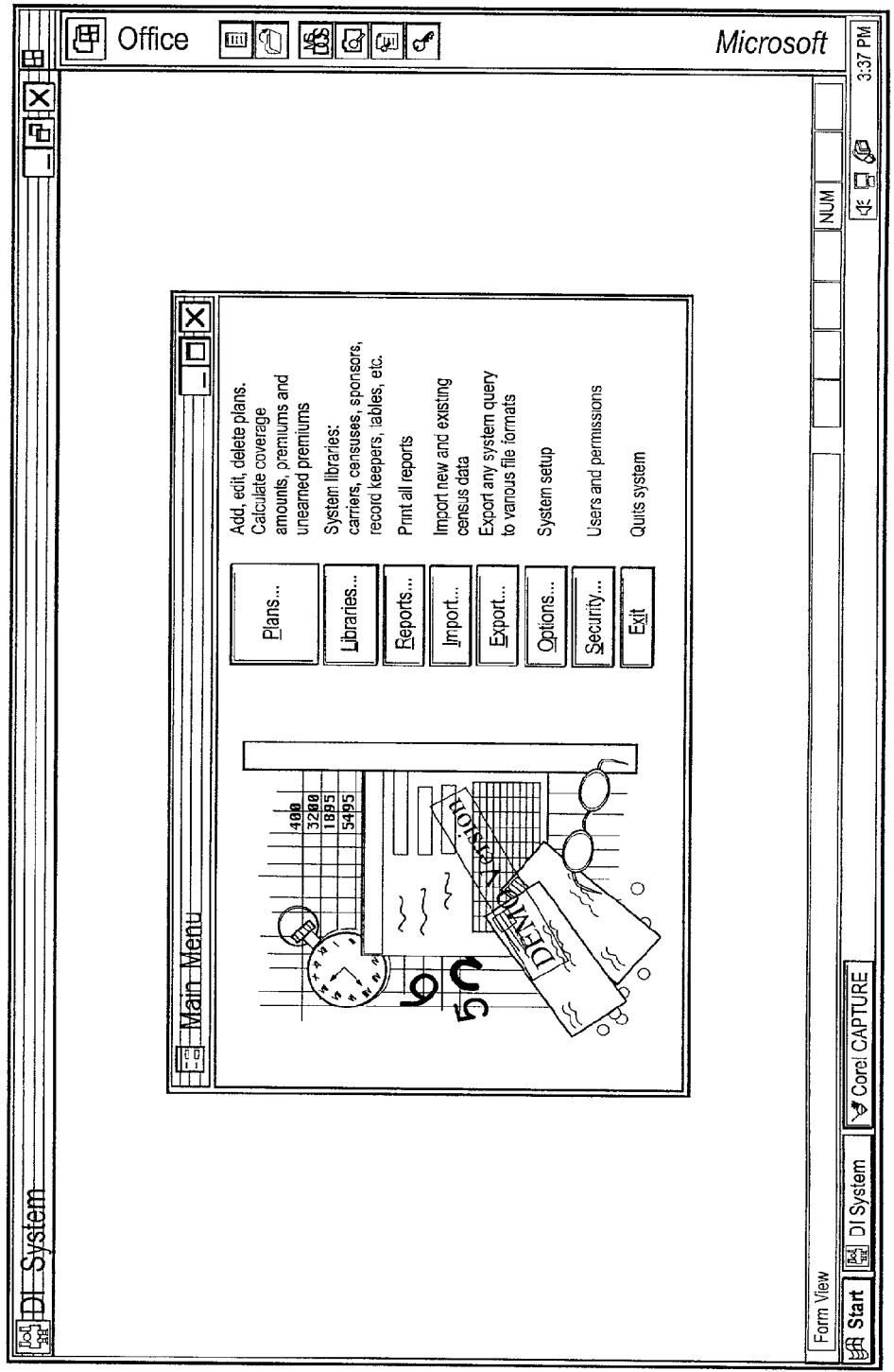
FIG. 3 is a representation of a screen produced on a visual output device in accordance with the present invention.
Figure 44:
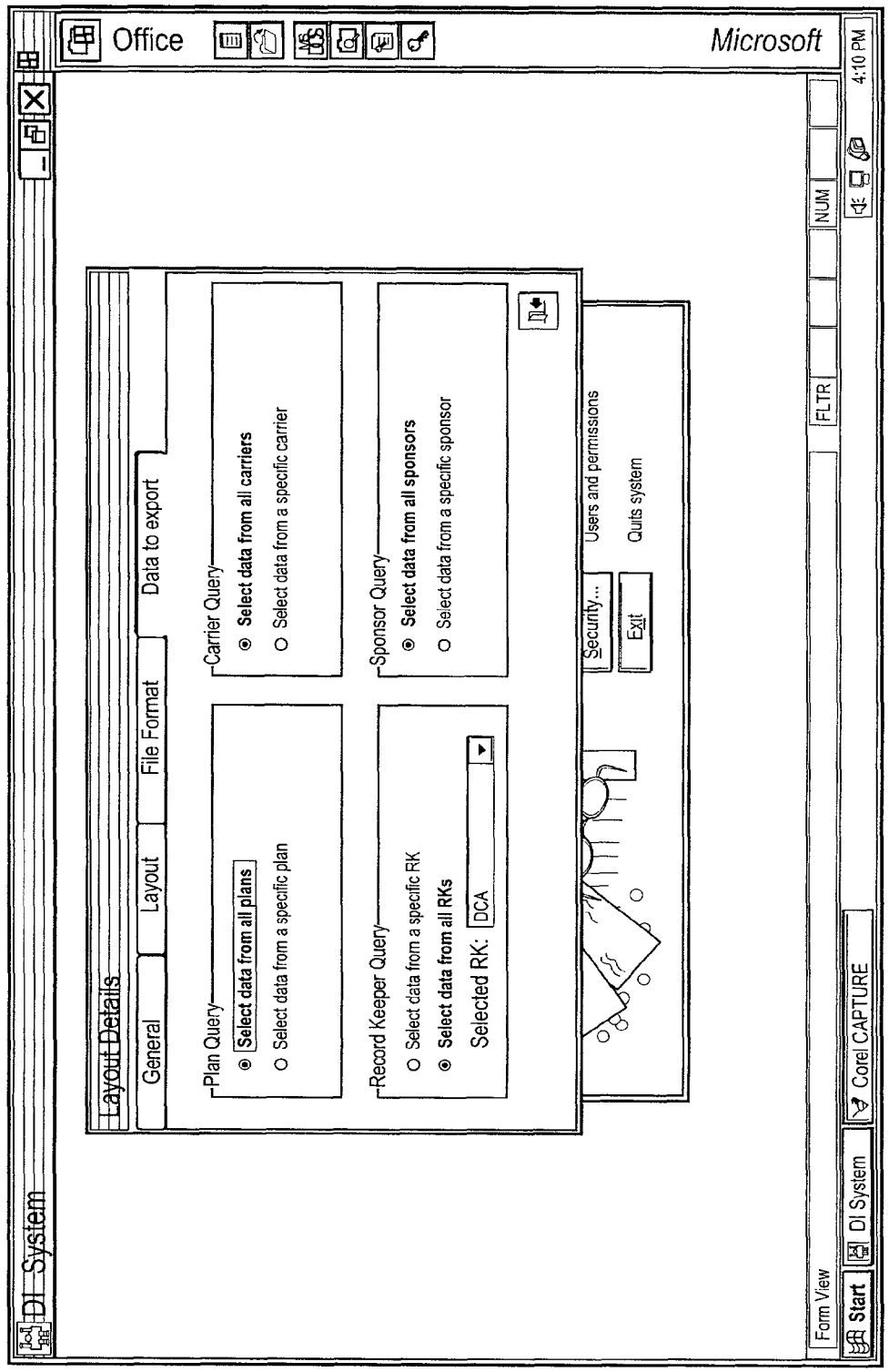
FIG. 44 is a representation of a screen produced on a visual output device in accordance with the present invention.

The user exits the EXPORT EDIT Screen in FIG. 44 by clicking on the EXIT command button and returns to the MAIN MENU Screen in FIG. 3.

The user can then create an export schedule. Export schedules automate the task of E-mailing exports on a regular basis to record keeper contacts, carrier contacts, and sponsor contacts. This is extremely useful because it does not require human intervention and delivers electronically custom design exports to client over such diverse network structures as the internet or a local server accessible on-line by the client.

Now that the user has created a new export, he/she can E-mail that EXPORT to specific recipients on a regular basis. The user clicks on the LIBRARIES command button and opens up the LIBRARIES Screen in FIG. 4. The user double clicks on the EXPORT SCHEDULE library and brings up the EXPORT SCHEDULE LIST Screen in FIG. 45. The user adds a new EXPORT SCHEDULE by clicking on the command button with the blank page icon, and the SCHEDULE ADD Screen in FIG. 46 opens up. The user enters the following information:
  Export schedule name
  Export schedule description
  Export name (name of the newly created EXPORT the user wants to create a SCHEDULE for)
  Frequency (daily, weekly, monthly, quarterly, semi-annually and annually)
  Export starting date.

Figure 45:
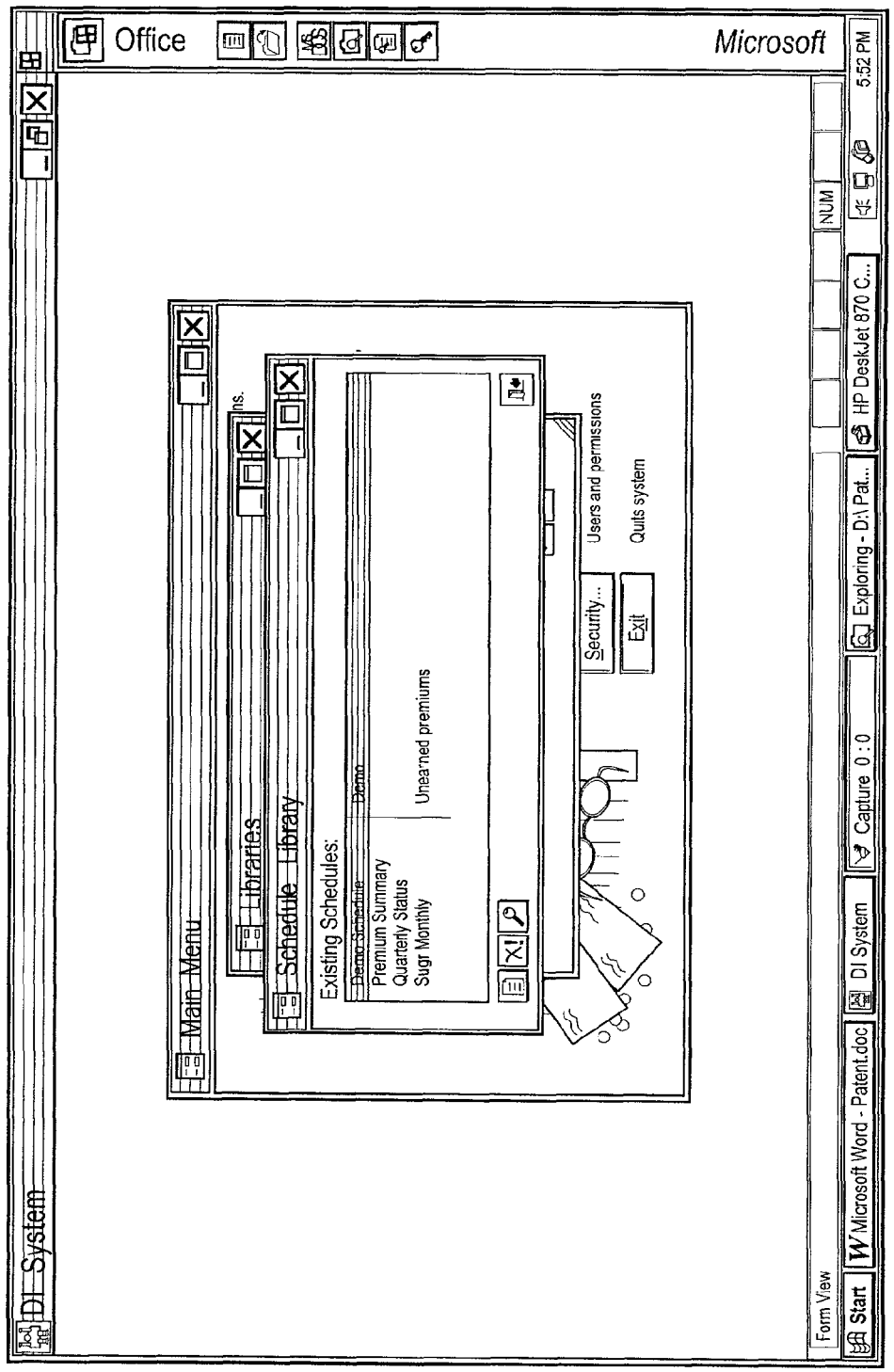
FIG. 45 is a representation of a screen produced on a visual output device in accordance with the present invention.
Figure 46:
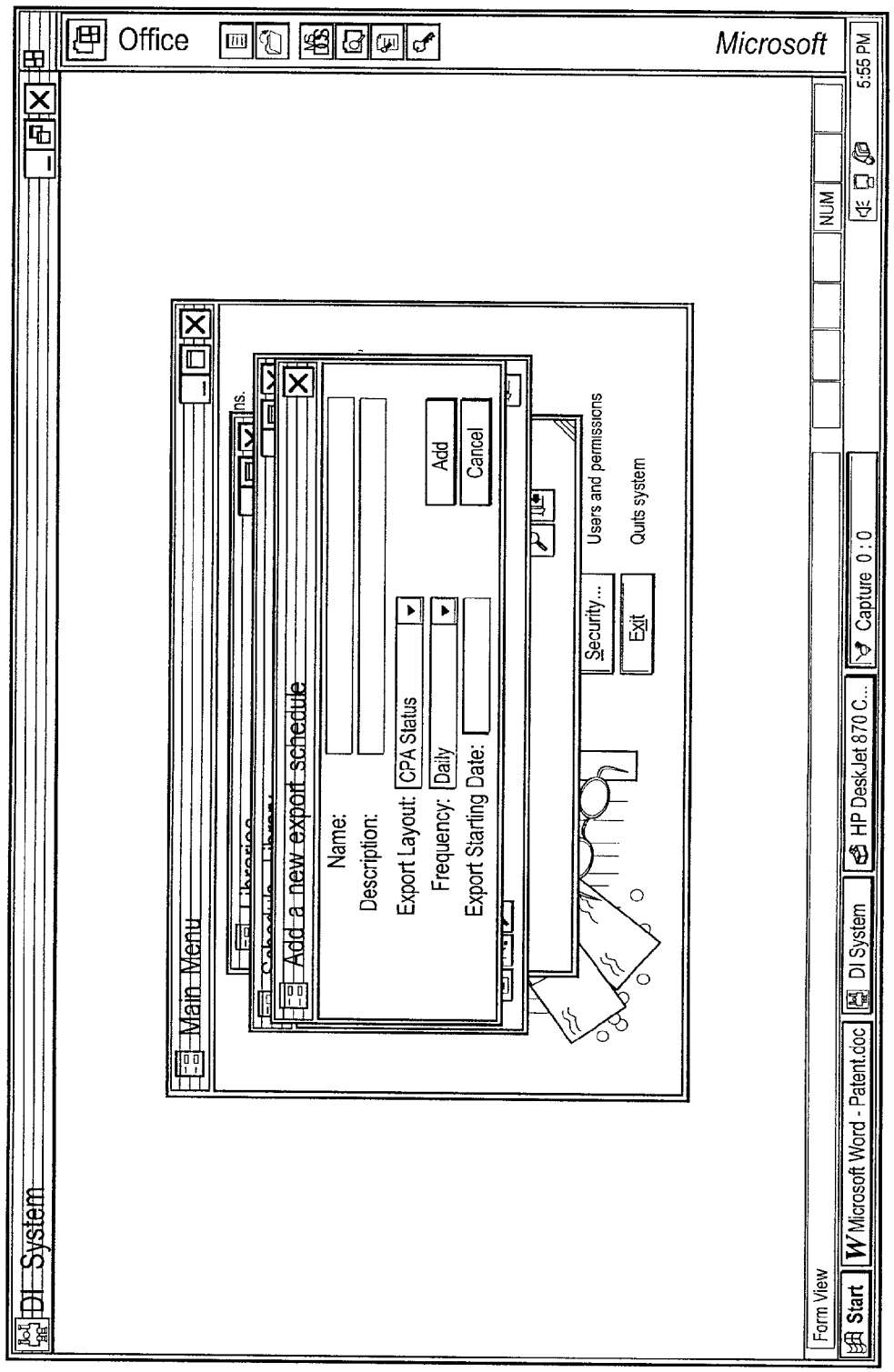
FIG. 46 is a representation of a screen produced on a visual output device in accordance with the present invention.
Figure 47:
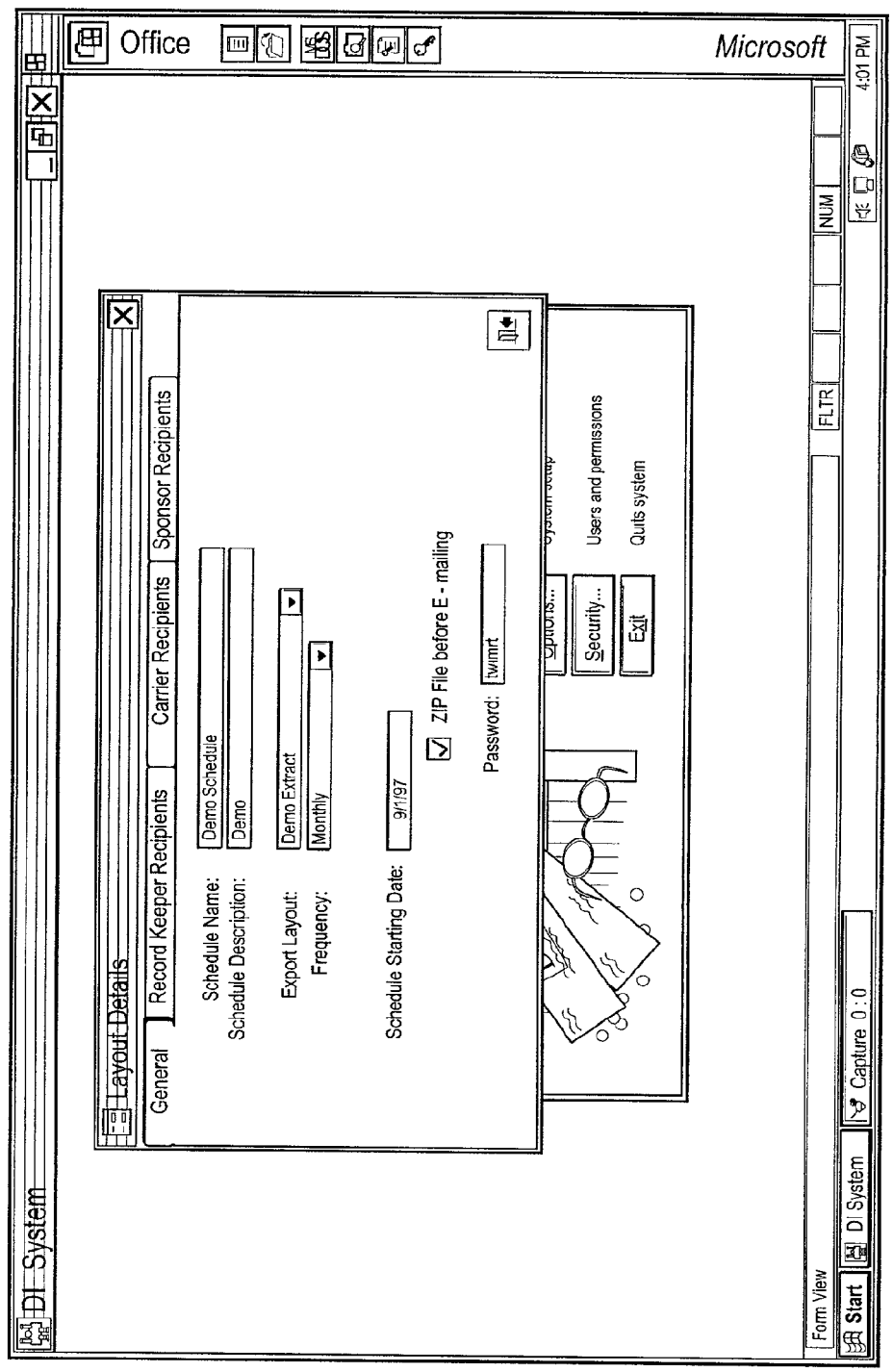
FIG. 47 is a representation of a screen produced on a visual output device in accordance with the present invention.

The user then clicks on the ADD button, and the new EXPORT SCHEDULE is automatically added to EXPORT SCHEDULE LIST list box on the EXPORT SCHEDULE LIST Screen in FIG. 45. The user double clicks on the newly created EXPORT SCHEDULE to open up the EXPORT SCHEDULE EDIT Screen in FIG. 47. The EXPORT SCHEDULE EDIT screen contains 4 tabs:

The first tab is the General tab contains general information about the EXPORT SCHEDULE: the schedule name, the schedule description, the EXPORT, the frequency, the schedule starting date, the option to compress the file before sending, and an optional password to protect the compressed file.

Figure 48:
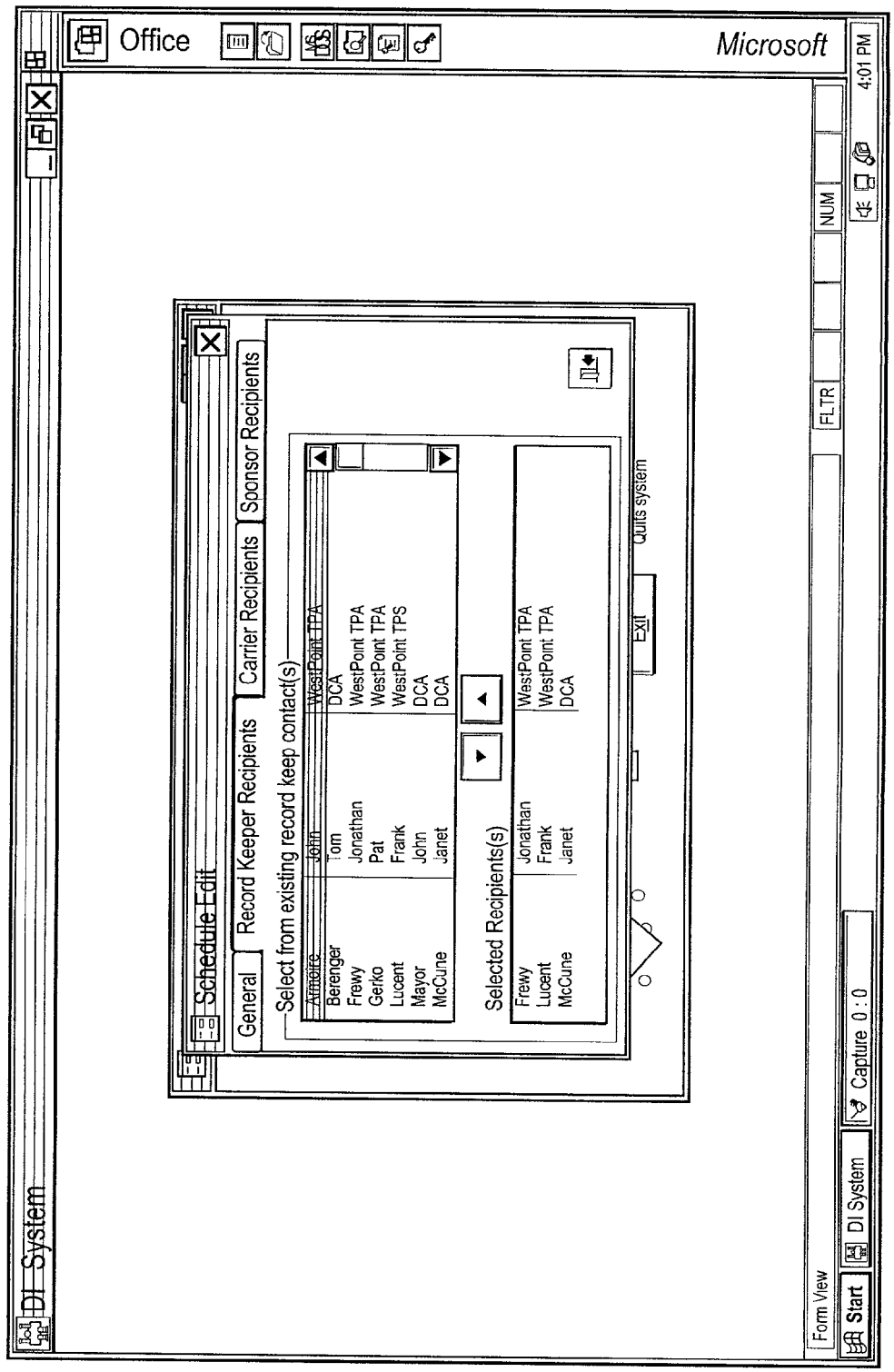
FIG. 48 is a representation of a screen produced on a visual output device in accordance with the present invention.

The second tab is the Record Keeper Recipients tab (Screen in FIG. 48), which allows the user to select among all record keeper contacts contained in the System 1 those to whom the file should be sent via E-mail to. The user selects from the upper list box a record keeper contact he/she would like to E-mail the export file to and clicks on the ADD command button (hand pointing down icon) to add the selected recipient to the SELECTED RECIPIENTS list box. The user can remove a selected record keeper recipient by selecting the recipient in the SELECTED RECIPIENT list box and clicking on the REMOVE command button (hand pointing up icon).

The third tab is the Carrier Recipients tab (essentially the same as Screen in FIG. 4), which allows the user to select among all carrier contacts contained in the system those to whom the file should be E-mailed to. The user selects from the upper list box a carrier contact he/she would like to E-mail the export file to and clicks on the ADD command button (hand pointing down icon) to add the selected recipient to the SELECTED RECIPIENTS list box. The user can remove a selected carrier recipient by selecting the recipient in the SELECTED RECIPIENT list box and clicking on the REMOVE command button (hand pointing up icon).

The fourth tab is the Sponsor Recipients tab (essentially the same as Screen in FIG. 50), which allows the user to select among all sponsor contacts contained in the system those to whom the file should be E-mailed to. The user selects from the upper list box a sponsor contact he/she would like to E-mail the export file to and clicks on the ADD command button (hand pointing down icon) to add the selected recipient to the SELECTED RECIPIENTS list box. The user can remove a sponsor recipient by selecting the recipient in the SELECTED RECIPIENT list box and clicking on the REMOVE command button (hand pointing up icon).

The user exits the EXPORT SCHEDULE EDIT Screen in FIG. 44 by clicking on the EXIT command button and returns to the EXPORT SCHEDULE LIST Screen in FIG. 45. The user exits the EXPORT SCHEDULE LIST Screen in FIG. 45 by clicking on the EXIT command button and returns to LIBRARIES Screen in FIG. 4. The user exits the LIBRARIES Screen in FIG. 4 by clicking on the EXIT command button and returns to the MAIN MENU Screen in FIG. 3.

The user can then select what back-end type to use in the options of System 1. The user clicks on the OPTIONS command button and opens up the SYSTEM OPTIONS Screen in FIG. 49. In the ATTACHMENT METHOD frame, the user can select the type of back-end he/she wants to use. He/she can choose from Microsoft Access 97 (or latest version) and Microsoft SQL Server 6.5 (or latest version). Then the user clicks on the ATTACH command button, and the system will connect to the proper back-end locally or on the network.

Figure 49:
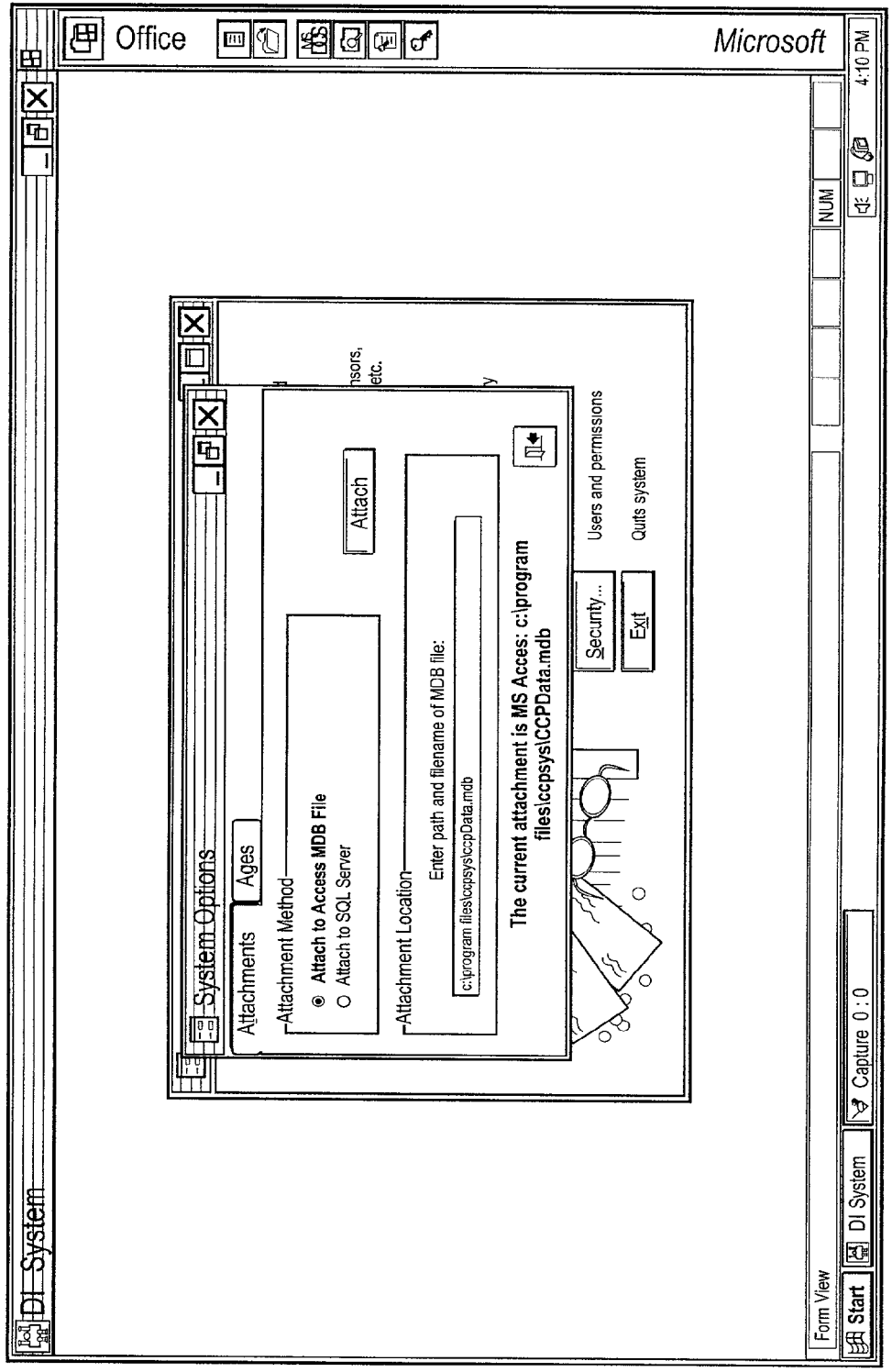
FIG. 49 is a representation of a screen produced on a visual output device in accordance with the present invention.

The user exits the SYSTEM OPTIONS Screen in FIG. 49 by clicking on the EXIT command button and returns to the MAIN MENU Screen in FIG. 3.

Figure 50:
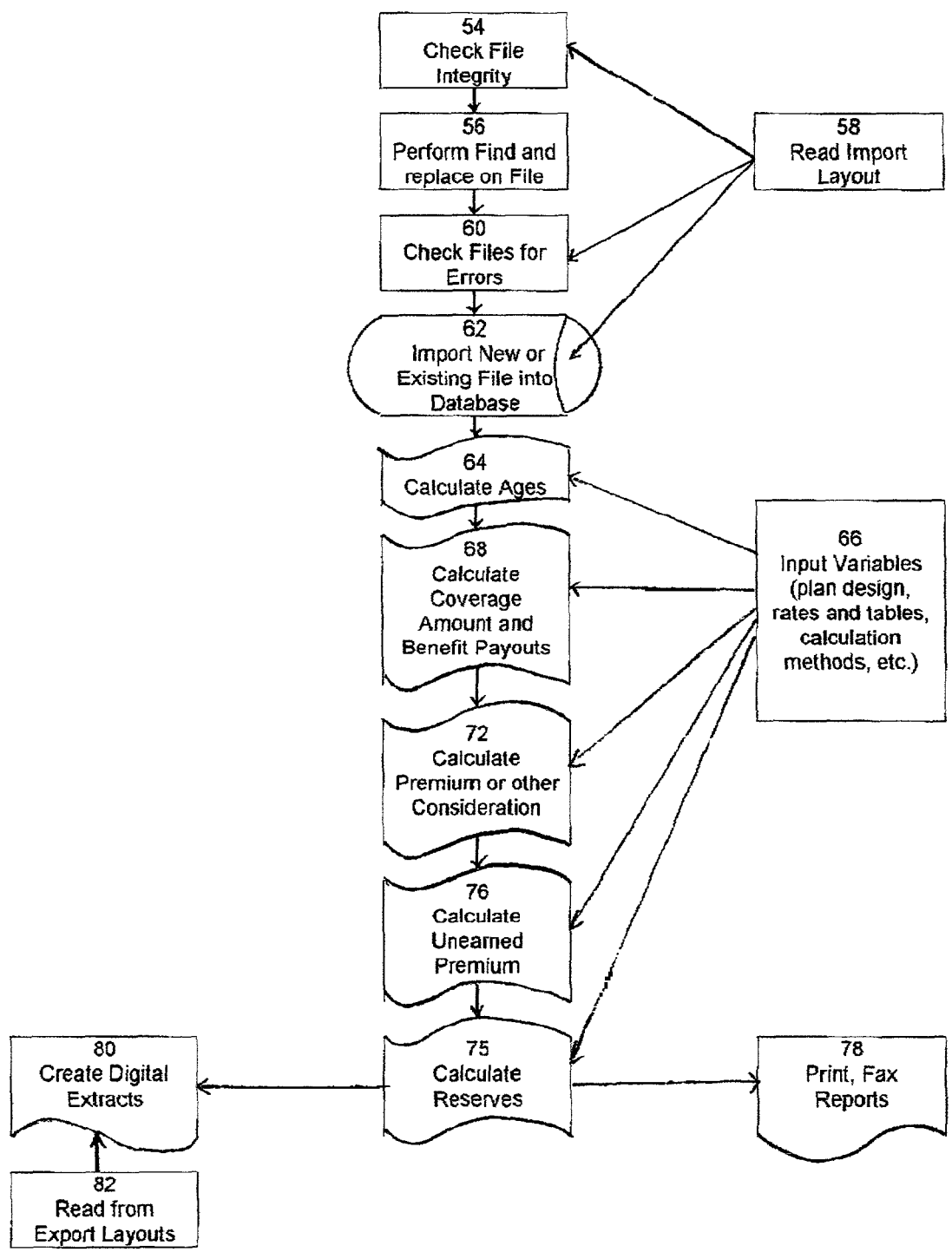
FIG. 50 is a flow chart for the method carried out by the apparatus of the present invention.

How to make the apparatus of FIG. 1 to carry out the method illustrated in FIGS. 2-49 is generally shown in FIG. 50 and more particularly disclosed in the copy of the computer program 6 code provided as an appendix hereto.

FIG. 50 commences at Block 54, wherein the computer 2 receives input data, such as the census data discussed above, including a list of insureds. The data can be received directly from any input device 12 or indirectly, e.g., via a diskette or E-mail; in either case, though, information is entered into some input device which converts the information into input digital electrical signals representing the input information for communication by the first digital electrical computer 4. The digital electrical signals can be formatted into ASCII fixed or ASCII delimited files. Preferably, the input digital electrical signals are received in a data file with known data structures from a second computer 19 of a record keeper, sponsor, carrier, etc.

At Block 54, the computer 4 checks the integrity of the data file to ensure that the data structures are consistent with an import layout predefined for recognition by computer 4.

At Block 56, computer 4 performs the above-described "find and replace" activities by reading specific data strings in the input data in accordance with the import layout, finding those strings that the user directs computer 4 to discard, and replacing those strings with other strings of data defined by the user.

At Block 60, computer 4 checks the input data in each field to ensure that the input data in accordance with the import layout. For example, if the computer 4 is expecting a STATE CODE data structure in a two-digit character code, the Computer will verify that the input data elements correspond to a state.

At Block 62, computer 4 completes the task of reading (i.e., importing) the input data, and writes a file containing the input data to the database 20.

At Block 58, logic is provided to specify the file format, data structures, and layout definitions for importing the input data, logic utilized in reading the imported data as discussed above.

At Block 64, logic is provided for calculating the ages of the insureds.

At Block 66, logic is provided for selecting a method for calculating the ages of the insureds, e.g., nearest birthday or age at the last birthday.

At Block 68, logic is provided for determining coverage amount and benefit payouts based on a portion of the contribution.

At Block 66, logic is provided for reading the plan design to enable determining coverage amount and benefit payouts based on a portion of the contribution and the selected plan design.

At Block 72, logic is provided for calculating premium amount.

At Block 66, logic is provided for reading premium rates from a table for a respective carrier's policy to enable calculating the premium amount.

At Block 75, logic IS provided for computing reserves. This logic is carried out by referencing the plan design and other variables (at Block 66), premium amounts (at Block 72), and updated census reports.

At Block 76, logic is provided for computing an unearned premium amount. This logic is carried out by determining the number of days remaining to the next plan anniversary date, the number then being divided by the number of days in the year, with the remainder then multiplied by the premium to obtain the amount of unearned premium.

At Block 78, computer 4 directs an output of an illustration, report, fax, documentation, or the like—produced optionally in hard copy or electronic media for E-mail to the computer 18 or 19 of the record keeper, carrier, reinsurer, sponsor, participant, mutual fund provider, other IRA provider, Social Security Administration, or an entity performing administration on behalf of the Social Security Administration.

At Block 80, computer 4 directs creation of a customizable digital data extract based on the user-defined layouts (at Block 58) created for exporting output data from computer 4 to the external systems.

In sum, the present invention is quite robust. Thus, the scope of the invention should be determined by the appended claims and their legal equivalents, rather than by the principal embodiment and other examples described above.

We claim:

1. A method for making substitute continuing payments into a trust of a retirement plan, into which contribution payments are normally made on behalf of an employee participating in the plan, during a period of non-payment due to a long-term disability of the employee, comprising: a. including a disability insurance policy as a feature of the plan; b. holding the insurance policy as an asset of the plan's trust; c. performing, by a computer processing system the steps of: (i) receiving information relating to said employee's pre-disability contribution amount; and (ii) calculating, based on said information, a premium amount for the insurance policy and a disability benefit amount under the insurance policy, said disability benefit amount being substantially equal to the pre-disability contribution amount; d. paying the premium amount calculated by the computer system with assets of the trust; and e. receiving the disability benefit amount calculated by the computer system into the plan's trust.

2. A method for making substitute continuing payments into a trust of a retirement plan, into which contribution payments are normally made on behalf of an employee participating in the plan, during a period of non-payment due to a long-term disability of the employee, comprising: a. including a disability insurance policy as a feature of the plan; b. holding the insurance policy as an asset of the plan's trust; c. performing, by a computer processing system, the steps of: (i) receiving information relating to said employee's pre-disability contribution amount; and (ii) calculating, based on said information, a premium amount for the insurance policy and a disability benefit amount under the insurance policy, said disability benefit amount being substantially equal to the pre-disability contribution amount; d. paying the premium amount calculated by the computer system with assets of the trust; and e. receiving the disability benefit amount calculated by the computer system into the plan's trust, wherein, in accordance with provisions of the IRC and its attendant rules and regulations, effective on Sep. 23, 1997, the plan is subject to non-discrimination requirements with regard to eligibility for the insurance, and performing the step of matching eligibility for said insurance to eligibility for the plan, performing the step of matching eligibility for said insurance to participation in the plan, or both for the plan year prior to the policy year for which the insurance is effective.

3. A method for making substitute continuing payments into a trust of a retirement plan, into which contribution payments are normally made on behalf of an employee participating in the plan, during a period of non-payment due to a long-term disability of the employee, comprising: a. including a disability insurance policy as a feature of the plan; b. holding the insurance policy as an asset of the plan's trust; c. performing, by a computer processing system, the steps of: (i) receiving information relating to said employee's pre-disability contribution amount; and (ii) calculating, based on said information, a premium amount for the insurance policy and a disability benefit amount under the insurance policy, said disability benefit amount being substantially equal to the pre-disability contribution amount; d. paying the premium amount calculated by the computer system with assets of the trust; and e. receiving the disability benefit amount calculated by the computer system into the plan's trust, wherein, in accordance with the provisions of the IRC and its attendant rules and regulations, effective on Sep. 23, 1997, the plan is subject to non-discrimination requirements with regard to premiums for the insurance and benefits under the insurance, and performing the step of linking said premiums and benefits to the contributions to the plan for the plan year prior to the policy year for which the insurance is effective, said contributions having been demonstrated to meet the plan's non-discrimination requirements by definition or by testing.

4. A method for making substitute continuing payments into a trust of a defined contribution 457 plan, into which contribution payments are normally made on behalf of an employee participating in the plan, during a period of non-payment due to a long-term disability of the employee, comprising: a. including a disability insurance policy as a feature of the 457 plan; b. holding the insurance policy as an asset of the plan's trust; c. performing, by a computer processing system, the steps of: (i) receiving information relating to said employee's pre-disability contribution amount; and (ii) calculating, based on said information, a premium amount for the insurance policy and a disability benefit amount under the insurance policy, said disability benefit amount being substantially equal to the pre-disability contribution amount; d. paying the premium amount calculated by the computer system with assets of the trust; and e. receiving the disability benefit amount calculated by the computer system into the plan's trust, wherein said insurance policy is subject to the terms of said 457 plan, including the IRS and DOL rules and regulations to which the 457 plan itself is subject.

5. A method for making substitute continuing payments into a trust of a defined contribution 403(b) plan, into which contribution payments are normally made on behalf of an employee participating in the plan, during a period of non-payment due to a long-term disability of the employee, comprising: a. including a disability insurance policy as a feature of the 403(b) plan; b. holding the insurance policy as an asset of the plan's trust; c. performing, by a computer processing system, the steps of: (i) receiving information relating to said employee's pre-disability contribution amount; and (ii) calculating, based on said information, a premium amount for the insurance policy and a disability benefit amount under the insurance policy, said disability benefit amount being substantially equal to the pre-disability contribution amount; d. paying the premium amount calculated by the computer system with assets of the trust; and e. receiving the disability benefit amount calculated by the computer system into the plan's trust, wherein said insurance policy is subject to the terms of said 403(b) plan, including the IRS and DOL rules and regulations to which the 403(b) plan itself is subject.

6. A method for making substitute continuing payments into a trust of a retirement plan, into which contribution payments are normally made on behalf of a participant of the plan, during a period of non-payment due to a long-term disability of the plan participant, the method comprising: a. including a disability insurance policy as a feature of the plan; b. holding the insurance policy as an asset of the plan's trust; c. performing, by a computer processing system, the steps of: (i) receiving information relating to said participant's pre-disability contribution amount; and (ii) calculating, based on said information, a premium amount for the insurance policy and a disability benefit amount under the insurance policy, said disability benefit amount being substantially equal to the pre-disability contribution amount; d. paying the premium amount calculated by the computer system with assets of the trust; and e. receiving the disability benefit amount calculated by the computer system into the plan's trust, wherein the plan is subject to non-discrimination requirements with regard to eligibility for the insurance, and performing the step of matching eligibility for the insurance to eligibility for the plan, performing the step of matching eligibility for the insurance to participation in the plan, or both, for the plan year prior to the policy year for which the insurance is effective.

7. A method for making substitute continuing payments into a trust of a retirement plan, into which contribution payments are normally made on behalf of a participant of the plan, during a period of non-payment due to a long-term disability of the plan participant, the method comprising: a. including a disability insurance policy as a feature of the plan; b. holding the insurance policy as an asset of the plan's trust; c. performing, by a computer processing system, the steps of: (i) receiving information relating to said participant's pre-disability contribution amount; and (ii) calculating, based on said information, a premium amount for the insurance policy and a disability benefit amount under the insurance policy, said disability benefit amount being substantially equal to the pre-disability contribution amount; d. paying the premium amount calculated by the computer system with assets of the trust; and e. receiving the disability benefit amount calculated by the computer system into the plan's trust, wherein the plan is subject to non-discrimination requirements with regard to premiums for the insurance and benefits under the insurance, and performing the step of linking said premiums and benefits to pre-disability contributions to the plan for the plan year prior to the policy year for which the insurance is effective, said pre-disability contributions having been demonstrated to meet the plan's non-discrimination requirements by definition or by testing.

\* \* \* \* \*

UNITED STATES PATENT AND TRADEMARK OFFICE
CERTIFICATE OF CORRECTION

PATENT NO. : 8,595,032 B1
APPLICATION NO. : 11/861084
DATED : November 26, 2013
INVENTOR(S) : Schoen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 836 days.

Signed and Sealed this
Eighth Day of September, 2015

Michelle K. Lee
*Director of the United States Patent and Trademark Office*